(12) United States Patent
Okuda et al.

(10) Patent No.: US 9,433,262 B2
(45) Date of Patent: Sep. 6, 2016

(54) MOLDING HOOK AND LOOP FASTENER

(75) Inventors: Kenji Okuda, Toyoma (JP); Shinichi Imai, Toyoma (JP); Mineto Terada, Toyama (JP); Yuji Takada, Toyoma (JP)

(73) Assignee: YKK Corporation (JP)

( * ) Notice: Subject to any disclaimer, the term of this patent is extended or adjusted under 35 U.S.C. 154(b) by 181 days.

(21) Appl. No.: 14/130,832

(22) PCT Filed: Jul. 5, 2011

(86) PCT No.: PCT/JP2011/065348
§ 371 (c)(1),
(2), (4) Date: Jan. 3, 2014

(87) PCT Pub. No.: WO2013/005297
PCT Pub. Date: Jan. 10, 2013

(65) Prior Publication Data
US 2014/0130311 A1 May 15, 2014

(51) Int. Cl.
*A44B 18/00* (2006.01)
*B29C 43/22* (2006.01)

(52) U.S. Cl.
CPC ....... *A44B 18/0015* (2013.01); *A44B 18/0019* (2013.01); *A44B 18/0049* (2013.01); *A44B 18/0076* (2013.01); *B29C 43/222* (2013.01); *Y10T 24/2767* (2015.01)

(58) Field of Classification Search
None
See application file for complete search history.

(56) References Cited

U.S. PATENT DOCUMENTS

| | | | |
|---|---|---|---|
| 4,784,890 A * | 11/1988 | Black | A44B 18/0076 24/306 |
| 4,802,939 A * | 2/1989 | Billarant | A44B 18/0076 156/155 |
| 4,814,036 A * | 3/1989 | Hatch | A44B 18/0076 156/245 |
| 4,842,916 A * | 6/1989 | Ogawa | A44B 18/0073 24/444 |
| 5,766,723 A * | 6/1998 | Oborny | A44B 18/0076 24/442 |
| 6,463,635 B2 * | 10/2002 | Murasaki | A44B 18/0076 24/306 |
| 6,656,563 B1 * | 12/2003 | Leach | A44B 18/0049 24/442 |
| 6,730,069 B2 * | 5/2004 | Tanzer | A61F 13/5622 24/442 |
| 7,108,814 B2 * | 9/2006 | Herrero | A44B 18/0049 24/442 |

(Continued)

FOREIGN PATENT DOCUMENTS

| | | | |
|---|---|---|---|
| AN | CA 2448996 A1 * | 12/2002 | ......... A44B 18/0049 |
| CN | 1340319 A | 3/2002 | |

(Continued)

OTHER PUBLICATIONS

International Search Report, PCT Application No. PCT/JP2011/065348, mailed Oct. 11, 2011.

*Primary Examiner* — Jack W Lavinder
(74) *Attorney, Agent, or Firm* — Kilpatrick Townsend & Stockton LLP

(57) ABSTRACT

A molding hook and loop fastener includes a plurality of surface fastener portions and a coupling member that is formed of a resilient body and connects the surface fastener portions. The coupling member includes a pair of vertical wall coupling portions which is continuously disposed along a longitudinal direction on both sides in between an engaging element area and which connects the surface fastener portions. With this configuration, when the molding hook and loop fastener is integrally molded to a cushion body, it is possible to prevent a resin material from penetrating into the engaging element area of the surface fastener portion and to stably secure a desired fastening strength at the engaging element area.

15 Claims, 32 Drawing Sheets

(56) References Cited

U.S. PATENT DOCUMENTS

| | | | | |
|---|---|---|---|---|
| 7,431,976 | B2* | 10/2008 | Hermann | A44B 18/0076 24/442 |
| 7,998,548 | B2* | 8/2011 | Murasaki | A44B 18/0076 24/442 |
| 8,043,541 | B2* | 10/2011 | Nozawa | A44B 18/0076 264/214 |
| 8,322,002 | B2* | 12/2012 | Cheng | B60N 2/5833 24/298 |
| 8,756,770 | B2* | 6/2014 | Cina | A44B 18/0049 24/452 |
| 9,034,452 | B2* | 5/2015 | Cina | B32B 3/30 428/100 |
| 9,138,032 | B1* | 9/2015 | Cina | A44B 18/0076 |
| 2002/0023322 | A1 | 2/2002 | Murasaki | |
| 2002/0164451 | A1* | 11/2002 | Fujisawa | A44B 18/0046 428/100 |
| 2005/0189811 | A1* | 9/2005 | Herrmann | A44B 18/0076 297/452.65 |
| 2010/0162535 | A1* | 7/2010 | Cheng | B29C 44/1261 24/306 |
| 2010/0176538 | A1* | 7/2010 | Nozawa | A44B 18/0076 264/402 |
| 2010/0181695 | A1* | 7/2010 | Murasaki | A44B 18/0076 264/176.1 |
| 2011/0062615 | A1 | 3/2011 | Murasaki et al. | |
| 2011/0192857 | A1* | 8/2011 | Rothbaum | B25F 1/00 220/694 |
| 2013/0149490 | A1* | 6/2013 | Cina | B32B 3/30 428/100 |
| 2015/0164186 | A1* | 6/2015 | Cina | A44B 18/0076 24/449 |

FOREIGN PATENT DOCUMENTS

| | | | |
|---|---|---|---|
| CN | 1443111 A | 9/2003 | |
| CN | 1537486 A | 10/2004 | |
| CN | 1942116 A | 4/2007 | |
| CN | 101791879 A | 8/2010 | |
| EP | 900030 A1 | 3/1999 | |
| EP | 1304941 A1 | 5/2003 | |
| EP | 1713355 A | 10/2006 | |
| EP | 2255944 A2 | 12/2010 | |
| EP | 2311344 A2 | 4/2011 | |
| FR | 2553156 A1 * | 4/1985 | ......... A44B 18/0076 |
| GB | 2364351 A | 1/2002 | |
| JP | 43705/1989 | 3/1989 | |
| JP | 2001-509698 A | 7/2001 | |
| JP | 2002-78512 A | 3/2002 | |
| JP | 2003-533314 A | 11/2003 | |
| JP | 2004-000321 A | 1/2004 | |
| JP | WO 2010052779 A1 * | 5/2010 | ......... A44B 18/0049 |
| JP | 2010-155045 A | 7/2010 | |
| JP | 2010-162339 A | 7/2010 | |
| JP | WO 2012025980 A1 * | 3/2012 | ......... A44B 18/0065 |
| JP | WO 2012120618 A1 * | 9/2012 | ......... A44B 18/0049 |
| JP | WO 2013005297 A1 * | 1/2013 | ......... A44B 18/0049 |
| KR | 10-1996-0006769 B | 5/1996 | |
| KR | 10-2002-0002273 A | 1/2002 | |
| KR | 10-2010-0076846 A | 7/2010 | |
| KR | 10-2010-0084988 A | 7/2010 | |
| WO | 98/20766 A1 | 5/1998 | |
| WO | 01/89338 A2 | 11/2001 | |
| WO | 2005/077219 A1 | 8/2005 | |
| WO | WO 2013061423 A1 * | 5/2013 | ......... A44B 18/0049 |

* cited by examiner

MOLDING HOOK AND LOOP FASTENER

This application is a national stage application of PCT/JP2011/065348, which is incorporated herein by reference.

TECHNICAL FIELD

The invention relates to a molding hook and loop fastener that is integrated to a surface of a foam body when the foam body is molded and a method for manufacturing the same. Specifically, the invention relates to a molding hook and loop fastener in which a plurality of surface fastener portions are connected by a coupling member formed of a resilient body and a foaming resin material is prevented from penetrating into an engaging element forming area during expansion molding and a method for manufacturing the same.

BACKGROUND ART

Passenger seats of automobiles or trains, various kinds of sofas, office chairs, and the like are often formed by attaching a skin material such as fiber fabric or natural or synthetic leather to the surface of a cushion body (foam body) molded in a predetermined shape by using a foaming resin material. The cushion body used in these various seats often has a curved surface composed of convex-concave shapes satisfying human engineering factors in order to maintain a seating posture which provides no fatigue despite long-hour seating.

Moreover, when a skin material is attached to the surface of a cushion body, after molding the cushion body in a desired shape, a method of covering and fixing a skin material to the surface of the obtained cushion body is often employed. In particular, in this case, a molding hook and loop fastener is generally used as means for fixing the surface of the cushion body and a rear surface of the skin material.

A molding hook and loop fastener has a configuration in which a plurality of engaging elements (male engaging elements) are disposed on one surface (first surface) of a base portion made from a thermoplastic resin, and such a molding hook and loop fastener is integrally molded so that the engaging elements are exposed to the surface of the cushion body when the cushion body is molded. Moreover, a plurality of engaging elements (female engaging elements) configured to be fastened to the engaging elements of the molding hook and loop fastener are formed on the rear surface of the skin material that covers the cushion body.

After the skin material is covered on the cushion body to which the molding hook and loop fastener is integrated, the female engaging elements disposed on the rear surface of the skin material are pressed against the male engaging elements of the molding hook and loop fastener exposed to the surface of the cushion body, whereby the skin material is fastened to the molding hook and loop fastener. In this manner, the skin material is easily fixed to the surface of the cushion body along the convex-concave shapes of the surface, and the skin material is prevented from floating from the cushion body.

In such a molding hook and loop fastener used for fixing the skin material and the cushion body, in order to stably secure required fastening strength, it is necessary to prevent a foaming resin material of a cushion body from flowing into an area (engaging element area), in which the engaging elements of the molding hook and loop fastener are formed, during the expansion molding of the cushion body to allow the engaging element area of the molding hook and loop fastener to be exposed to the surface of the cushion body.

Moreover, in such a molding hook and loop fastener, in order to fix the skin material along the convex-concave shape of the surface of the cushion body so as not to float, it is often necessary to integrally mold the molding hook and loop fastener itself to the cushion body in such a manner as to be bent in a width direction or a front-rear direction of the molding hook and loop fastener so as to match the surface shape of the cushion body.

In order to meet the above demands, a molding hook and loop fastener (locking member for mold-in molding) disclosed in JP 2004-321 A (Patent Document 1) and a molding hook and loop fastener (male surface fastener member) disclosed in JP 2010-162339 A (Patent Document 2) have been proposed, for example.

For example, as illustrated in FIG. 49, a molding hook and loop fastener 150 described in Patent Document 1 includes a linear locking portion (surface fastener portion) 151 in which a number of engaging elements 153 are disposed on a first surface of a base portion 152 and a synthetic resin foam layer 154 attached to a second surface of the locking portion 151. Moreover, the synthetic resin foam layer 154 is formed to be larger in the width direction than the locking portion 151, and a portion of the synthetic resin foam layer 154 protruding outside more than the locking portion 151 is configured as a sealing portion that adheres closely to a mold 155 when the molding hook and loop fastener 150 is placed in the mold 155. Further, in Patent Document 1, the synthetic resin foam layer 154 of the molding hook and loop fastener 150 has a thickness of 1 mm to 10 mm and initial compression deformation of 0.02 MPa to 1.0 MPa.

According to Patent Document 1, such a molding hook and loop fastener 150 is easily and reliably held in a recess 156 of the mold 155 used for molding a cushion body, and the sealing property between the mold 155 and the synthetic resin foam layer 154 of the molding hook and loop fastener 150 is excellent. Thus, it is possible to prevent a resin composition (foaming resin material) from flowing into the engaging element 153 of the molding hook and loop fastener 150. Since the molding hook and loop fastener 150 illustrated in FIG. 49 is linearly formed, it is not possible to curve the molding hook and loop fastener 150 in the width direction so as to be integrally molded to the cushion body.

Due to this, in Patent Document 1, as illustrated in FIG. 50, as a molding hook and loop fastener capable of being integrally molded to a cushion body in a state of being bent in a curved shape in the width direction, a molding hook and loop fastener 150a is also proposed in which a synthetic resin foam layer 154a is expanded and molded in a generally curved shape in advance, and a necessary number of locking portions (surface fastener portions) 151a are attached to the obtained synthetic resin foam layer 154a using an adhesive agent.

On the other hand, as illustrated in FIG. 51, a molding hook and loop fastener 160 disclosed in Patent Document 2 includes a plurality of surface fastener portions 161 having an engaging element area 165 that is surrounded by a vertical barrier portions 163 and lateral barrier portions 164 at the front and rear edges and a connecting portion 162 that connects the adjacent edges in the longitudinal direction of the surface fastener portions 161 with a predetermined gap.

Each surface fastener portion 161 includes a planar base portion 166, a plurality of hook-shaped engaging elements (male engaging elements) 167 that are erected on one surface of the base portion 166, right and left vertical barrier portions 163 that are erected on the right and left side edges of the base portion 166 along the longitudinal direction with the engaging elements 167 interposed, a lateral barrier portion 164 that is erected along the width direction between the right and left vertical barrier portions 163, protruding portions 168 that fix a monofilament that forms the connecting portion 162, and linear magnetic bodies 169 disposed along the longitudinal direction.

The plurality of engaging elements 167 disposed in each surface fastener portion 161 are arranged at predetermined intervals along the longitudinal direction and the width direction of the base portion 166. The vertical barrier portion 163 has three lines of vertical walls on each of the right and left sides, and each line of vertical walls includes a plurality of vertical walls 163a disposed at a predetermined pitch in the longitudinal direction. In this case, the vertical walls 163a of adjacent lines of wall portions are alternately disposed in a staggered form. Moreover, the lateral barrier portion 164 includes the engaging elements 167 arranged in the width direction and a plurality of lateral wall portions 164a disposed along the width direction.

The protruding portions 168 that fix the monofilament are formed so as to protrude in a block shape from the base portion 166 approximately at the center in the width direction of the surface fastener portion 161 and embed the monofilament over the entire area of the surface fastener portion 161. The linear magnetic bodies 169 disposed in the surface fastener portion 161 are fixed by having a portion of the linear magnetic bodies being embedded in a fixing portion 170 that protrudes in a block shape from the base portion 166.

The connecting portion 162 that connects the surface fastener portions 161 is formed of a linear monofilament made from a synthetic resin that is embedded in the protruding portions 168 of the surface fastener portions 161 as described above. Although this monofilament disposed in the area of the surface fastener portions 161 is embedded in the protruding portions 168, the monofilament in the gap between the adjacent surface fastener portions 161 is exposed to the outside, and a portion in which the monofilament is exposed forms the connecting portion 162. Since such a connecting portion 162 is disposed, the molding hook and loop fastener 160 can be easily bent in the width direction.

Such a molding hook and loop fastener 160 of Patent Document 2 can be adsorbed and fixed to a cavity surface of a mold so that the engaging elements 167 face the cavity surface by allowing the linear magnetic bodies 169 of the molding hook and loop fastener 160 to be attracted to the mold using the magnetic force of magnets provided in advance in the mold when the cushion body is expanded and molded using the mold.

In this case, since the connecting portion 162 (monofilament) that connects the surface fastener portions 161 can be easily bent, the molding hook and loop fastener 160 can be adsorbed and fixed to the cavity surface of the mold in a curved state in the width direction or the front-rear direction and be integrally molded to the cushion body in the curved shape.

Moreover, the molding hook and loop fastener 160 is configured such that the engaging element area 165 in which the plurality of engaging elements 167 are disposed is surrounded by the vertical barrier portion 163 and the lateral barrier portions 164. In particular, in Patent Document 2, the vertical barrier portion 163 includes a plurality of vertical walls (divided walls) 163a disposed in a staggered form at a predetermined pitch and each vertical wall 163a is arranged to be away from each other.

In this case, when the cushion body is expanded and molded, the foaming resin material tries to penetrate into the engaging element area 165 through the gap formed between the vertical walls 163a of the vertical barrier portion 163. However, since the flowing resistance of the foaming resin material increases due to each vertical wall 163a, the foaming resin material is expanded and solidified before reaching the engaging element area 165 and is thus prevented from penetrating into the engaging element area 165.

In this manner, in the molding hook and loop fastener 160 of Patent Document 2, it is possible to prevent the foaming resin material from penetrating into the engaging element area 165 by flowing over the vertical barrier portion 163 and the lateral barrier portion 164 during the expansion molding of the cushion body and to stably secure the fastening strength of the engaging elements 167 of the molding hook and loop fastener 160 that is integrally molded to the cushion body.

PRIOR ART DOCUMENT

Patent Documents

Patent Document 1: JP 2004-321 A
Patent Document 2: JP 2010-162339 A

SUMMARY OF INVENTION

Problems to be Solved by the Invention

In seats arranged in automobiles and trains, cushion bodies having various shapes and sizes are used and the foaming resin materials that form the cushion bodies are different depending on the purpose of seats, the position where the seats are used, and the manufacturer and the like of the seats.

On the other hand, the molding hook and loop fastener 150a of Patent Document 1 illustrated in FIG. 50 can be integrally molded to the cushion body by being bent in the width direction so as to match the convex-concave shapes of the surface of the cushion body as described above.

However, since this molding hook and loop fastener 150a is expanded and molded in a state where the synthetic resin foam layer 154a is generally bent in a curved shape in advance, although the molding hook and loop fastener 150a can be appropriately integrally molded to a cushion body having a certain fixed shape, it is difficult to cope with cushion bodies having different shapes. Thus, the molding hook and loop fastener 150a designed for such a curved shape has a problem of low versatility because it is necessary to prepare synthetic resin foam layers 154a separately molded for each cushion body having different shapes.

Moreover, when the molding hook and loop fastener 150a is integrally molded to the cushion body, recessed grooves (trenches) in which the molding hook and loop fastener 150a is provided are formed in predetermined positions of the cushion body and the molding hook and loop fastener 150a is fixed to bottom surfaces of the recessed grooves. In this case, it is necessary to form projections for forming the recessed grooves (trenches) on the cavity surface of the mold used for molding the cushion body and to form an accommodation recess for accommodating the engaging elements of the molding hook and loop fastener 150a in the top faces of the projections. Thus, there is a problem that it is difficult to manufacture the mold.

Further, when the molding hook and loop fastener 150a is placed on the projections of the mold, a single long accommodation recess may be formed in the top faces of the projections so that the plurality of locking portions 151a (surface fastener portions) of the molding hook and loop fastener 150a are accommodated in the long accommodation recess. Alternatively, a plurality of accommodation recesses corresponding to the locking portions 151a of the molding hook and loop fastener 150a may be formed in the top faces of the projections of the mold so that the locking portions 151a of the molding hook and loop fastener 150a are accommodated in the accommodation recesses, respectively.

As clearly disclosed in Patent Document 1, when a single long accommodation recess is formed in the top faces of the projections of the mold, for example, the operation of accommodating the plurality of locking portions 151a of the molding hook and loop fastener 150a in the accommodation recess of the projections and placing the molding hook and loop fastener 150a in the mold is easy. However, there is a problem in that the sealing property between the mold and the synthetic resin foam layer 154a between the locking portions 151a of the molding hook and loop fastener 150a decreases and it is not possible to completely prevent the foaming resin material from flowing into the accommodation recess during the expansion molding of the cushion body.

In particular, when the foaming resin material has low viscosity, there is another problem that the foaming resin material is more likely to flow into the accommodation recess. Moreover, for example, in expansion molding of the cushion body, the foaming resin material is injected from an injection nozzle while the injection nozzle moves relative to the mold. However, in this case, the foaming resin material may sometimes be injected from an inclined direction in relation to the molding hook and loop fastener 150a. In this case, the synthetic resin foam layer 154a of the molding hook and loop fastener 150a may be separated (turned up) from the mold and the foaming resin material may flow into the accommodation recess.

On the other hand, for example, when a plurality of accommodation recesses corresponding to the locking portions 151a of the molding hook and loop fastener 150a are formed in the top faces of the projections of the mold, it is necessary to accommodate the locking portions 151a in the respective accommodation recesses while accurately adjusting the positions of each locking portion 151a of the molding hook and loop fastener 150a when placing the molding hook and loop fastener 150a on the projections of the mold. Thus, there is a problem that the operation of setting the molding hook and loop fastener 150a in the mold takes time and labor and the operation efficiency decreases.

Moreover, the molding hook and loop fastener 160 of Patent Document 2 can be easily bent in the width direction or the front-rear direction since the adjacent surface fastener portions 161 are connected by the flexible connecting portion 162. Due to this, the molding hook and loop fastener 160 has advantages in that it can be easily applied to cushion bodies of various shapes and has high versatility.

Further, in the molding hook and loop fastener 160 of Patent Document 2, although the vertical barrier portion 163 includes a plurality of divided vertical walls 163a as described above, the vertical walls 163a are arranged in a staggered form so as to increase the flowing resistance of the foaming resin material. Thus, the foaming resin material can be solidified before reaching the engaging element area 165, and the foaming resin material is prevented from penetrating into the engaging element area 165.

However, in such a molding hook and loop fastener 160 of Patent Document 2, for example, when the foaming resin material has very low viscosity and when the foaming resin material is injected from an inclined direction in relation to the molding hook and loop fastener 160 to directly collide with the vertical barrier portion 163 of the molding hook and loop fastener 160, even if the flowing resistance of the foaming resin material is increased in the vertical barrier portion 163, the foaming resin material may sometimes reach and penetrate into the engaging element area 165. Thus, it is difficult to obtain a desired fastening strength that is intended in the engaging element area 165.

Moreover, although the molding hook and loop fastener 160 of Patent Document 2 is configured to be bent in the front-rear direction or the width direction as described above by bending the connecting portion 162 connecting the surface fastener portions 161, it is difficult to bend each surface fastener portion 161 itself and it is not possible to appropriately curve each surface fastener portion 161.

Due to this, in the mold used for molding the cushion body, for example, when the top faces of the projections that adsorb and fix the molding hook and loop fastener 160 are bent greatly in the front-rear direction, although it is possible to curve the entire molding hook and loop fastener 160 along the projections, a gap may be formed between the molding hook and loop fastener 160 and the top faces of the projections at the front and rear ends of the respective surface fastener portions 161. In this case, during the expansion molding of the cushion body, the foaming resin material may penetrate into the engaging element area 165 of the surface fastener portion 161 through the gap formed at the front and rear ends of the surface fastener portion 161.

The invention has been made in view of the problems of the conventional technique, and a specific object of the invention is to provide a molding hook and loop fastener which is configured to be bent in a front-rear direction or a width direction, has high versatility, and is capable of preventing a foaming resin material from penetrating into an engaging element forming area during the expansion molding of a cushion body and stably securing fastening strength of engaging elements.

Means for Solving the Problems

In order to achieve the above object, a molding hook and loop fastener provided by the invention includes: a plurality of surface fastener portions in which a plurality of engaging elements are erected on a first surface of a base portion and an engaging element area is formed; and a flexible coupling member that connects the plurality of surface fastener portions in a state where central positions in a width direction of each surface fastener portion is disposed on a straight line along a longitudinal direction, the molding hook and loop fastener being integrally molded to a surface of a cushion body when the cushion body is expanded and molded as a fundamental configuration, and the coupling member is formed of a resilient body, and includes a pair of vertical wall coupling portions which is continuously disposed along the longitudinal direction of the molding hook and loop fastener on both sides of the engaging element area of the base portion and which connects the plurality of surface fastener portions and prevents a foaming resin material of the cushion body from penetrating into the engaging element area from the width direction during the expansion molding as a most principal configuration.

In the molding hook and loop fastener according to the invention, it is preferable that the coupling member is attached to the first surface of the base portion.

Further, it is preferable that the coupling member includes a penetration preventing lateral wall portion which is disposed on both end portions in the longitudinal direction of the molding hook and loop fastener so as to extend between the pair of vertical wall coupling portions and which prevents the foaming resin material from penetrating into the engaging element area from the longitudinal direction.

Further, it is preferable that the coupling member includes a lateral wall coupling portion which is disposed between the adjacent surface fastener portions so as to extend between the pair of vertical wall coupling portions and which connects the surface fastener portions. In this case, it is more preferable that the lateral wall coupling portion is formed between the surface fastener portions so as to extend from a second surface side of the base portion to the first surface side and is attached to side surfaces of each surface fastener portion.

Furthermore, it is preferable that the coupling member includes an anchoring portion attached to the second surface of the base portion of each surface fastener portion, and the anchoring portion is continuously disposed in the entire longitudinal direction of the molding hook and loop fastener. Particularly, it is preferable that the vertical wall coupling portion, the lateral wall coupling portion, and the anchoring portion are formed of the same material and are integrated.

Further, in the molding hook and loop fastener according to the invention, it is preferable that recesses or projections are formed on the second surface of the base portion.

Further, it is preferable that the surface fastener portion includes a vertical barrier portion that includes at least one line of vertical walls between the engaging element area and the vertical wall coupling portion, and in this case, it is preferable that the vertical wall coupling portion and the vertical barrier portion are attached.

Further, in this case, it is preferable that the engaging elements are disposed at a predetermined pitch in the width direction of the base portion, and a lateral barrier wall is disposed along the width direction between the vertical barrier portion and the engaging elements and between the engaging elements adjacent to each other in the width direction.

In the molding hook and loop fastener according to the invention, it is preferable that a height dimension of the vertical wall coupling portion from the first surface of the base portion is set to be larger than a height dimension of the engaging element from the first surface of the base portion.

Further, in the molding hook and loop fastener according to the invention, it is preferable that a portion of the surface fastener portion is embedded in the coupling member. Furthermore, the surface fastener portion may be attached to the coupling member by an adhesive layer.

Further, in the molding hook and loop fastener according to the invention, it is preferable that a base connecting portion that connects the base portions of the adjacent surface fastener portions is integrally disposed in the surface fastener portion.

Furthermore, it is preferable that the coupling member is formed of a foam body or an elastomer.

Next, a method for manufacturing a molding hook and loop fastener according to a first aspect of the invention includes: a plurality of surface fastener portions in which a plurality of engaging elements are erected on a first surface of a base portion and an engaging element area is formed; and a coupling member that connects the plurality of surface fastener portions, in which the plurality of surface fastener portions are disposed so that central positions in a width direction of the surface fastener portions are disposed on a straight line along a longitudinal direction and is connected by the coupling member, the molding hook and loop fastener being integrally molded to a surface of a cushion body during the expansion molding of the cushion body as a fundamental configuration, and the method includes: conveying upper and lower conveyer belts of a conveying portion at a predetermined speed, the conveying portion including the upper conveyer belt, the lower conveyer belt, and a molding space portion disposed between the upper and lower conveyer belts to mold the coupling member; sequentially supplying the plurality of surface fastener portions to the conveying portion and introducing a synthetic resin material that forms the coupling member; and continuously expanding and molding the coupling member in the longitudinal direction of the molding hook and loop fastener on both sides of the engaging element area of at least the base portion while conveying the surface fastener portion in the upper and lower conveyer belts so that the plurality of surface fastener portions are connected as a most principal configuration.

The method for manufacturing a molding hook and loop fastener according to the invention preferably includes: supplying the surface fastener portion to the molding space portion by causing the surface fastener portion to be adsorbed to the lower conveyer belt using magnetic force; injecting the synthetic resin material into the lower conveyer belt to which the surface fastener portion is adsorbed; and causing the lower conveyer belt to be attached to the upper conveyer belt to form the molding space portion and performing expansion molding in the molding space portion.

Further, the method for manufacturing a molding hook and loop fastener according to the invention may include: injecting the synthetic resin material into the lower conveyer belt; causing the surface fastener portion to be adsorbed to the upper conveyer belt using magnetic force; and causing the lower conveyer belt in which the synthetic resin material is injected to be attached to the upper conveyer belt to which the surface fastener portion is adsorbed to form the molding space portion and performing expansion molding in the molding space portion.

Furthermore, a method for manufacturing a molding hook and loop fastener according to a second aspect of the invention includes: a plurality of surface fastener portions in which a plurality of engaging elements are erected on a first surface of a base portion and an engaging element area is formed; and a coupling member that connects the plurality of surface fastener portions, in which the plurality of surface fastener portions are disposed so that central positions in a width direction of each surface fastener portion are disposed on a straight line along a longitudinal direction and is connected by the coupling member, the molding hook and loop fastener being integrally molded to a surface of a cushion body during expansion molding of the cushion body as a fundamental configuration, and the method includes: expanding and molding a long temporary coupling member using a synthetic resin material that forms the coupling member; forming a plurality of concave portions on a first surface of the temporary coupling member at a predetermined interval along the longitudinal direction to mold the coupling member; applying an adhesive agent to the concave portions of the coupling member; and supplying the surface fastener portion to the concave portion to which the adhesive agent is applied so that the surface fastener portion is attached to the concave portion as a most principal configuration.

Further, the method for manufacturing a molding hook and loop fastener according to the first and second aspect of the invention preferably includes cutting the coupling member to a predetermined length after the coupling member is molded.

Further, according to the invention, there is provided a method for manufacturing a cushion body being characterized in that expansion molding is performed in a state where the molding hook and loop fastener manufactured by the manufacturing method having the above configuration is attached to a cavity surface of a mold to manufacture a cushion body to which the molding hook and loop fastener is attached.

Effects of the Invention

The molding hook and loop fastener according to the invention includes a plurality of surface fastener portions that include an engaging element area and a coupling member that is formed of a flexible resilient body and connects these surface fastener portions. Moreover, the coupling member includes a pair of vertical wall coupling portions that is continuously disposed on both right and left sides of the engaging element area of the base portion so as to extend along the longitudinal direction of the molding hook and loop fastener. The plurality of surface fastener portions are connected by the vertical wall coupling portion of the coupling member in a state where the central positions in the width direction are arranged on a straight line along the longitudinal direction.

According to such a molding hook and loop fastener of the invention, since the coupling member (vertical wall coupling portion) can be bent between the surface fastener portions, it is possible to prevent the resin material from penetrating from the width direction and to easily bend the molding hook and loop fastener in the front-rear direction and the width direction. Due to this, the molding hook and loop fastener can easily cope with cushion bodies of various shapes while maintaining fastening strength and have high versatility.

In particular, according to the molding hook and loop fastener of the invention, for example, even when such an accommodation recess as disclosed in Patent Document 1 is not formed on the top face of the projection of the mold used for performing expansion molding of the cushion body, by placing the molding hook and loop fastener on the top face of the projection so that the engaging elements face the top face, it is possible to allow the vertical wall coupling portion of the molding hook and loop fastener to be attached to the top face of the projection and to prevent the foaming resin material from penetrating into the engaging element area in the vertical wall coupling portion. Therefore, according to the invention, it is possible to facilitate the operation of manufacturing a mold used for molding the cushion body as compared to the case of Patent Document 1. Moreover, the operation of setting the molding hook and loop fastener on the mold can be performed in a simple manner, and the workability of attaching the molding hook and loop fastener to the mold is excellent.

Further, in the invention, since the vertical wall coupling portion that prevents penetration of the foaming resin material is formed of a flexible resilient body, even when the top face of the projection of the mold used for molding the cushion body is bent in the front-rear direction, for example, it is possible to allow the vertical wall coupling portion to be stably attached to the top face of the projection of the mold. Thus, it is possible to prevent a gap from being formed between the vertical wall coupling portion and the top face of the projection of the mold and to completely block, by the vertical wall coupling portion, an area on the outer side of the vertical wall coupling portion and the engaging element area on the inner side of the vertical wall coupling portion.

Due to this, for example, even when the foaming resin material of the cushion body has very low viscosity and the foaming resin material is injected from an inclined direction in relation to the molding hook and loop fastener to directly collide with the vertical wall coupling portion, the vertical wall coupling portion can effectively prevent the foaming resin material from penetrating into the engaging element area. As a result, a desired fastening strength as expected in the engaging element forming area of the molding hook and loop fastener can be stably secured.

In the molding hook and loop fastener of the invention, the coupling member is attached to the first surface side of the base portion in which the engaging elements of the surface fastener portion are disposed. Due to this, it is possible to stably connect the plurality of surface fastener portions and to more effectively prevent the foaming resin material of the cushion body from penetrating into the engaging element area.

In the invention, the coupling member includes the penetration preventing lateral wall portion that is disposed on both end portions in the longitudinal direction of the molding hook and loop fastener so as to extend between the pair of lateral wall coupling portions. Due to this, when the molding hook and loop fastener is placed on the top face of the projection of the mold used for molding the cushion body, it is possible to allow the penetration preventing lateral wall portion to be stably attached to the top face of the projection of the mold. As a result, it is possible to prevent the foaming resin material from penetrating into the engaging element area of the surface fastener portion from the longitudinal direction.

Moreover, in the invention, the coupling member includes the lateral wall coupling portion that is disposed between the adjacent surface fastener portions so as to extend between the pair of vertical wall coupling portions and to connect between the surface fastener portions. Due to this, it is possible to more stably connect the adjacent surface fastener portions by the coupling member, to increase the strength of the coupling member, and to prevent the coupling member from being cut between the surface fastener portions. Moreover, since such a lateral wall coupling portion is provided, it is possible to increase the rigidity of the coupling member and to prevent the vertical wall coupling portion from being inclined toward the outer side in the width direction. As a result, it is possible to more stably prevent the foaming resin material from penetrating into the engaging element area by flowing over the vertical wall coupling portion.

In particular, in this case, the lateral wall coupling portion is formed between the surface fastener portions so as to extend from the second surface side to the first surface side of the base portion and is attached to the side surfaces of each surface fastener portion. Due to this, it is possible to further increase the rigidity between the surface fastener portions.

Here, for example, when the coupling member has low rigidity, the molding hook and loop fastener is easily bent (easily crooked) between the surface fastener portions. Thus, there is a problem in that, when the molding hook and loop fastener is set on the top face of the projection of the mold, the positions of the respective portions of the molding hook and loop fastener are likely to be misaligned in relation to the top face of the projection. On the other hand, by forming the lateral wall coupling portion as described above to increase the rigidity of the coupling member, it is possible to facilitate alignment of the molding hook and loop fastener in relation to the top face of the projection when the molding hook and loop fastener is set on the top face of the projection of the mold and to perform attachment of the molding hook and loop fastener in a short time and in a simpler manner. Therefore, it is possible to further improve the workability of attaching the molding hook and loop fastener.

Further, in the invention, the coupling member includes the anchoring portion that is attached to the second surface of the base portion of each surface fastener portion, and the anchoring portion is continuously disposed in the entire longitudinal direction of the molding hook and loop fastener. Since the surface fastener portion has such an anchoring portion, it is possible to further increase the bonding strength (fastening strength) between the coupling member and the surface fastener portion.

In particular, in this case, since the vertical wall coupling portion and the anchoring portion of the coupling member are integrated, it is possible to further increase the bonding strength between the coupling member and the surface fastener portion, to increase the strength of the coupling member, and to prevent the cutting of the coupling member.

Furthermore, in the invention, recesses or projections are formed on the second surface of the base portion. Due to this, it is possible to effectively increase the bonding strength between the base portion of the surface fastener portion and the anchoring portion of the coupling member or the fastening strength between the base portion and the bottom surface portion of the recessed groove of the cushion body.

Moreover, in the invention, the surface fastener portion includes the vertical barrier portion that includes at least one line of vertical walls between the engaging element area and the vertical wall coupling portion. Due to this, it is possible to more reliably prevent the foaming resin material from penetrating into the engaging element area from the width direction when the cushion body is expanded and molded. Moreover, since the vertical barrier portion is disposed on the outer side of the engaging element area, it is possible to prevent a synthetic resin material from penetrating into the engaging element area when the vertical wall coupling portion of the coupling member is molded over a plurality of surface fastener portions using the synthetic resin material during manufacturing of the molding hook and loop fastener, for example.

In this case, since the vertical wall coupling portion and the vertical barrier portion are attached to each other, it is possible to further increase the bonding strength (fastening strength) between the coupling member and the surface fastener portion. Moreover, it is possible to prevent the vertical wall coupling portion of the molding hook and loop fastener from being tilted toward the outer side to be away from the vertical barrier portion of the surface fastener portion when the molding hook and loop fastener is placed on the top face of the projection of the mold and adsorbed and fixed by magnetic force. Moreover, it is possible to reliably prevent the foaming resin material from penetrating into the engaging element area.

Moreover, the engaging elements are disposed at a predetermined pitch in the width direction of the base portion, and a lateral barrier wall is disposed along the width direction between the vertical barrier portion and the engaging elements and between the engaging elements adjacent to each other in the width direction. Due to this, the engaging element and the lateral barrier wall disposed between a pair of vertical barrier portions form the lateral barrier portion. Due to this, when the cushion body is expanded and molded, it is possible to prevent the foaming resin material from penetrating into the engaging element area from the longitudinal direction. Moreover, since the lateral barrier portion is formed between a pair of vertical barrier portions, for example, when the coupling member is molded over a plurality of surface fastener portions using a synthetic resin material during manufacturing of the molding hook and loop fastener, it is possible to prevent the synthetic resin material from penetrating into the engaging element area from the longitudinal direction.

Further, in the invention, a height dimension of the vertical wall coupling portion from the first surface of the base portion is set to be larger than a height dimension of the engaging element from the first surface of the base portion. Due to this, when the cushion body is expanded and molded, the penetration of the foaming resin material into the engaging element area from the width direction is reliably prevented by the vertical wall coupling portion.

In the invention, a portion of the surface fastener portion is embedded in the coupling member. Due to this, the plurality of surface fastener portions are attached to the coupling member more tightly.

Moreover, in the invention, the surface fastener portion may be attached to the coupling member by an adhesive layer. Due to this, the plurality of surface fastener portions are attached to the coupling member more tightly.

Further, in the invention, a base connecting portion that connects between the base portions of the adjacent surface fastener portions is integrally disposed in the surface fastener portion. When the plurality of surface fastener portions are connected by the base connecting portion as well as the coupling member, it is possible to increase the rigidity of the entire molding hook and loop fastener. Therefore, it is possible to facilitate the alignment of the molding hook and loop fastener in relation to the top face of the projection when the molding hook and loop fastener is set on the top face of the projection of the mold. Thus, it is possible to further improve the workability of attaching the molding hook and loop fastener.

Furthermore, in the invention, since the coupling member is formed of a foam body or an elastomer, it is possible to reliably connect the plurality of surface fastener portions and to easily bend the coupling member. Due to this, the molding hook and loop fastener can be easily bent in the front-rear direction and the width direction. In particular, when the coupling member is formed of a foam body, it is possible to allow the surface (upper surface) of the coupling member to be stably attached to the top face of the projection of the mold when the molding hook and loop fastener is adsorbed and fixed to the top face of the projection of the mold using magnetic force. Thus, the coupling member can reliably prevent the foaming resin material from penetrating into the engaging element area.

Next, the method for manufacturing a molding hook and loop fastener according to the first aspect of the invention includes conveying the upper and lower conveyer belts of the conveying portion at a predetermined speed and sequentially supplying the plurality of surface fastener portions one by one to the conveying portion including the upper conveyer belt, the lower conveyer belt, and the molding space portion disposed between the upper and lower conveyer belts to mold the coupling member and introducing the synthetic resin material that forms the coupling member to perform expansion molding.

Due to this, it is possible to continuously mold the coupling member in the longitudinal direction of the molding hook and loop fastener so as to extend over a plurality of surface fastener portions. Thus, it is possible to continuously and stably manufacture the molding hook and loop fastener in which a plurality of surface fastener portions are connected by the coupling member in a state where the central positions in the width direction of each surface fastener portion are arranged on the straight line along the longitudinal direction.

In particular, the manufacturing method of the invention includes supplying the surface fastener portion to the molding space portion by causing the surface fastener portion to be adsorbed to the lower conveyer belt using magnetic force; injecting the synthetic resin material into the lower conveyer belt to which the surface fastener portion is adsorbed; and causing the lower conveyer belt to be attached to the upper conveyer belt to form the molding space portion and performing expansion molding in the molding space portion. Due to this, it is possible to reliably mold the coupling member along the longitudinal direction so as to extend over a plurality of surface fastener portions, and to continuously manufacture the molding hook and loop fastener according to the invention.

Moreover, the manufacturing method of the invention may include injecting the synthetic resin material into the lower conveyer belt; causing the surface fastener portion to be adsorbed to the upper conveyer belt using magnetic force; and causing the lower conveyer belt in which the synthetic resin material is injected to be attached to the upper conveyer belt to which the surface fastener portion is adsorbed to form the molding space portion and performing expansion molding in the molding space portion. Due to this, it is possible to reliably mold the coupling member along the longitudinal direction so as to extend over a plurality of surface fastener portions, and to continuously manufacture the molding hook and loop fastener according to the invention.

The method for manufacturing a molding hook and loop fastener according to the second aspect of the invention involves expanding and molding the long temporary coupling member using a synthetic resin material that forms the coupling member and forming a plurality of concave portions on the first surface of the molded temporary coupling member at a predetermined interval along the longitudinal direction to mold the coupling member. After that, an adhesive agent is applied to each concave portion of the obtained coupling member, and then, the surface fastener portion is supplied and attached to the concave portion to which the adhesive agent is applied. Due to this, it is possible to continuously and stably manufacture the molding hook and loop fastener in which a plurality of surface fastener portions are connected by the coupling member in a state where the central positions in the width direction of each surface fastener portion are arranged on the straight line along the longitudinal direction.

The method for manufacturing a molding hook and loop fastener according to the first and second aspects of the invention includes cutting the coupling member to a predetermined length after the coupling member is molded. Due to this, it is possible to manufacture a molding hook and loop fastener having a predetermined length corresponding to the shape and size of the cushion body.

According to the invention, there is provided a method for manufacturing a cushion body in which expansion molding is performed in a state where the molding hook and loop fastener manufactured according to the method for manufacturing a molding hook and loop fastener having the above configuration is attached to a cavity surface of a mold to manufacture a cushion body to which the molding hook and loop fastener is attached. By using such a method for manufacturing the cushion body, it is possible to stably manufacture a cushion body having the molding hook and loop fastener attached thereto in which foaming resin does not penetrate into the engaging element area of the molding hook and loop fastener and predetermined fastening strength of the engaging element is secured.

After a skin material is covered on the cushion body manufactured according to the invention, the engaging elements (female engaging elements) disposed on the rear surface of the skin material are pressed against the engaging elements (male engaging elements) of the molding hook and loop fastener that is integrally molded to the cushion body, whereby the skin material is reliably fastened to the molding hook and loop fastener, and the skin material is prevented from floating from the cushion body.

MODES FOR CARRYING OUT THE INVENTION

Hereinafter, modes for carrying out the invention will be described in detail with reference to the drawings.

First Embodiment

Figure 1:
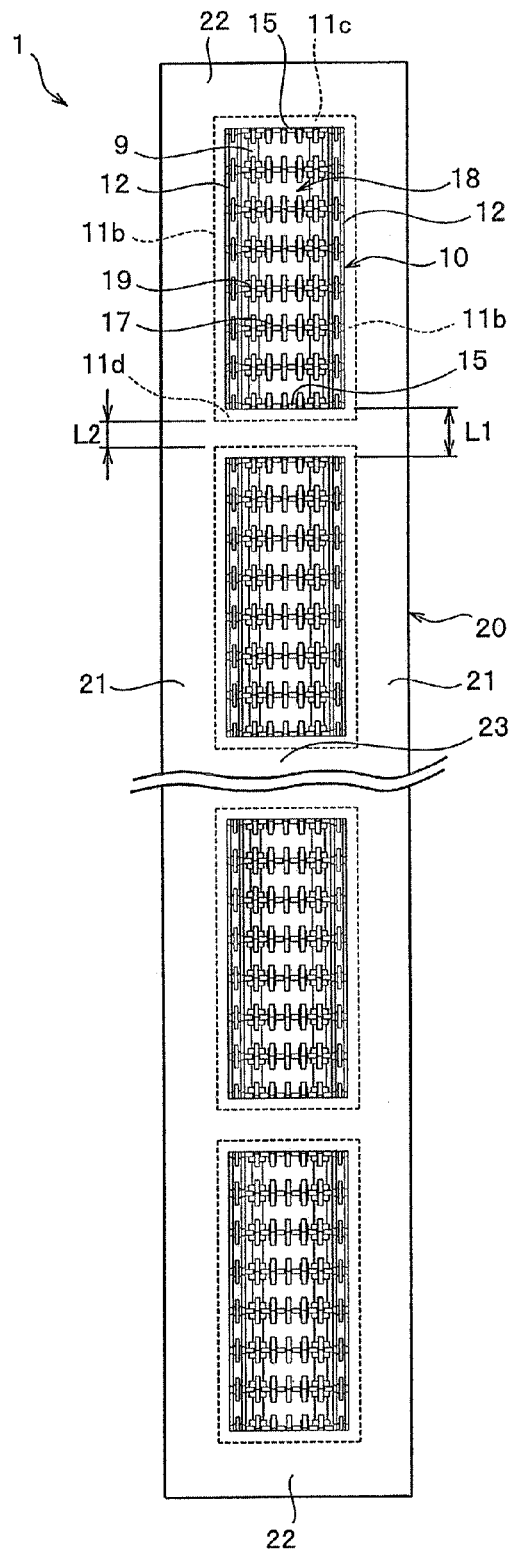
FIG. 1 is a plan view illustrating a molding hook and loop fastener according to a first embodiment of the invention.
Figure 2:
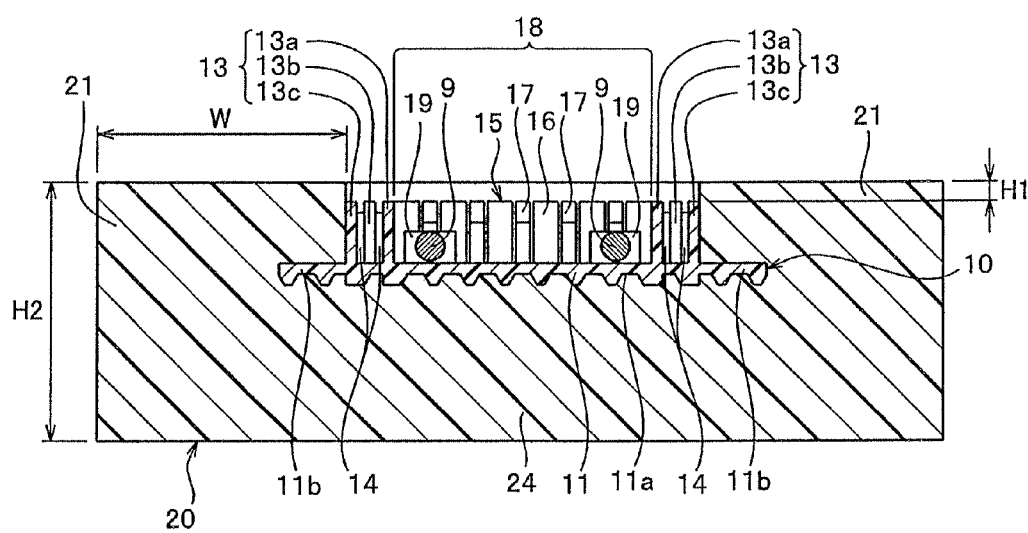
FIG. 2 is a cross-sectional view of the molding hook and loop fastener.
Figure 3:
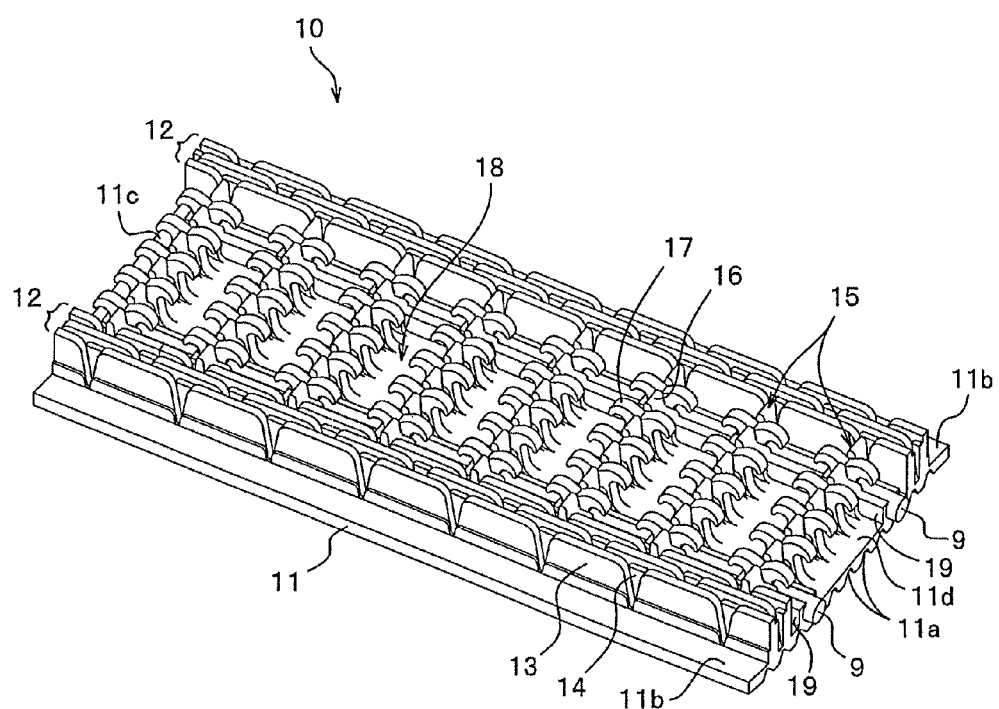
FIG. 3 is a perspective view illustrating only a surface fastener portion that constitutes the molding hook and loop fastener.

FIG. 1 is a plan view illustrating a molding hook and loop fastener according to a first embodiment, and FIG. 2 is a cross-sectional view of the molding hook and loop fastener. Moreover, FIG. 3 is a perspective view illustrating only a surface fastener portion that constitutes the molding hook and loop fastener.

In the following description, a longitudinal direction of a base portion of the molding hook and loop fastener will be defined as a forward-backward direction, and a width direction of the base portion will be defined as a horizontal direction. Moreover, a front-rear direction of the base portion will be defined as a vertical direction, and in particular, a direction toward a side of the base portion where engaging elements are disposed is defined as an upper direction, and the opposite direction is defined as a lower direction.

A molding hook and loop fastener 1 according to the first embodiment includes a plurality of surface fastener portions 10 that are divided from each other and a coupling member 20 that connects these surface fastener portions 10, in which each surface fastener portion 10 is separated from each other at a predetermined distance and are connected by the coupling member 20 so that central positions in a width direction of the respective surface fastener portions are disposed on a straight line along a longitudinal direction. In this case, the number of surface fastener portions 10 is not particularly limited but is optionally set according to a size, a shape, and the like of a cushion body to which the molding hook and loop fastener 1 is integrally molded.

Here, in the invention, the fact that the central positions in the width direction of each surface fastener portion 10 are disposed on a straight line along the longitudinal direction can be rephrased that each surface fastener portion 10 is disposed so that the longitudinal directions of each surface fastener portion 10 are parallel to each other.

Each surface fastener portion 10 of the molding hook and loop fastener 1 is formed by molding a thermoplastic resin material using a die wheel 31 as described later. As a material of the surface fastener portion 10, a thermoplastic resin material such as polyethylene, polypropylene, polyester, nylon, polybutylene terephthalate, or copolymers thereof can be used.

As illustrated in FIG. 3, each surface fastener portion 10 includes a planar base portion 11, right and left vertical barrier portions 12 that are erected on an upper surface of the base portion 11, a plurality of engaging elements (male engaging elements) 17 disposed between the right and left vertical barrier portions 12, a plurality of lateral barrier walls 16 that constitute the lateral barrier portion 15 together with the engaging element 17, a linear magnetic body 9 fixed to the upper surface of the base portion 11 along the longitudinal direction, and a fixing portion 19 that fixes the linear magnetic body 9.

The base portion 11 of the surface fastener portion 10 has a thin plate shape that has a rectangular shape that extends in the forward-backward direction (longitudinal direction) when seen from the vertical direction and is configured to be bendable in the vertical direction (front-rear direction). A plurality of recessed grooves 11a disposed in parallel in the forward-backward direction are formed on the lower surface of the base portion 11.

Since the plurality of recessed grooves 11a are disposed on the lower surface of the base portion 11, it is possible to increase a bonding area between the surface fastener portion 10 and an anchoring portion (lower surface portion) 24 described later of the coupling member 20 and to increase the fastening strength between the surface fastener portion 10 and the coupling member 20. In the invention, in order to increase the fastening strength between the surface fastener portion 10 and the coupling member 20, instead of the recessed groove 11a, for example, projecting portions, arrowhead-shaped projections, or the like may be formed on the lower surface of the base portion 11, or non-woven fabrics may be attached or fixed to the lower surface of the base portion.

The vertical barrier portions 12 are erected along the forward-backward direction on the right and left side edges of the surface fastener portion 10 so that an engaging element area 18 (that is, an area where the plurality of engaging elements 17 are erected) is interposed. In this case, the right and left vertical barrier portions 12 are disposed at positions that are recessed inward in the width direction from the right and left edges of the base portion 11.

Moreover, in the first embodiment, the right and left vertical barrier portions 12 each have three lines of vertical walls, and each line of vertical walls includes a plurality of vertical walls 13 disposed at a predetermined pitch in the longitudinal direction. Moreover, a vertical wall coupling portion 14 is disposed in the vertical barrier portion 12 so as to connect between vertical walls 13 disposed in lines of vertical walls that are adjacent in the width direction.

Here, vertical walls 13 disposed on a line of vertical walls of the vertical barrier portion 12 disposed closest to the engaging element 17 are referred to as a first line of vertical walls 13a, vertical walls 13 on a line of vertical walls disposed on the outer side of the first line of vertical walls 13a are referred to as a second line of vertical walls 13b, and vertical walls 13 on a line of vertical walls disposed on the outermost side are referred to as a third line of vertical walls 13c. In the invention, the shape of the vertical walls 13 that constitute the vertical barrier portion 12 and the number of arrangements (the number of lines of vertical walls) are not particularly limited.

Each line of vertical walls 13 is intermittently disposed with a predetermined mounting pitch in the longitudinal direction, and a predetermined gap is formed between each vertical wall 13. In the first embodiment, the second line of vertical walls 13b is disposed at a position corresponding to the gap formed between the first and third lines of vertical walls 13a and 13c, and the first to third lines of vertical walls 13a to 13c are disposed in a staggered form so that the vertical walls are alternately arranged between the respective lines of vertical walls. In this case, the shape and size of all vertical walls 13 disposed in the vertical barrier portion 12 and the size of the gap between the vertical walls 13 are the same.

Moreover, the vertical wall coupling portion 14 of the vertical barrier portion 12 is disposed between the first and third lines of vertical walls 13a and 13c and the second line of vertical walls 13b and connects the front end portion and the rear end portion of the first and third lines of vertical walls 13a and 13c and the central portion in the longitudinal direction of the second line of vertical walls 13b. A height dimension (dimension in the vertical direction) of the connecting portion is set to be lower than that of the first to third lines of vertical walls 13a to 13c. Moreover, a width dimension (dimension in the horizontal direction) of the connecting portion is set to be the same as a gap in the width direction between the first and third lines of vertical walls 13a and 13c and the second line of vertical walls 13b.

Since the vertical barrier portion 12 of the first embodiment has the configuration described above, when the coupling member 20 is expanded and molded so that the plurality of surface fastener portions 10 are connected as described later in order to manufacture the molding hook and loop fastener 1, it is possible to prevent the synthetic resin material of the coupling member 20 from penetrating into the engaging element area 18 by flowing over the vertical barrier portion 12. Moreover, in the vertical barrier portion 12, by broadening or narrowing the gap formed between the vertical walls 13 of the respective lines of vertical walls, it is possible to bend the molding hook and loop fastener 1 in the vertical direction.

The engaging elements 17 are arranged with a predetermined mounting pitch in the longitudinal direction and the width direction and are erected on the upper surface of the base portion 11 so that fastening strength between the engaging elements 17 and a skin material that covers the cushion body is obtained. In particular, in the case of the first embodiment, engaging elements 17 are arranged in five lines in the width direction between the right and left vertical barrier portions 12. In this case, the engaging element area 18 of each surface fastener portion 10 is formed so as to be surrounded by the right and left vertical barrier portions 12, a lateral barrier portion 15 disposed on the frontmost side, and a lateral barrier portion 15 disposed on the rearmost side.

Moreover, each engaging element 17 includes a rising portion that rises vertically from the upper surface of the base portion 11 and a hook-shaped engaging head that branches in the forward-backward direction from the upper end of the rising portion and is bent. Further, a height dimension (dimension in the vertical direction) of each engaging element 17 from the upper surface of the base portion 11 is set to be the same as the height dimension of each vertical wall 13 that constitutes the vertical barrier portion 12. In the invention, the shape, dimension, mounting pitch, and the like of the engaging elements 17 are not particularly limited but can be changed optionally.

The lateral barrier walls 16 are erected along the width direction between the vertical barrier portion 12 and the engaging element 17 and between the engaging elements 17 adjacent to each other in the width direction. These lateral barrier walls 16 form the lateral barrier portion 15 together with the engaging elements 17 that are arranged in the width direction. A height dimension of each lateral barrier wall 16 from the upper surface of the base portion 11 is set to be the same as a height dimension of the vertical wall 13 and the engaging element 17.

That is, in the embodiment, the upper ends of the vertical wall 13, the lateral barrier wall 16, and the engaging element 17 are disposed on the same plane. Due to this, when the coupling member 20 is expanded and molded (see FIGS. 7 to 16) as described later, the surface fastener portion 10 can be stably attached to a flat cavity surface of a mold (including a lower molding form portion 58 and a upper molding form portion 64*c* described later). As a result, the synthetic resin material of the coupling member 20 is prevented from penetrating into the engaging element area 18 by flowing over the vertical barrier portion 12 and the lateral barrier portion 15.

The linear magnetic body 9 is fixed to the upper surface of the base portion 11 through the fixing portion 19 along a line of engaging elements 17 disposed closest to the right and left vertical barrier portions 12 within the area of the surface fastener portion 10. The linear magnetic body 9 has a circular cross-sectional shape and is made from a material that has magnetically adsorbable or adsorbing properties.

Since such a linear magnetic body 9 is disposed in the surface fastener portion 10, when expansion molding of the coupling member 20 described later is performed or when the cushion body is molded using a mold in which magnets are disposed on or near the cavity surface, the molding hook and loop fastener 1 can be stably adsorbed and fixed to the cavity surface of the mold by using the magnetic force generated between the magnets of the mold and the linear magnetic body 9 of the surface fastener portion 10.

In this case, examples of the magnetically adsorbable material of the linear magnetic body 9 include a monofilament in which magnetic particles made from alloys of iron, cobalt, nickel, and the like are mixed into a synthetic resin such as polyester and a metallic twisted thread obtained by binding and twisting multiple metallic thin wires made from these alloys. On the other hand, examples of the magnetically adsorbing material of the linear magnetic body 9 include a magnetized wire rod, specifically, a metallic linear magnet and a linear rubber magnet obtained by impregnating a magnetic iron oxide into rubber and magnetizing the rubber. In the invention, a thin tape-shaped magnetic body may be used instead of the linear magnetic body.

The fixing portions 19 that fix the linear magnetic bodies 9 to the base portion 11 have such a form that they protrude in a block shape from the upper surface of the base portion 11. The fixing portions 19 are disposed with a predetermined gap at positions near the inner side of the vertical barrier portion 12 along the longitudinal direction, and the linear magnetic bodies 9 are embedded in the fixing portions 19 so as to penetrate through the fixing portions 19. Moreover, each fixing portion 19 is integrated with the engaging element 17 and the lateral barrier wall 16 that constitute the lateral barrier portion 15.

In the invention, for example, the fixing portion 19 may be disposed on the lower surface side of the base portion 11, and the linear magnetic body 9 may be fixed to the lower surface side of the base portion 11. Moreover, instead of fixing the linear magnetic body 9 to the base portion 11, magnetic particles may be mixed or impregnated into a synthetic resin that forms the surface fastener portion 10 so that the surface fastener portion 10 has magnetism.

In the surface fastener portion 10 of the first embodiment, the base portion 11 includes right and left lateral extension portions 11*b* that extend in the width direction toward the outer side from the right and left vertical barrier portions 12, a front extension portion 11*c* that extends in the longitudinal direction toward the front side from the lateral barrier portion 15 disposed on the frontmost side, and a rear extension portion 11*d* that extends in the longitudinal direction toward the rear side from the lateral barrier portion 15 disposed on the rearmost side.

In this case, the engaging element 17 is not disposed in the areas of the lateral extension portions 11*b* and the areas of the front and rear extension portions 11*c* and 11*d*. The lateral extension portions 11*b* and the front and rear extension portions 11*c* and 11*d* of the base portion 11 are embedded in the coupling member 20 in order to increase the fastening strength between the surface fastener portion 10 and the coupling member 20.

In the first embodiment, the coupling member 20 that connects the plurality of surface fastener portions 10 is made from a synthetic resin foam body such as a polyurethane foam body or a polyethylene foam body. In particular, when the molding property of the coupling member 20 and the fastening strength between the coupling member 20 and the cushion body, and the like are taken into consideration, the coupling member 20 is preferably made from the polyurethane foam body. The coupling member 20 made from such a synthetic resin foam body has such flexibility that it can be bent in the width direction or the front-rear direction of the molding hook and loop fastener 1. The foam body that forms the coupling member 20 may be an open-cell foam body or may be a closed-cell foam body.

The coupling member 20 includes a pair of right and left vertical wall coupling portions 21 disposed along the longitudinal direction on the outer side of the right and left vertical barrier portions 12 of the surface fastener portion 10, penetration preventing lateral wall portions 22 disposed on the front and rear end portions of the molding hook and loop fastener 1, a lateral wall coupling portion 23 disposed between the adjacent surface fastener portions 10, and an anchoring portion 24 disposed on the lower surface (rear surface) side of the surface fastener portion 10.

The right and left vertical wall coupling portions 21 are continuously disposed entirely in the longitudinal direction of the molding hook and loop fastener 1. Moreover, the right and left vertical wall coupling portions 21 are attached to outer surfaces (that is, the outer wall surfaces of the third line of vertical walls 13*c*) of the right and left vertical barrier portions 12 of each surface fastener portion 10 and the upper surfaces of the right and left lateral extension portions 11*b* of the base portion 11.

In this case, the vertical wall coupling portion 21 may be fixed in such a state where the synthetic resin of the vertical wall coupling portion 21 penetrates into the gap between the third lines of vertical walls 13 of the vertical barrier portions 12 of each surface fastener portion 10. In this manner, it is possible to further increase the fastening strength between the vertical wall coupling portion 21 of the coupling member 20 and the vertical barrier portion 12 of the surface fastener portion 10.

A height dimension (dimension in the vertical direction) of the vertical wall coupling portion 21 from the upper surface of the base portion 11 is set to be the same as a height dimension of the vertical wall 13 of the surface fastener portion 10 from the upper surface of the base portion 11 or to be larger than a height dimension of the vertical wall 13. In this case, a height dimension of the vertical wall coupling portion 21 (hereinafter, referred to as a protrusion dimension H1 of the vertical wall coupling portion 21) of a portion protruding further from the vertical wall 13 of the surface fastener portion 10 is set to be between 0 mm and 2 mm. In the case of the first embodiment, the protrusion dimension H1 of the vertical wall coupling portion 21 is set to 1.2 mm.

By setting the protrusion dimension H1 of the vertical wall coupling portion 21 to 0 mm or more, and preferably, 1 mm or more, it is possible to secure rigidity of the vertical wall coupling portion 21 and to allow the upper surface of the vertical wall coupling portion 21 to be stably attached to the cavity surface of the mold when the molding hook and loop fastener 1 is adsorbed and fixed to the cavity surface (specifically, the top face of the projection) of the mold as described later. Moreover, it is possible to prevent the foaming resin material of the cushion body from penetrating into the engaging element area 18 from the width direction.

Moreover, by setting the protrusion dimension H1 of the vertical wall coupling portion 21 to 2 mm or smaller, it is possible to prevent the coupling member 20 from becoming too rigid. Further, it is possible to decrease the step between the upper surface of the vertical wall coupling portion 21 and the engaging head of the engaging element 17. Furthermore, for example, when the cushion body to which the molding hook and loop fastener 1 is attached is covered with a skin material, it is possible to stably fasten the engaging elements 17 (female engaging elements) disposed on the rear surface of the skin material and the engaging elements (male engaging elements) 17 of the molding hook and loop fastener 1.

A dimension (width dimension W) in the horizontal direction of each of the right and left vertical wall coupling portions 21 is set to be between 2 mm and 6 mm, and in the first embodiment, is set to 3 mm. By setting the width dimension W of each vertical wall coupling portion 21 to 2 mm or more, it is possible to secure the strength of the vertical wall coupling portion 21 and to effectively prevent the foaming resin material from penetrating into the engaging element area 18 by flowing over the vertical wall coupling portion 21 during expansion molding of the cushion body.

Moreover, by setting the width dimension W of each vertical wall coupling portion 21 to 6 mm or smaller, it is possible to prevent the molding hook and loop fastener 1 from being rarely bent in the width direction. Further, it is possible to prevent the frictional resistance between the vertical wall coupling portion 21 and the cavity surface of the mold from increasing too much when the molding hook and loop fastener 1 is adsorbed and fixed to the cavity surface of the mold. Due to this, it is possible to easily adjust the position of the molding hook and loop fastener 1 after the molding hook and loop fastener 1 is adsorbed and fixed. Further, by using the magnetic force generated between the magnets of the mold and the linear magnetic body 9 of the surface fastener portion 10, for example, it is also possible to automatically align the molding hook and loop fastener 1 at a predetermined position of the cavity surface of the mold.

The penetration preventing lateral wall portions 22 of the coupling member 20 are disposed at the front end portion and the rear end portion of the molding hook and loop fastener 1 so as to connect the right and left vertical wall coupling portions 21. Moreover, the front and rear penetration preventing lateral wall portions 22 penetrate to the position of the lateral barrier portions 15 of the surface fastener portion 10 so as to be attached to the lateral barrier portions 15 serving as the lateral surfaces of the surface fastener portion 10 so that the front extension portion 11c and the rear extension portion 11d of the surface fastener portion 10 are embedded in the coupling member 20.

In this case, a height dimension of the penetration preventing lateral wall portion 22 from the upper surface of the base portion 11 is set to be the same as a height dimension of the vertical wall coupling portion 21. Due to this, it is possible to allow the upper surfaces of the vertical wall coupling portion 21 and the penetration preventing lateral wall portion 22 to be attached to the cavity surface of the mold when the molding hook and loop fastener 1 is adsorbed and fixed to the cavity surface of the mold and to prevent the foaming resin material of the cushion body from penetrating into the engaging element area 18 from the longitudinal direction.

Moreover, a dimension (length dimension) in the forward-backward direction of the penetration preventing lateral wall portion 22 is set to be between 4 mm and 12 mm, and in the first embodiment, is set to 6 mm. By setting the length dimension of the penetration preventing lateral wall portion 22 to 4 mm or more, it is possible to secure the strength of the penetration preventing lateral wall portion 22 and to effectively prevent the foaming resin material from penetrating into the engaging element area 18 by flowing over the penetration preventing lateral wall portion 22 during expansion molding of the cushion body. Further, by setting the length dimension of the penetration preventing lateral wall portion 22 to 12 mm or smaller, it is possible to prevent the molding hook and loop fastener 1 from being lengthened more than necessary.

The lateral wall coupling portions 23 of the coupling member 20 are disposed so as to connect the right and left vertical wall coupling portions 21 and to connect the adjacent surface fastener portions 10. The lateral wall coupling portions 23 penetrate to the position of the lateral barrier portions 15 of the surface fastener portion 10 so as to be attached to the lateral barrier portions 15 serving as the lateral surfaces of the surface fastener portion 10 so that the front extension portion 11c and the rear extension portion 11d of the surface fastener portion 10 are embedded in the coupling member 20. Since such lateral wall coupling portions 23 are disposed, it is possible to connect between the surface fastener portions 10 more stably, increase the strength or rigidity of the coupling member 20, and to prevent the coupling member 20 from being cut between the surface fastener portions 10.

In this case, a height dimension of the lateral wall coupling portion 23 from the upper surface of the base portion 11 is set to be the same as the height dimension of the vertical wall coupling portion 21 similarly to the penetration preventing lateral wall portion 22. Moreover, a length dimension L1 of the lateral wall coupling portion 23 is set to be between 4 mm and 12 mm, and in the first embodiment, is set to 6 mm.

By setting the lateral wall coupling portion 23 to have the height dimension described above, the rigidity of the coupling member 20 is secured and the long molding hook and loop fastener 1 is prevented from being bent to be tilted to the front-rear direction. Moreover, by setting the length dimension L1 of the lateral wall coupling portion 23 to 4 mm or more, the molding hook and loop fastener 1 can be easily bent to a certain curvature in the front-rear direction and the width direction. In this case, a gap L2 between the adjacent surface fastener portions 10 is preferably set to approximately 3 mm. Further, by setting the length dimension L1 of the lateral wall coupling portion 23 to 12 mm or smaller, it is possible to efficiently secure the area of the engaging element area 18 so that predetermined fastening strength is obtained in the molding hook and loop fastener 1.

The anchoring portion 24 of the coupling member 20 is disposed in the entire longitudinal direction and the entire width direction of the molding hook and loop fastener 1 and is attached to the lower surface (rear surface) side of the base portion 11 of each surface fastener portion 10. In this case, since a plurality of recessed grooves 11a are formed on the lower surface of the base portion 11 as described above, the bonding area between the anchoring portion 24 of the coupling member 20 and the base portion 11 of the surface fastener portion 10 increases, and the anchoring portion 24 and the base portion 11 are tightly fixed.

The anchoring portion 24 is integrated with the vertical wall coupling portion 21, the penetration preventing lateral wall portion 22, and the lateral wall coupling portion 23 disposed on the upper surface side of the base portion 11 so as to increase the strength of the coupling member 20. Moreover, in this case, since the right and left lateral extension portions 11b and the front and rear extension portions 11c and 11d of each surface fastener portion 10 are embedded in the coupling member 20, it is possible to further increase the fastening strength between the coupling member 20 and the surface fastener portion 10.

A length dimension and a width dimension of the anchoring portion 24 are set to be the same as a dimension between the right and left outer side edges of the pair of vertical wall coupling portions 21 and a length dimension (that is, a length dimension between the front and rear edges of the front penetration preventing lateral wall portion 22 and the rear edge of the rear penetration preventing lateral wall portion 22) of the vertical wall coupling portion 21, respectively. Moreover, a height dimension of the anchoring portion 24 is set so as to correspond to a height dimension of the vertical wall coupling portion 21 so that a height dimension (that is, a height dimension H2 of the coupling member 20) from the upper surface of the vertical wall coupling portion 21 to the lower surface of the anchoring portion 24 is between 5 mm and 12 mm.

By setting the height dimension H2 of the coupling member 20 to 5 mm or more, it is possible to increase the strength of the coupling member 20 and to prevent the molding hook and loop fastener 1 from being cut in the area of the coupling member 20. Moreover, since the rigidity of the coupling member 20 can be appropriately secured, it is possible to prevent the molding hook and loop fastener 1 from being bent at an acute angle in the front-rear direction. Further, the positioning of the molding hook and loop fastener 1 is aligned easily when the molding hook and loop fastener 1 is set on the cavity surface of the mold, and the attachment workability of the molding hook and loop fastener 1 is improved.

By setting the height dimension H2 of the coupling member 20 to 12 mm or smaller, the coupling member 20 will not become too rigid. In the first embodiment, the height dimension of the coupling member 20 is set to 8 mm.

Next, a method for manufacturing the molding hook and loop fastener 1 according to the first embodiment having the above-described configuration will be described.

Figure 4:
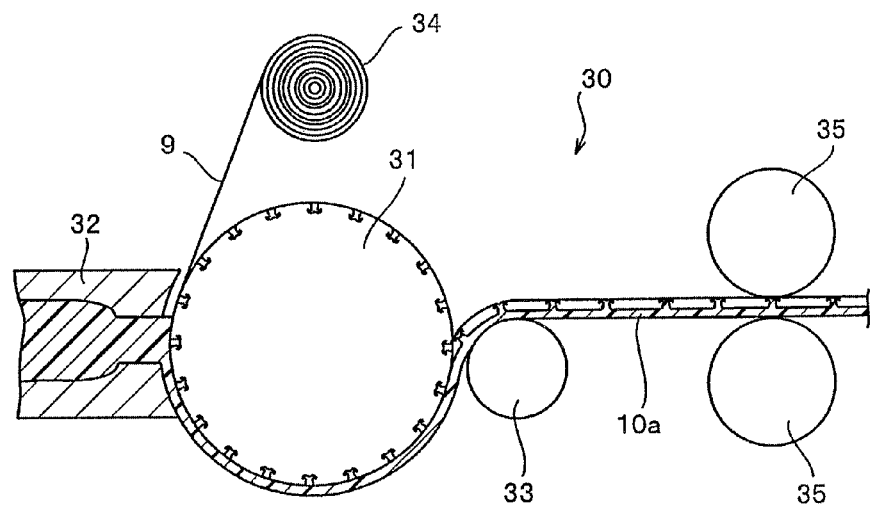
FIG. 4 is an explanatory view for schematically describing steps of molding a surface fastener portion.

First, the surface fastener portions 10 are continuously manufactured using a manufacturing apparatus 30 as illustrated in FIG. 4.

The manufacturing apparatus 30 of the surface fastener portion 10 includes a die wheel 31 that rotates in one direction, a molten resin continuous extrusion nozzle 32 disposed to face a circumferential surface of the die wheel 31, a pickup roller 33 disposed closer to a downstream side in the rotation direction of the die wheel 31 than the continuous extrusion nozzle 32 so as to face the circumferential surface of the die wheel 31, a magnetic body supply portion 34 disposed closer to the upstream side in the rotation direction of the die wheel 31 than the continuous extrusion nozzle 32 so as to supply the linear magnetic body 9 between the opposing surfaces of the die wheel 31 and the continuous extrusion nozzle 32, and a pair of upper and lower conveying rollers 35 that conveys a continuous surface fastener portion 10a separated from the circumferential surface of the die wheel 31 to the downstream side.

In this case, a molding cavity for molding the engaging element 17, the vertical barrier portion 12, the lateral barrier wall 16, and the like disposed in the surface fastener portion 10 is formed on the circumferential surface of the die wheel 31. Moreover, the die wheel 31 has a coolant that circulates inside the die wheel 31, and a coolant tank (not illustrated) is disposed under the die wheel 31 so that the lower-half portion of the die wheel 31 is immersed.

Using such a manufacturing apparatus 30, first, the continuous surface fastener portion 10a obtained by continuously connecting the plurality of surface fastener portions 10 in succession is manufactured. In this case, the molten resin material is continuously extruded toward the circumferential surface of the die wheel 31 from the continuous extrusion nozzle 32. In this case, the die wheel 31 rotates in one direction, and the molten resin extruded to the circumferential surface molds the base portion 11 and the like of the surface fastener portion 10 at the position between the continuous extrusion nozzle 32 and the die wheel 31. At the same time, the engaging element 17, the vertical barrier portion 12, the lateral barrier wall 16, and the like are sequentially molded in the molding cavity described above.

Further, concurrently with the extrusion of the molten synthetic resin material from the continuous extrusion nozzle 32, the linear magnetic body 9 is supplied from the magnetic body supply portion 34 to the molten resin extrusion position and is integrally molded to the continuous surface fastener portion 10a.

The continuous surface fastener portion 10a molded on the circumferential surface of the die wheel 31 is cooled, rotated by a half rotation, and solidified while being carried on the circumferential surface of the die wheel 31. After that, the continuous surface fastener portion 10a is continuously separated from the circumferential surface of the die wheel 31 by the pickup roller 33. In this case, in the first embodiment, it is possible to manufacture a continuous surface fastener portion in which a plurality of surface fastener portions 10 is continuously arranged in one line. Moreover, it is possible to manufacture a sheet-shaped continuous surface fastener portion in which a plurality of lines of surface fastener portions 10 is arranged in the width direction.

Subsequently, the continuous surface fastener portion 10a separated from the die wheel 31 is conveyed to a cutting device 40 illustrated in FIG. 5 and is cut into a predetermined length in the cutting device 40.

The cutting device 40 includes a cutting roller 41 that cuts the continuous surface fastener portion 10a, a support roller 42 that conveys the cut surface fastener portions 10 toward the downstream side together with the cutting roller 41 while supporting the surface fastener portions 10 to be cut from the lower surface side, a supply portion 43 that supplies the continuous surface fastener portion 10a to the cutting roller 41, and a discharge portion 44 that discharges the cut surface fastener portions 10 toward the downstream side.

Moreover, a plurality of cutting blades 41a that cut the continuous surface fastener portion 10a and a plurality of fin portions 41b disposed between the cutting blades 41a are formed on the circumferential surface of the cutting roller 41 so as to protrude outward. In this case, the number of cutting blades 41a and fin portions 41b formed on the circumferential surface of the cutting roller 41 can be selected optionally according to the size of the surface fastener portion 10, the number of engaging elements 17 disposed in the surface fastener portion 10, and the like.

In the cutting device 40, the cutting roller 41 and the support roller 42 are rotated in a predetermined direction while supplying the continuous surface fastener portion 10a from the supply portion 43, whereby the fin portions 41b of the cutting roller 41 come in contact with the engaging element 17 and the lateral barrier wall 16 of the surface fastener portion 10 so that the continuous surface fastener portion 10a is sequentially cut by the cutting blades 41a with the surface fastener portion 10 being guided to the downstream side. In this manner, a plurality of surface fastener portions 10 having a predetermined length are manufactured.

Figure 6:
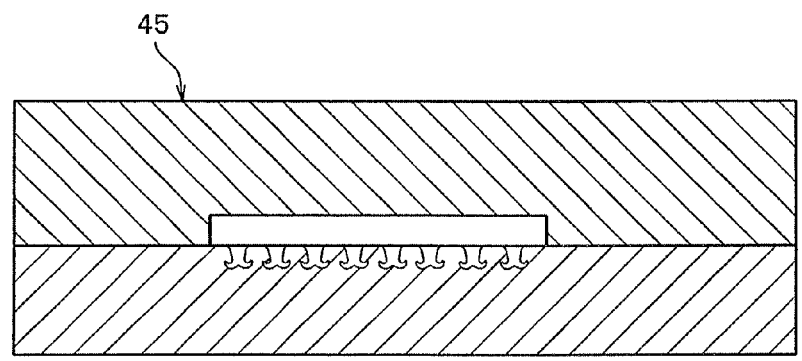
FIG. 6 is an explanatory view for schematically describing other steps of molding a surface fastener portion.

In the invention, a method for manufacturing the plurality of surface fastener portions 10 is not particularly limited, and various methods can be used. For example, as illustrated in FIG. 6, after the continuous surface fastener portion 10a is molded using a mold 45 having a predetermined cavity space, the obtained continuous surface fastener portion 10a may be cut to manufacture a plurality of surface fastener portions 10. Alternatively, a plurality of surface fastener portions 10 may be manufactured by being molded simultaneously using a mold in which a plurality of cavity spaces for molding one surface fastener portion 10 is formed.

Figure 7:
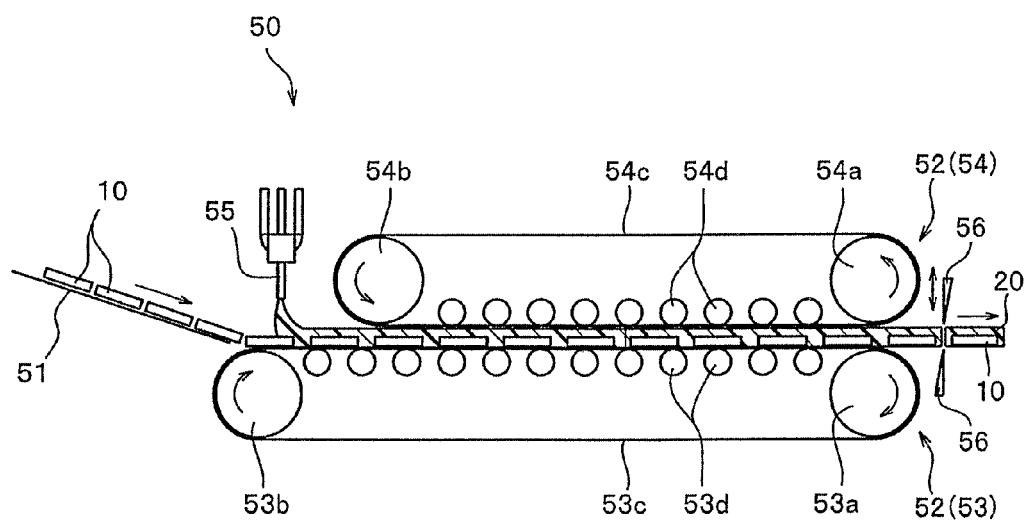
FIG. 7 is an explanatory view for schematically describing steps of manufacturing a molding hook and loop fastener.

Subsequently, the plurality of surface fastener portions 10 manufactured in the above-described manner are conveyed to a first continuous expansion molding apparatus 50 as illustrated in FIG. 7 which performs expansion molding of the coupling member 20.

The first continuous expansion molding apparatus 50 includes a shoot portion 51 that sequentially supplies the plurality of surface fastener portions 10, a conveying portion 52 that receives the supplied surface fastener portion 10 and performs expansion molding of the coupling member 20 while conveying the supplied surface fastener portion 10 at a predetermined speed, an injection nozzle 55 that injects the foaming resin material for the coupling member 20 to a lower conveyer belt 53 described later of the conveying portion 52, and a cutting portion 56 disposed on the downstream side of the conveying portion 52 so as to cut the molded coupling member 20 to a predetermined length.

The conveying portion 52 of the apparatus includes the lower conveyer belt 53 that receives and conveys the surface fastener portion 10 and an upper conveyer belt 54 that is combined with the lower conveyer belt 53 to form a molding space portion 59 of the coupling member 20.

Moreover, as illustrated in FIGS. 7 to 10, the lower conveyer belt 53 includes a pair of driving roller 53a and driven roller 53b, an endless belt 53c that circulates by being stretched between the driving roller 53a and the driven roller 53b, a plurality of lower support rollers 53d disposed on the inner circumferential surface side of the endless belt 53c along a conveying path of the surface fastener portion 10, a plurality of lower molding form portions 58 (not illustrated in FIG. 7) disposed integrally on the outer circumferential surface side of the endless belt 53c to form the molding space portion 59 of the coupling member 20 together with the upper conveyer belt 54, and a controller (not illustrated) that controls the rotation speed of the driving roller 53a.

In this case, the plurality of lower molding form portions 58 are formed from a synthetic resin such as a silicone resin or metal such as stainless steel, and polytetrafluoroethylene is coated on the surface of the lower molding form portion 58.

Figure 8:
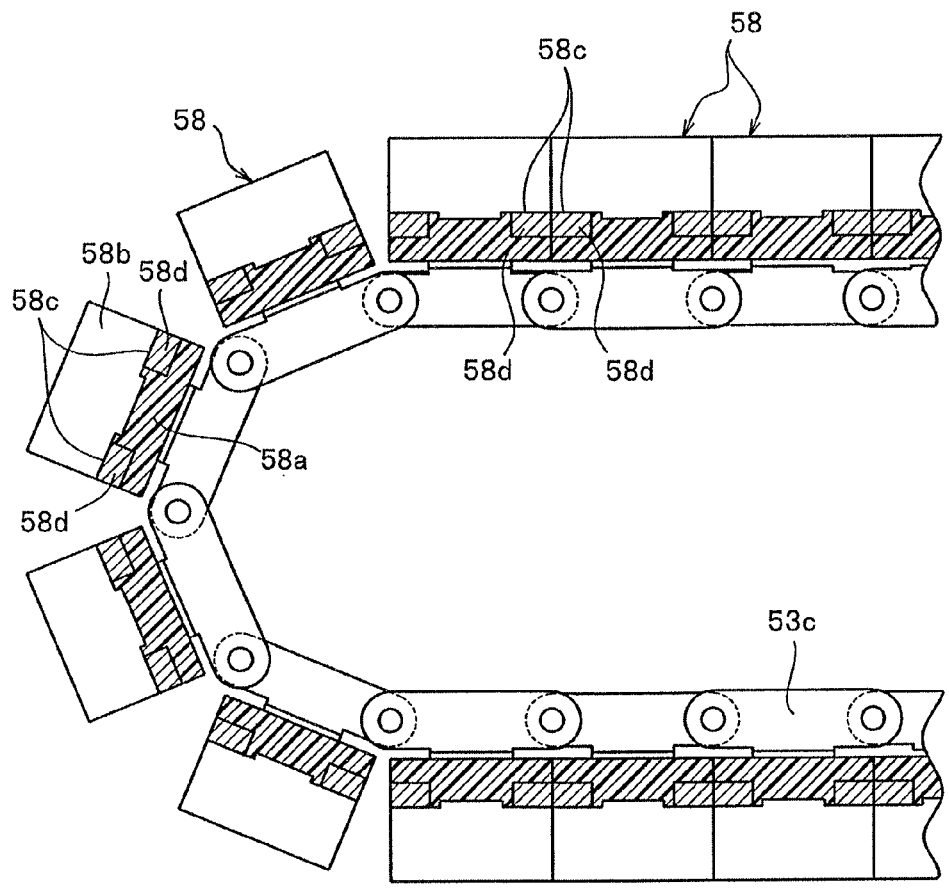
FIG. 8 is a schematic view schematically illustrating a main part of a lower conveyer belt at an enlarged scale.

Further, the plurality of lower molding form portions 58 are configured to be connected to each other and divided from each other and can be divided one by one and smoothly conveyed in the reverse direction in a curved portion (arc portion) of the endless belt 53c as illustrated in FIG. 8. Moreover, the adjacent lower molding form portions 58 are connected without a gap in a straight line portion of the endless belt 53c to form the continuous molding space portion 59.

Figure 10:
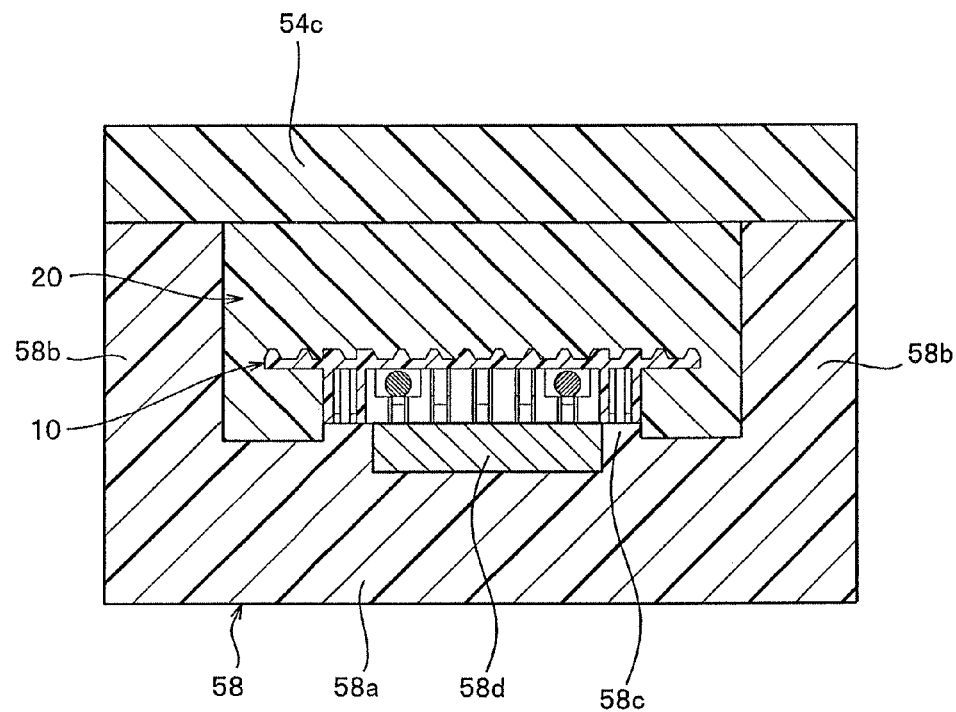
FIG. 10 is a cross-sectional view schematically illustrating relationship between upper and lower conveyer belts, a surface fastener portion, and a coupling member.

As illustrated in FIG. 10, each lower molding form portion 58 includes a bottom surface portion 58a, right and left lateral wall portions 58b erected on both side edges in the width direction (horizontal direction) of the bottom surface portion 58a, a mounting portion 58c that rises from a central portion in the width direction of the bottom surface portion 58a so that the surface fastener portion 10 is mounted on the mounting portion 58c, and a magnet 58d (for example, a neodymium magnet) embedded in the mounting portion 58c.

In the case of the first embodiment, the mounting portion 58c and the magnet 58d are disposed at the end portions (the front end portion and the rear end portion) close to the dividing faces of each lower molding form portion 58. Due to this, the mounting portion 58c and the magnet 58d are configured such that, when the adjacent lower molding form portions 58 are connected in the straight line portion of the endless belt 53c, the mounting portion 58c and the magnet 58d are also connected between the adjacent lower molding form portions 58 so that one surface fastener portion 10 is mounted on the mounting portion and is adsorbed and fixed.

In this case, a length dimension along the conveying direction of the entire two connected mounting portions 58c is set to be the same as the length dimension between the lateral barrier portion 15 disposed on the frontmost side of each surface fastener portion 10 and the lateral barrier portion 15 disposed on the rearmost side. Moreover, a width dimension of each mounting portion 58c is set to be the same as a gap between the outer wall surfaces (that is, the outer wall surfaces of the third lines of vertical walls 13c) of the right and left vertical barrier portions 12 of the surface fastener portion 10.

By setting the mounting portion 58c to have such a size, when the surface fastener portion 10 is adsorbed and fixed to the mounting portion 58c, the upper surfaces of the vertical barrier portion 12 and the lateral barrier portion 15 of the surface fastener portion 10 can be reliably attached to the upper surface of the mounting portion 58c. As a result, it is possible to prevent the synthetic resin material of the coupling member 20 from penetrating into the engaging element area 18 of the surface fastener portion 10 during expansion molding of the coupling member 20. Moreover, the vertical wall coupling portion 21, the penetration preventing lateral wall portion 22, and the lateral wall coupling portion 23 of the coupling member 20 can be stably formed in the shape and dimensions described above.

In the conveying portion 52, the upper conveyer belt 54 includes a pair of driving roller 54a and driven roller 54b, an upper molding form portion 54c that circulates by being stretched between the driving roller 54a and the driven roller 54b, a plurality of upper support rollers 54d disposed on the inner circumference side of the upper molding form portion 54c along the conveying path of the surface fastener portion 10, and a controller (not illustrated) that controls the rotation speed of the driving roller 54a.

Figure 9:
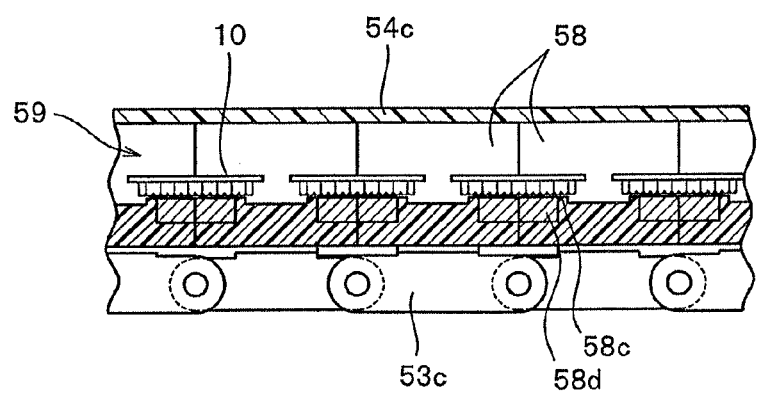
FIG. 9 is a schematic view schematically illustrating relationship between upper and lower conveyer belts and a surface fastener portion.

The upper molding form portion 54c is formed from a synthetic resin such as a silicone resin or metal such as stainless steel similarly to the lower molding form portion 58, and polytetrafluoroethylene is coated on the surface of the upper molding form portion 54c. As illustrated in FIGS. 9 and 10, the upper molding form portion 54c is attached to the right and left lateral wall portions 58b of the connected lower molding form portions 58, whereby the molding space portion 59 for the coupling member 20 that is continuous in the conveying direction of the surface fastener portion 10 is formed between the upper molding form portion 54c and the lower molding form portion 58.

In the first embodiment, the rotation speeds of the upper molding form portion 54c of the upper conveyer belt 54 and the endless belt 53c and the lower molding form portion 58 of the lower conveyer belt 53 are controlled by each controller described above so that the moving speeds (conveying speeds) in the straight line portion are predetermined same speeds.

When the coupling member 20 is expanded and molded using the first continuous expansion molding apparatus 50, first, the upper and lower conveyer belts 54 and 53 of the conveying portion 52 are driven so that the surface fastener portions 10 are sequentially supplied one by one from the shoot portion 51 to the lower conveyer belt 53, and the surface fastener portion 10 is mounted on the mounting portion 58c of the lower molding form portion 58 in such a direction where the engaging elements 17 of the surface fastener portion 10 face the surface of the mounting portion 58c.

In this case, by the magnetic force generated between the magnet 58d embedded in the mounting portion 58c and the linear magnetic body 9 disposed in the surface fastener portion 10, the surface fastener portion 10 is stably adsorbed and fixed at a predetermined position of the mounting portion 58c. Moreover, the upper surfaces of the vertical barrier portion 12 and the lateral barrier portion 15 of the surface fastener portion 10 are attached to the surface of the mounting portion 58c.

After the surface fastener portion 10 is adsorbed and fixed to the mounting portion 58c, the foaming resin material for the coupling member 20 is injected from the injection nozzle 55 into the lower molding form portion 58 (the molding space portion 59). Further, the upper molding form portion 54c of the upper conveyer belt 54 is attached to the upper surfaces of the right and left lateral wall portions 58b of the lower molding form portion 58 so that the upper molding form portion 54c and the lower molding form portion 58 are combined.

In this manner, the surface fastener portion 10 advances through the straight line portion of the conveying portion 52, and the coupling member 20 is expanded and molded in the molding space portion 59 formed in the upper and lower molding form portions 58. As a result, the molding hook and loop fastener 1 in which the plurality of surface fastener portions 10 are connected in the longitudinal direction by the coupling member 20 is manufactured.

In this case, even when the foaming resin material for the coupling member 20 tries to penetrate into the engaging element area 18 of the surface fastener portion 10, since the upper surfaces of the vertical barrier portion 12 and the lateral barrier portion 15 of the surface fastener portion 10 are attached to the surface of the mounting portion 58c as described above, it is possible to prevent the foaming resin material from penetrating into the engaging element area 18 by flowing over the vertical barrier portion 12 and the lateral barrier portion 15. Moreover, in this case, by selecting and using a foaming resin material having high viscosity in order to perform expansion molding of the coupling member 20, it is possible to prevent the foaming resin material from penetrating into the engaging element area 18 more reliably.

Moreover, the manufactured molding hook and loop fastener 1 is discharged from the upper and lower conveyer belts 54 and 53 and conveyed to the cutting portion 56, and the coupling member 20 is cut into a predetermined length dimension in the cutting portion 56. In this way, the molding hook and loop fastener 1 of the first embodiment as illustrated in FIG. 1 is continuously manufactured.

In the first continuous expansion molding apparatus 50, a plurality of surface fastener portions 10 are supplied in a line from the shoot portion 51 toward the conveying portion 52, whereby the molding hook and loop fastener 1 in which the plurality of surface fastener portions 10 are connected in a line can be manufactured. Moreover, by supplying a plurality of lines of surface fastener portions 10 from the shoot portion 51, it is possible to manufacture a sheet-shaped molding hook and loop fastener 1 in which a plurality of lines of surface fastener portions 10 are arranged in the width direction. After that, by cutting the coupling member 20 in a predetermined length dimension and a predetermined width dimension in the cutting portion 56, a plurality of molding hook and loop fasteners 1 in which a plurality of surface fastener portions 10 are connected in a line can be manufactured simultaneously.

In the first embodiment, the manufacturing apparatus and the manufacturing method used in manufacturing of the molding hook and loop fastener 1 are not limited to the above configuration, and the molding hook and loop fastener 1 can be manufactured using a manufacturing apparatus and a manufacturing method illustrated below.

Figure 11:
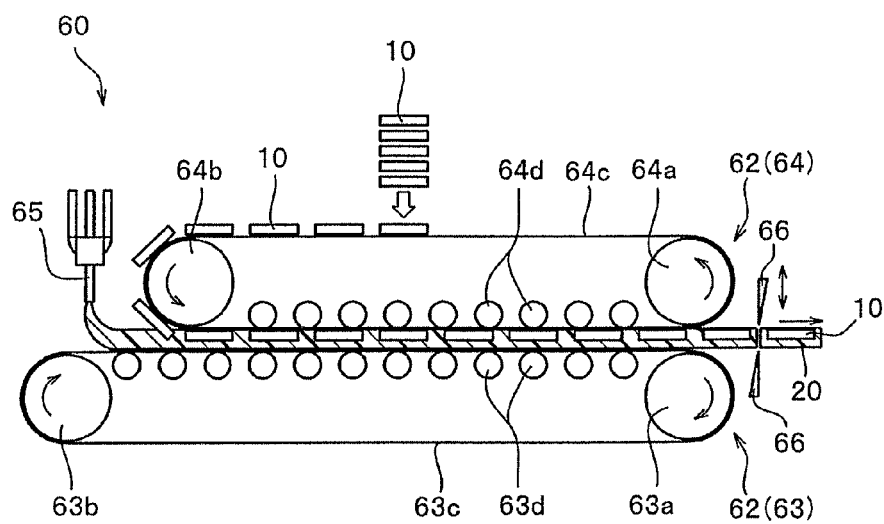
FIG. 11 is an explanatory view for schematically describing other steps of manufacturing a molding hook and loop fastener.

Here, FIG. 11 illustrates a second continuous expansion molding apparatus 60 which performs expansion molding of the coupling member 20 while sequentially supplying a plurality of surface fastener portions 10.

The second continuous expansion molding apparatus 60 includes a supply portion (not illustrated) that sequentially supplies a plurality of surface fastener portions 10, a conveying portion 62 that receives the supplied surface fastener portion 10 and performs expansion molding of the coupling member 20 while conveying the surface fastener portion 10 at a predetermined speed, an injection nozzle 65 that injects a foaming resin material for the coupling member 20 to a lower conveyer belt 63 described later of the conveying portion 62, and a cutting portion 66 disposed on the downstream side of the conveying portion 62 so as to cut the molded coupling member 20 into a predetermined length.

The conveying portion 62 of the apparatus includes an upper conveyer belt 64 that receives and conveys the surface fastener portion 10 and the lower conveyer belt 63 that is combined with the upper conveyer belt 64 to form a molding space portion of the coupling member 20.

The upper conveyer belt 64 includes a pair of driving roller 64a and driven roller 64b, an upper molding form portion 64c that circulates by being stretched between the driving roller 64a and the driven roller 64b, a plurality of upper support rollers 64d disposed on the inner circumference side of the upper molding form portion 64c along a conveying path of the surface fastener portion 10, and a controller (not illustrated) that controls the rotation speed of the driving roller 64a. Although not illustrated, a plurality of mounting portions for mounting the surface fastener portion 10 are disposed in a central portion in the width direction of the upper molding form portion 64c at a predetermined gap along the longitudinal direction, and a magnet (for example, a neodymium magnet) is embedded on the front surface side of the mounting portion.

In this case, a length dimension of each mounting portion disposed in the upper molding form portion 64c is set to be the same as a length dimension between the lateral barrier portion 15 disposed on the frontmost side of each surface fastener portion 10 and the lateral barrier portion 15 disposed on the rearmost side. A width dimension of each mounting portion is set to be the same as a gap between the outer wall surfaces of the right and left vertical barrier portions 12 of the surface fastener portion 10.

The lower conveyer belt 63 includes a pair of driving roller 63a and driven roller 63b, an endless belt 63c that circulates by being stretched between the driving roller 63a and the driven roller 63b, a plurality of lower support rollers 63d disposed on the inner circumference side of the endless belt 63c along the conveying path of the surface fastener portion 10, a plurality of lower molding form portions (not illustrated) integrally disposed on the outer circumference side of the endless belt 63c, and a controller (not illustrated) that controls the rotation speed of the driving roller 64a.

Further, the plurality of lower molding form portions are configured to be connected to each other and divided from each other and can be divided one by one and smoothly conveyed in the reverse direction in a curved portion (arc portion) of the endless belt 63c similarly to the first continuous expansion molding apparatus 50 described above. Moreover, the adjacent lower molding form portions are connected without a gap in a straight line portion of the endless belt 63c.

Each lower molding form portion includes a bottom surface portion and right and left lateral wall portions erected on both side edges in the width direction (horizontal direction) of the bottom surface portion. In a state where the lower molding form portions are connected to each other, the upper surfaces of the lateral wall portions of the lower molding form portions are attached to the upper molding form portion 64c of the upper conveyer belt 64 so that the upper molding form portion 64c and the lower molding form portion are combined. In this way, a molding space portion of the coupling member 20 that is continuous in the conveying direction of the surface fastener portion 10 is formed between the upper molding form portion 64c and the lower molding form portion.

When the coupling member 20 is expanded and molded using the second continuous expansion molding apparatus 60, first, the upper and lower conveyer belts 64 and 63 of the conveying portion 62 are driven so that the surface fastener portions 10 are sequentially supplied one by one to the upper conveyer belt 64, and the surface fastener portion 10 is mounted on the mounting portion of the upper molding form portion 64c so that the engaging elements 17 of the surface fastener portion 10 face the surface of the mounting portion.

In this case, the surface fastener portion 10 is supplied to an upper straight line portion of the upper conveyer belt 64, whereby the surface fastener portion 10 can be stably mounted on the mounting portion of the upper molding form portion 64c. Further, by the magnetic force generated between the magnet embedded in the mounting portion and the linear magnetic body 9 disposed in the surface fastener portion 10, the surface fastener portion 10 is adsorbed and fixed at a predetermined position of the mounting portion.

Since the surface fastener portion 10 is adsorbed and fixed to the upper molding form portion 64c using the magnetic force, even when the conveying direction is reversed in the curved portion of the upper conveyer belt 64 and the vertical positional relationship of the upper molding form portion 64c and the surface fastener portion 10 is reversed, the surface fastener portion 10 will not fall from the upper molding form portion 64c.

Moreover, the surface fastener portion 10 is adsorbed and fixed to the mounting portion of the upper molding form portion 64c, and the foaming resin material for the coupling member 20 is supplied from the injection nozzle 65 into the lower molding form portion. After that, the upper molding form portion 64c of the upper conveyer belt 64 is attached to the upper surfaces of the right and left lateral wall portions of the lower molding form portion.

In this manner, the surface fastener portion 10 advances through the straight line portion of the conveying portion 62, and the coupling member 20 is expanded and molded in the molding space portion formed in the upper and lower molding form portions. As a result, the molding hook and loop fastener 1 in which the plurality of surface fastener portions 10 are connected in the longitudinal direction by the coupling member 20 is manufactured.

In this case, since the upper surfaces of the vertical barrier portion 12 and the lateral barrier portion 15 of the surface fastener portion 10 are attached to the surface of the mounting portion of the upper molding form portion 64c, it is possible to prevent the foaming resin material from penetrating into the engaging element area 18 by flowing over the vertical barrier portion 12 and the lateral barrier portion 15 of the surface fastener portion 10.

Moreover, the manufactured molding hook and loop fastener 1 is discharged from the upper and lower conveyer belts 64 and 63 and conveyed to the cutting portion 66, and the coupling member 20 is cut into a predetermined length dimension in the cutting portion 66. In this way, the molding hook and loop fastener 1 of the first embodiment as illustrated in FIG. 1 is obtained continuously.

Figure 12:
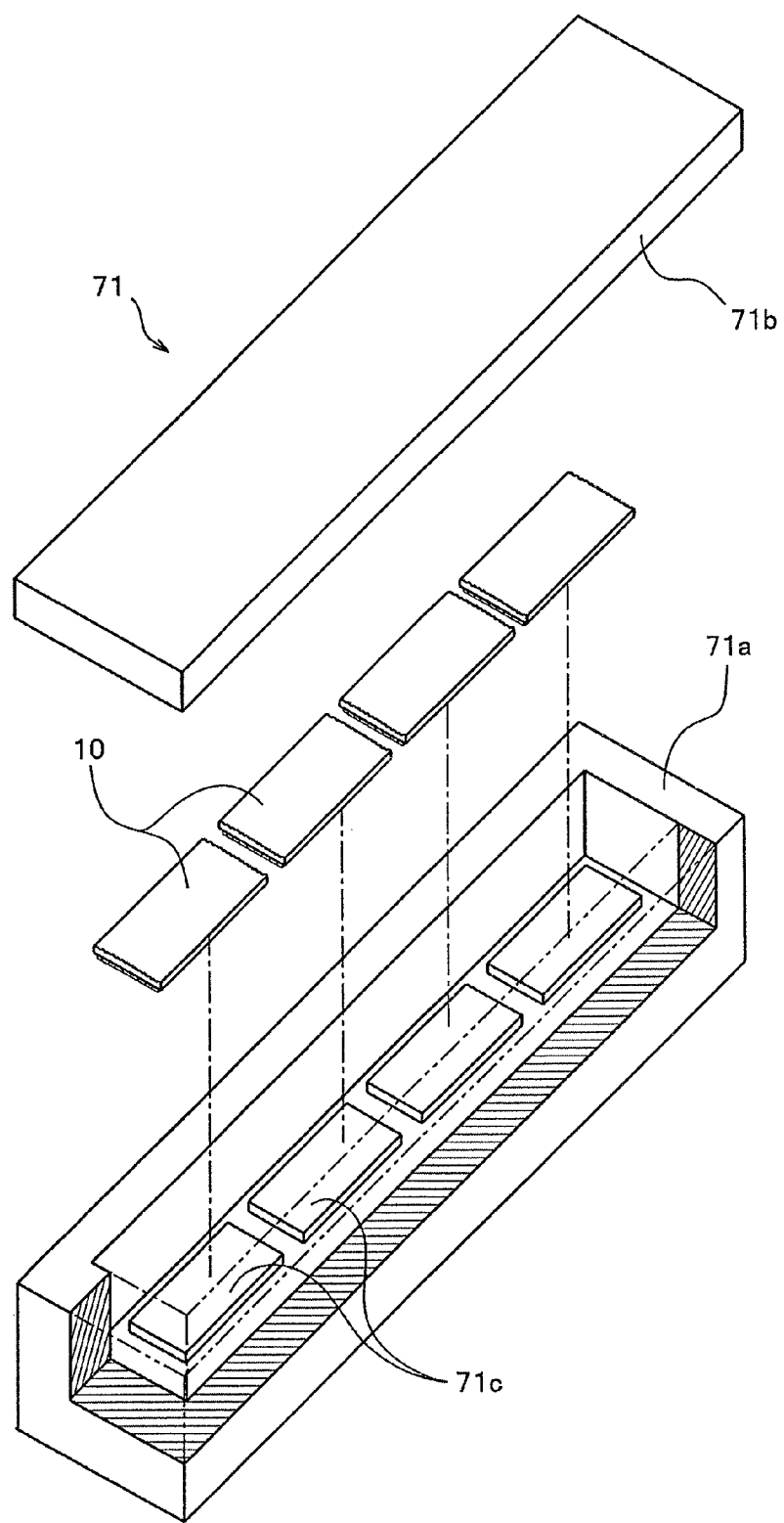
FIG. 12 is an explanatory view for schematically describing further other steps of manufacturing a molding hook and loop fastener.

Moreover, as another method of manufacturing the molding hook and loop fastener 1 of the first embodiment, the molding hook and loop fastener 1 can be manufactured by performing expansion molding of the coupling member 20 using a first mold 71 illustrated in FIG. 12.

Figure 13:
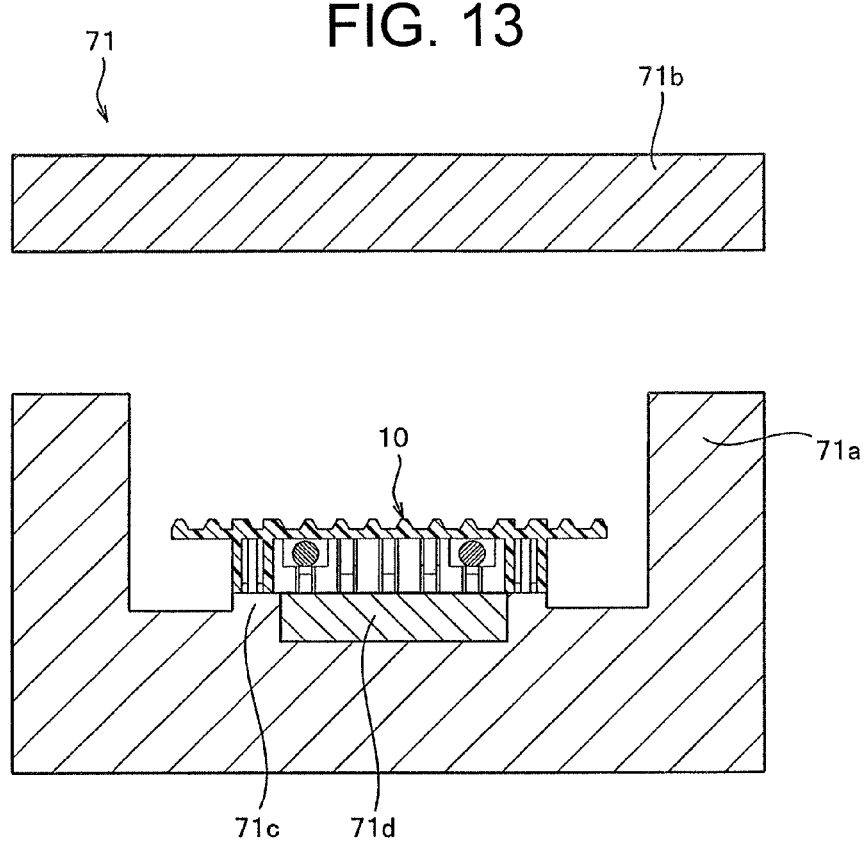
FIG. 13 is a cross-sectional view of a first mold used in the steps.
Figure 14:
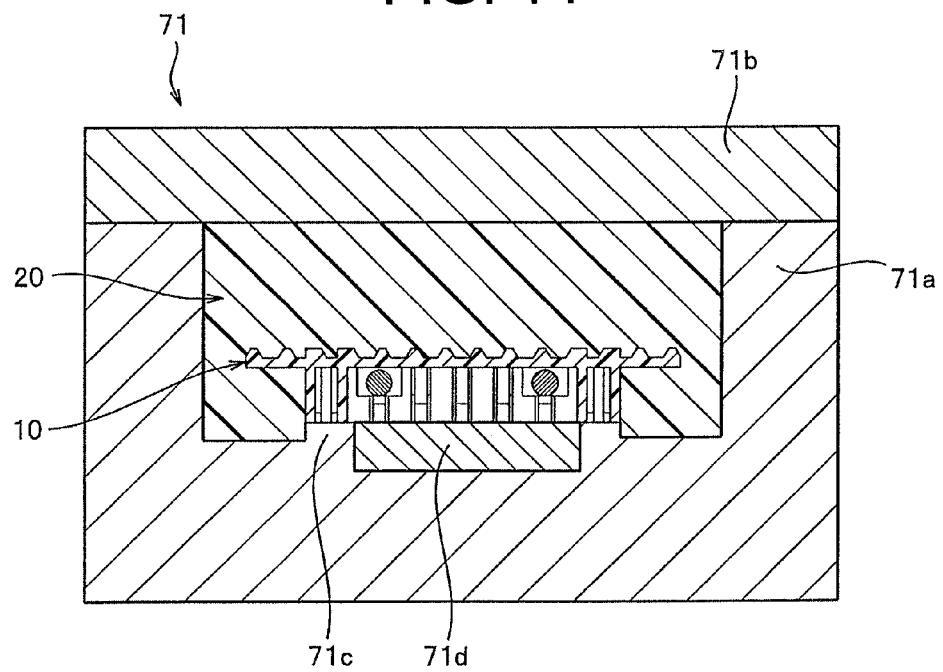
FIG. 14 is a cross-sectional view illustrating a state where a coupling member is molded using the first mold.

The first mold 71 has a pair of first fixed mold 71a and first movable mold 71b that includes a molding space portion of the coupling member 20. Moreover, a plurality of mounting portions 71c for mounting the surface fastener portion 10 are disposed on the bottom surface of the first fixed mold 71a at a predetermined gap along the longitudinal direction, and a magnet 71d as illustrated in FIGS. 13 and 14 is embedded on the front surface side of the mounting portion 71c. In this case, the length dimension and width dimension of each mounting portion 71c are set to be the same as those of the mounting portion disposed in the second continuous expansion molding apparatus 60 described above.

When the coupling member 20 is expanded and molded using the first mold 71, first, as illustrated in FIG. 13, the surface fastener portions 10 are mounted one by one on the respective mounting portions 71c of the first fixed mold 71a and are adsorbed and fixed by magnetic force. In this manner, the surface fastener portion 10 is set at a predetermined position.

Subsequently, a foaming resin material for the coupling member 20 is injected into the first fixed mold 71a. After that, the first fixed mold 71a and the first movable mold 71b are clamped to form a cavity space (molding space portion) for the coupling member 20 in the mold, and the coupling member 20 is expanded and molded in the cavity space (see FIG. 14).

In this case, since the upper surfaces of the vertical barrier portion 12 and the lateral barrier portion 15 of the surface fastener portion 10 are attached to the surface of the mounting portion 71c, it is possible to prevent the foaming resin material from penetrating into the engaging element area 18 by flowing over the vertical barrier portion 12 and the lateral barrier portion 15 of the surface fastener portion 10.

By performing expansion molding of the coupling member 20 using the first mold 71, the molding hook and loop fastener 1 having a predetermined length in which the plurality of surface fastener portions 10 are connected in the longitudinal direction by the coupling member 20 is manufactured.

Figure 15:
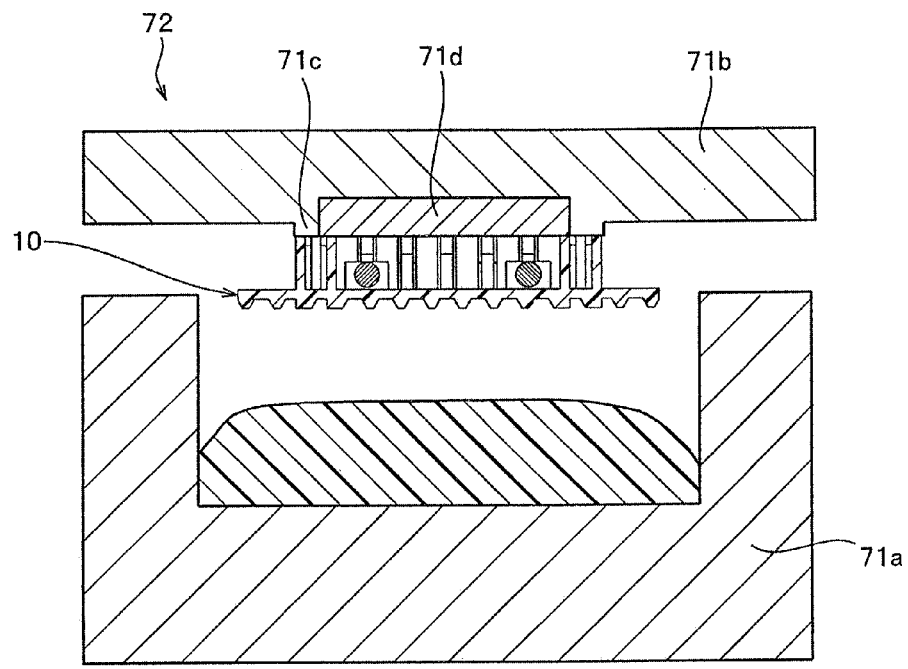
FIG. 15 is an explanatory view for schematically describing further other steps of manufacturing a molding hook and loop fastener.
Figure 16:
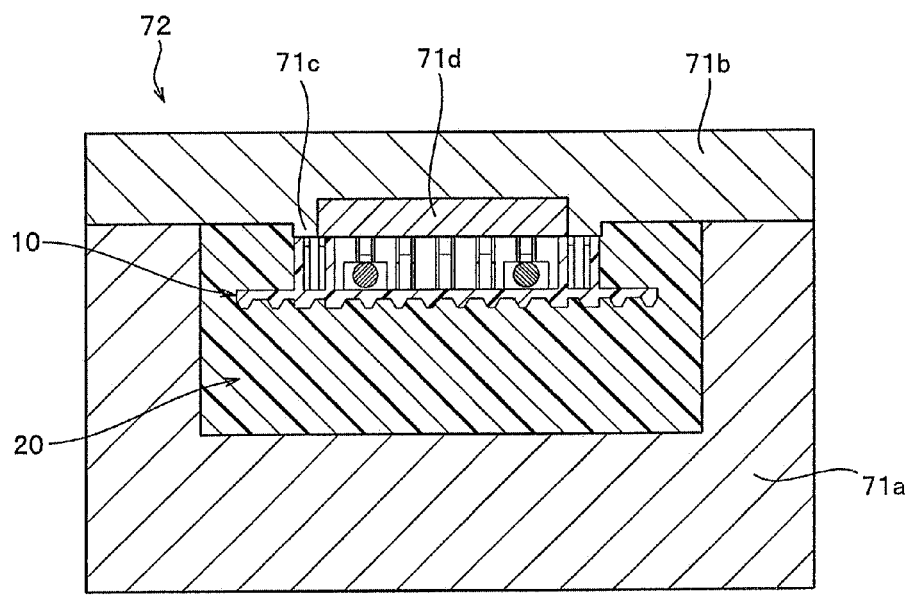
FIG. 16 is a cross-sectional view illustrating a state where a coupling member is molded in the steps.

In addition to the above, as a method of manufacturing the molding hook and loop fastener 1 of the first embodiment, the coupling member 20 may be expanded and molded using a second mold 72 illustrated in FIG. 15.

The second mold 72 has a pair of second fixed mold 72a and second movable mold 72b that includes a molding space portion for the coupling member 20. Moreover, a plurality of attachment portions 72c to which the surface fastener portion 10 is attached are disposed on a ceiling surface of the second movable mold 72b with a predetermined gap along the longitudinal direction, and a magnet 72d is embedded on the front surface (lower surface) side of the attachment portion 72c. In this case, the length dimension and width dimension of each attachment portion 72c are set to be the same as those of the mounting portion disposed in the second continuous expansion molding apparatus 60 described above.

When the coupling member 20 is expanded and molded using the second mold 72, first, as illustrated in FIG. 15, the surface fastener portion 10 is attached to the attachment portion 72c of the second movable mold 72b and is adsorbed and fixed by magnetic force. Subsequently, a foaming resin material for the coupling member 20 is injected into the second fixed mold 72a. After that, the second fixed mold 72a and the second movable mold 72b are clamped, whereby a cavity space (molding space portion) for the coupling member 20 is formed in the second mold 72, the surface fastener portion 10 is set at a predetermined position in relation to the cavity space, and the coupling member 20 is expanded and molded in the cavity space (see FIG. 16).

In this case, since the upper surfaces of the vertical barrier portion 12 and the lateral barrier portion 15 of the surface fastener portion 10 are attached to the surface (lower surface) of the attachment portion 72c, it is possible to prevent the foaming resin material from penetrating into the engaging element area 18 by flowing over the vertical barrier portion 12 and the lateral barrier portion 15 of the surface fastener portion 10.

By performing expansion molding of the coupling member 20 using the second mold 72, the molding hook and loop fastener 1 having a predetermined length in which the plurality of surface fastener portions 10 are connected in the longitudinal direction by the coupling member 20 is manufactured.

Next, a method of using the molding hook and loop fastener 1 of the first embodiment manufactured using the manufacturing method described above will be described.

The molding hook and loop fastener 1 of the first embodiment is used by being integrally molded to a cushion body (foam body) such as an automobile seat.

Figure 17:
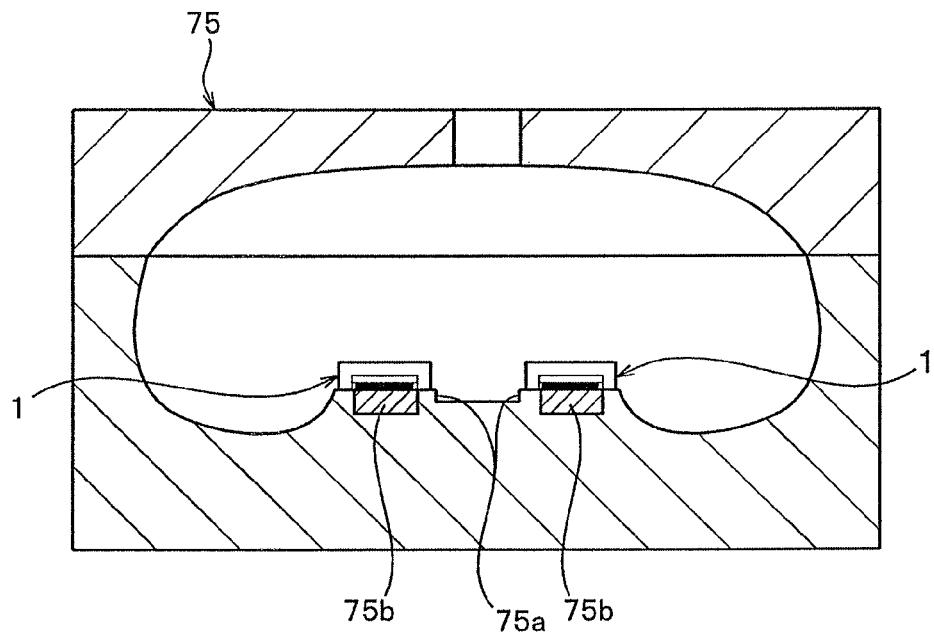
FIG. 17 is a cross-sectional view illustrating a mold used for molding a cushion body.

In order to integrally mold the molding hook and loop fastener 1 of the first embodiment to the cushion body, the molding hook and loop fastener 1 having a necessary length is placed on the cavity surface of a molding mold 75 of a cushion body as illustrated in FIG. 17, for example.

In this case, for example, when a recessed groove (trench) for mounting the molding hook and loop fastener 1 is formed in the cushion body so that the molding hook and loop fastener 1 is fixed in the recessed groove, a projection portion 75a corresponding to the recessed groove of the cushion body is formed in the cavity surface of the mold 75, and a magnet 75b such as a neodymium magnet is embedded in a top face (tip face) of the projection portion 75a.

Due to this, by placing the molding hook and loop fastener 1 in a direction where the upper surface side where the engaging elements 17 are erected faces the top face of the projection portion 75a, the linear magnetic body 9 disposed in the molding hook and loop fastener 1 is attracted by the attracting force of the magnet 75b, and the molding hook and loop fastener 1 is adsorbed and fixed to the flat top face of the projection portion 75a.

In particular, by using the magnetic force generated between the magnet 75b embedded in the projection portion 75a and the linear magnetic body 9 of the molding hook and loop fastener 1 in such a manner, it is possible to obtain a self-alignment effect that the molding hook and loop fastener 1 can be automatically aligned at a predetermined position of the projection portion 75a.

Further, since the coupling member 20 of the molding hook and loop fastener 1 of the first embodiment is formed of a flexible foam body, and the vertical wall coupling portion 21, the penetration preventing lateral wall portion 22, the lateral wall coupling portion 23, and the anchoring portion 24 of the coupling member 20 are formed in the size within a predetermined range described above, appropriate rigidity is secured.

Figure 22:
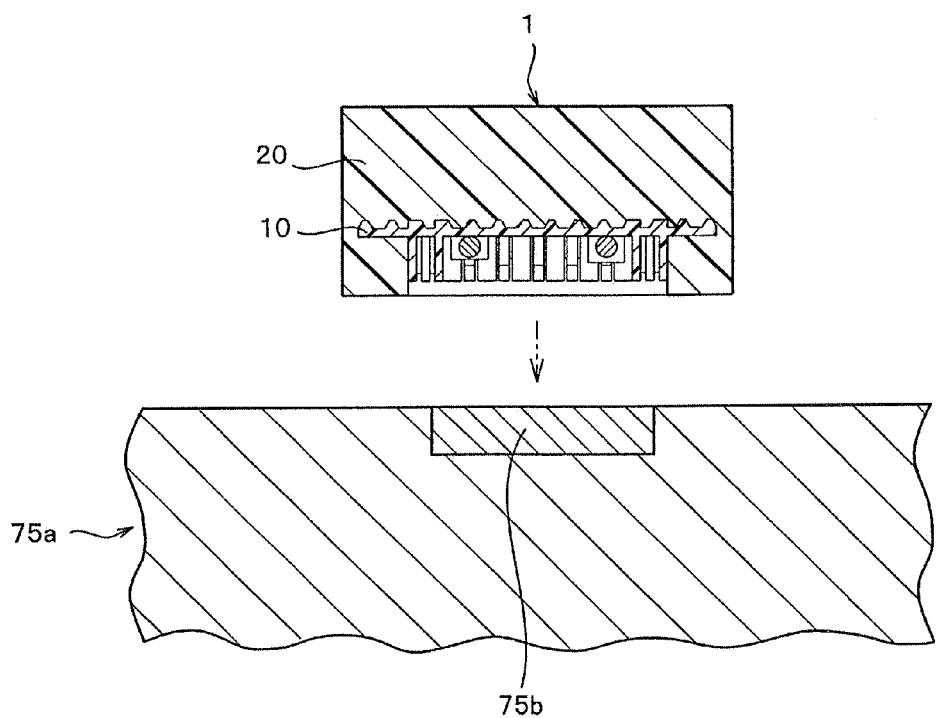
FIG. 22 is a cross-sectional view illustrating a state before a molding hook and loop fastener is adsorbed and fixed to a projection of a mold.

Due to this, the coupling member 20 can be bent in the width direction and the front-rear direction as described above, and the coupling member 20 is prevented from being bent at an acute angle or being broken with the weight of the molding hook and loop fastener 1, for example. Due to this, when placing the molding hook and loop fastener 1 on the top face of the projection portion 75a, by bringing the molding hook and loop fastener 1 close to the projection portion 75a as illustrated in FIG. 22, the molding hook and loop fastener 1 can be easily adsorbed and fixed to the projection portion 75a by the magnetic force described above.

Moreover, in the molding hook and loop fastener 1 of the first embodiment, the vertical wall coupling portion 21 of the coupling member 20 is attached to the vertical barrier portion 12 of the surface fastener portion 10, and the penetration preventing lateral wall portion 22 and the lateral wall coupling portion 23 of the coupling member 20 are attached to the lateral barrier portions 15 which are side surfaces of the surface fastener portion 10. Due to this, it is possible to prevent the vertical wall coupling portion 21 and the penetration preventing lateral wall portion 22 from being separated from the surface fastener portion 10 to be bent outward, and it is possible to effectively increase the rigidity of the coupling member 20 between the surface fastener portions 10.

Figure 23:
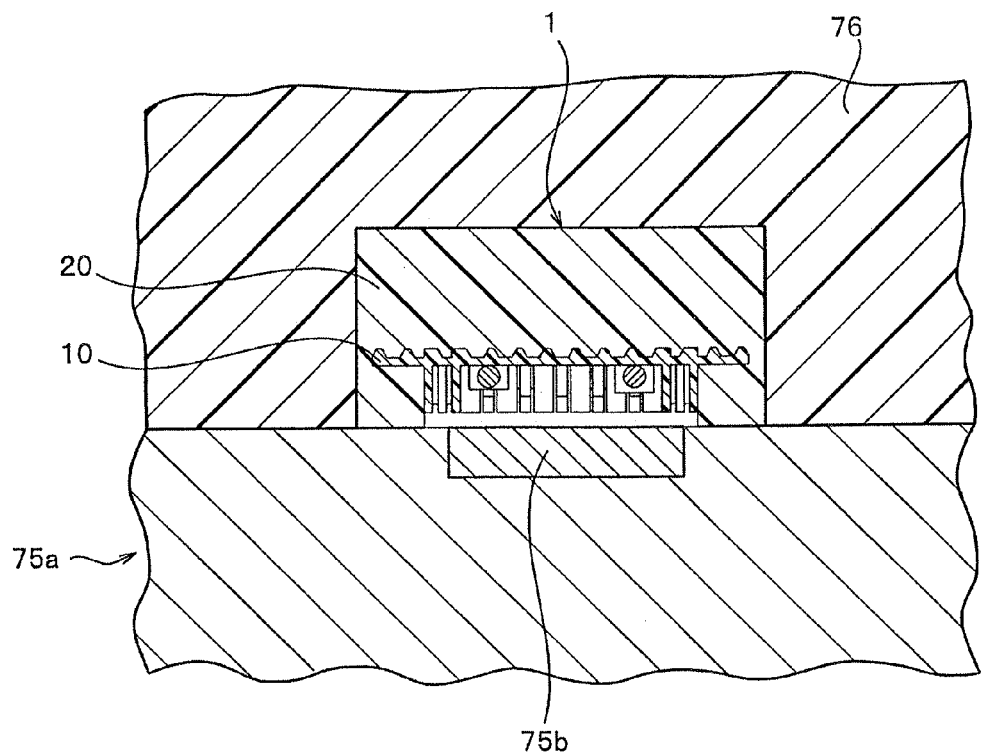
FIG. 23 is a cross-sectional view illustrating a state where a cushion body is expanded and molded.

Moreover, in the case of the first embodiment, as illustrated in FIG. 23, for example, although, in the molding hook and loop fastener 1 adsorbed and fixed to the projection portion 75a, the upper surfaces of the vertical barrier portion 12 and the lateral barrier portion 15 of each surface fastener portion 10 are separated from the top face of the projection portion 75a, the molding hook and loop fastener 1 is held in a state where the upper surfaces of the vertical wall coupling portion 21, the penetration preventing lateral wall portion 22, and the lateral wall coupling portion 23 of the coupling member 20 are attached to the top face of the projection portion 75a.

Figure 24:
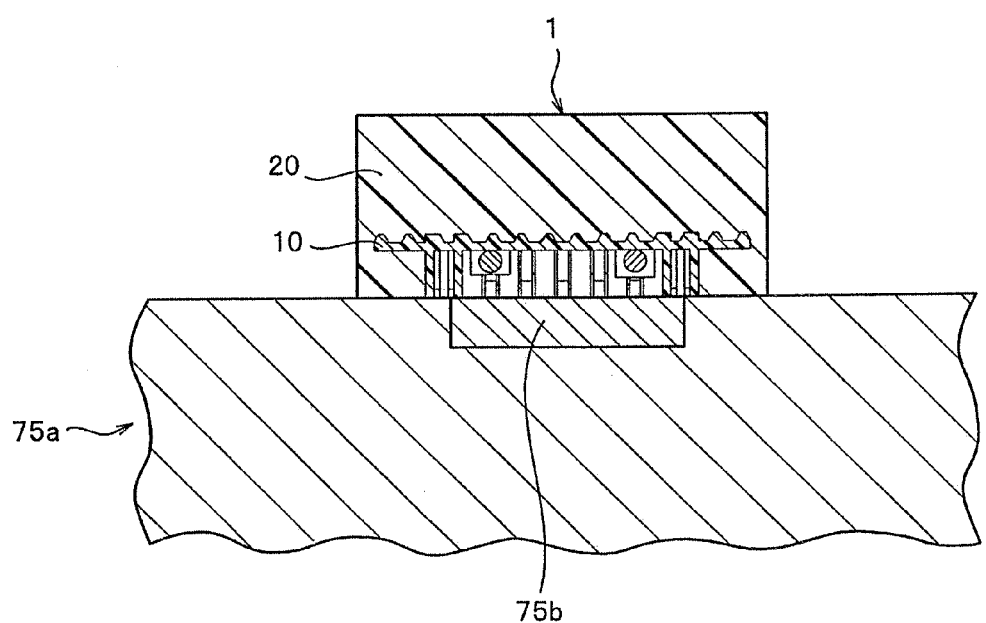
FIG. 24 is a cross-sectional view illustrating a state where a molding hook and loop fastener is adsorbed and fixed to a projection of a mold by strong magnetic force.

In the invention, the coupling member 20 is formed of a foam body. Due to this, for example, when the magnetic force generated between the magnet 75b embedded in the projection portion 75a and the linear magnetic body 9 of the molding hook and loop fastener 1 is strong, as illustrated in FIG. 24, the coupling member 20 may be pressed and compressed, the upper surfaces of the vertical wall coupling portion 21, the penetration preventing lateral wall portion 22, and the lateral wall coupling portion 23 of the coupling member 20 may be attached to the top face of the projection portion 75a, and the upper surfaces of the vertical barrier portion 12 and the lateral barrier portion 15 of the surface fastener portion 10 may also be attached to the top face (actually, the surface of the magnet 75b) of the projection portion 75a.

With this configuration, even when the molding hook and loop fastener is adsorbed by strong magnetic force, the vertical barrier portion 12, the lateral barrier portion 15, and the engaging element 17 of the surface fastener portion 10 make contact with the inner surface (the cavity surface) of the mold 75 to prevent the coupling member 20 from being compressed in a predetermined extent or more. Thus, it is possible to suppress an increase in the frictional force between the mold 75 and the coupling member 20 due to the adsorbing force.

That is, it is possible to reliably suppress intrusion of a resin material while maintaining self-alignment of the molding hook and loop fastener 1. In order to form the molding hook and loop fastener 1 of the first embodiment in this manner, if the coupling member 20 is a foam body though the material of the coupling member 20 has an influence, it is preferable to set the protrusion dimension H1 of the vertical wall coupling portion 21 to be between 0 mm and 2 mm as described above.

Moreover, in the molding hook and loop fastener 1 of the first embodiment, the coupling member 20 is formed of a flexible foam body that can be bent in the width direction and the front-rear direction, and the surface fastener portions 10 themselves are also configured to be bent in the front-rear direction. Due to this, it is possible to easily bend the entire molding hook and loop fastener 1 in an arc shape in the width direction and the front-rear direction.

Figure 18:
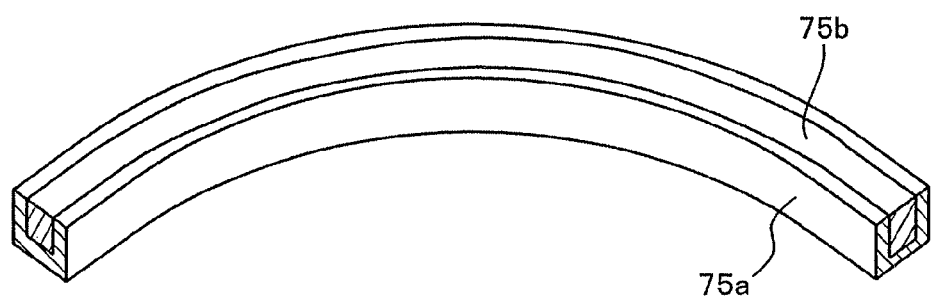
FIG. 18 is a schematic view of a main part, illustrating a projection bent in a width direction, disposed on a cavity surface of a mold.
Figure 19:
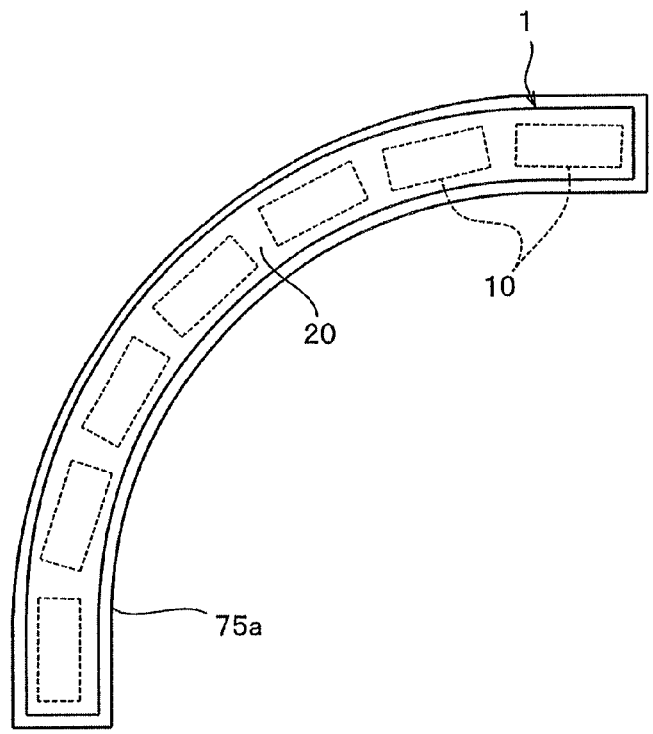
FIG. 19 is a schematic view illustrating a state where a molding hook and loop fastener is adsorbed and fixed to a projection that is bent in a width direction.

Thus, even when the projection portion 75a formed in the molding mold 75 for the cushion body is disposed to be bent in the width direction as illustrated in FIG. 18, for example or is disposed so as to be meandered in a zigzag form in the width direction, by bending the coupling member 20, the molding hook and loop fastener 1 can be stably fixed along the bent or meandering projection portion 75a as illustrated in FIG. 19. Even when the molding hook and loop fastener 1 is bent or meandered in the width direction so as to be adsorbed and fixed to the projection portion 75a in this manner, the upper surfaces of the vertical wall coupling portion 21, the penetration preventing lateral wall portion 22, and the lateral wall coupling portion 23 of the coupling member 20 can be stably attached to the top face of the projection portion 75a.

Figure 20:
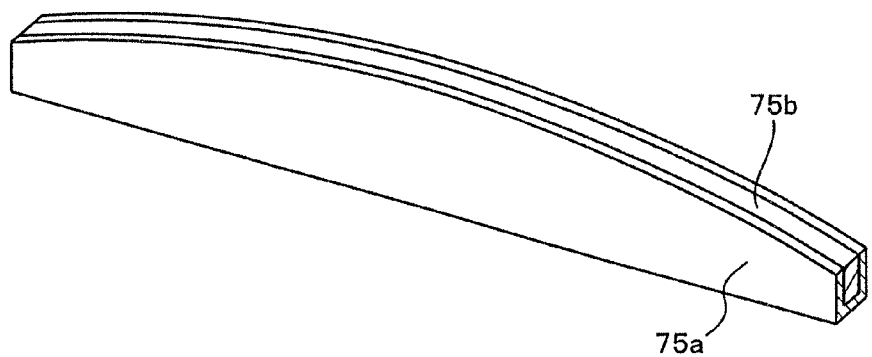
FIG. 20 is a schematic view of a main part, illustrating a projection bent in a front-rear direction, disposed on a cavity surface of a mold.
Figure 21:
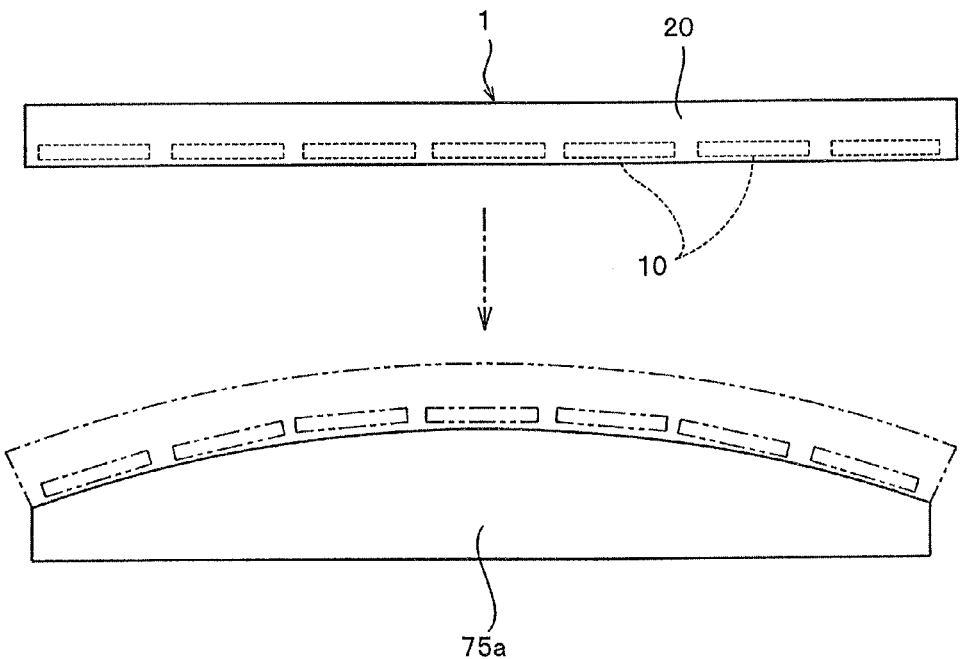
FIG. 21 is an explanatory view for describing a state where a molding hook and loop fastener is adsorbed and fixed to a projection that is bent in a front-rear direction.

Moreover, even when the projection portion 75a formed on the molding mold 75 of the cushion body is disposed so as to be bent in a convex (or a concave) shape in the front-rear direction as illustrated in FIG. 20, for example, by bending the coupling member 20, the molding hook and loop fastener 1 can be stably fixed along the projection portion 75a as illustrated in FIG. 21.

In particular, in this case, since each surface fastener portion 10 is held in a state of being separated from the top face of the projection portion 75a, the surface fastener portion 10 and the projection portion 75a will not interfere with each other. Moreover, the coupling member 20 is formed of a foam body (resilient body). Due to this, when the molding hook and loop fastener 1 is placed on the projection portion 75a, the upper surfaces of the vertical wall coupling portion 21, the penetration preventing lateral wall portion 22, and the lateral wall coupling portion 23 of the coupling member 20 can be stably attached so as to follow the top face of the projection portion 75a, and it is possible to prevent forming of a gap between the coupling member 20 and the top face of the projection portion 75a.

After the molding hook and loop fastener 1 of the first embodiment is adsorbed and fixed at a predetermined position of the cavity surface of the mold 75 as described above, a foaming resin material of the cushion body is injected from the injection nozzle while moving the injection nozzle relative to the mold 75, whereby the foaming resin material is injected to every corner of the cavity space of the mold 75. Further, after a predetermined amount of foaming resin material is injected from the injection nozzle, the mold 75 is clamped. In this way, the foaming resin material expands and spreads over the entire cavity space of the mold 75, and the cushion body 76 is molded (see FIG. 23).

In this case, since the molding hook and loop fastener 1 is aligned and fixed at a predetermined position by the attracting effect of the magnet 75b embedded in the mold 75, the position of the molding hook and loop fastener 1 is not changed according to the flow and the expansion pressure of the foaming resin material.

Moreover, the upper surfaces of the vertical wall coupling portion 21 and the penetration preventing lateral wall portion 22 of the coupling member 20 are reliably attached to the top face of the projection portion 75a, and a gap through which the foaming resin material passes is not formed between the coupling member 20 and the top face of the projection portion 75a. Due to this, the coupling member 20 can completely block a space between an outer area (that is, the cavity space) of the molding hook and loop fastener 1 and the engaging element areas 18 formed in the respective surface fastener portions 10 of the molding hook and loop fastener 1.

Due to this, even when a foaming resin material is injected from the injection nozzle and the foaming resin material strongly collides with the molding hook and loop fastener 1 (in particular, the vertical wall coupling portion 21 and the penetration preventing lateral wall portion 22 of the coupling member 20) and the foaming resin material has very low viscosity, it is possible to prevent the foaming resin material from penetrating into the engaging element area 18 by flowing over the vertical wall coupling portion 21 and the penetration preventing lateral wall portion 22. Moreover, it is possible to allow the engaging elements 17 in the respective engaging element areas 18 to be exposed reliably without being embedded in the foam body.

Moreover, in this case, the coupling member 20 of the molding hook and loop fastener 1 is formed of a foam body. Due to this, the foaming resin material of the cushion body may penetrate into bubbles of the coupling member 20 that is formed of a foam body. In this case, even when the foaming resin material of the cushion body penetrates into the bubbles (for example, interconnected cells) of the coupling member 20, the foaming resin material may not penetrate through the coupling member 20, and the foaming resin material of the cushion body can be held so as to remain in the vertical wall coupling portion 21 and the penetration preventing lateral wall portion 22 of the coupling member 20.

Since the foaming resin material of the cushion body is held on the outer surface side of the vertical wall coupling portion 21 and the penetration preventing lateral wall portion 22 in this manner, it is possible to increase the fastening strength between the molding hook and loop fastener 1 and the cushion body. Further, when the coupling member 20 and the cushion body are formed of the same types of synthetic resin (foaming resin), it is possible to further increase the fastening strength between the molding hook and loop fastener 1 and the cushion body.

After that, the foaming resin material is expanded and solidified in the cavity space of the mold 75 and the molding ends, whereby a cushion body in which the molding hook and loop fastener 1 of the first embodiment is integrally molded along the recessed groove can be obtained.

In the cushion body manufactured in this manner to which the molding hook and loop fastener 1 is attached, since no foam body penetrates in the engaging element areas 18 of the molding hook and loop fastener 1, desired fastening strength can be stably secured by the plurality of engaging elements 17 exposed to the upper surface side. Therefore, when a skin material is covered on the surface of the obtained cushion body and the skin material is pressed toward the mounting position of the molding hook and loop fastener 1 on the cushion body, the female engaging elements 17 disposed on the rear surface of the skin material can be reliably engaged with the engaging elements (male engaging elements) 17 of the molding hook and loop fastener 1. In this manner, the skin material can be accurately attached along the surface of the cushion body without floating from the cushion body.

The molding hook and loop fastener 1 according to the first embodiment is not limited to the specific embodiment described above, and various changes can be made as long as substantially the same configuration and the same function and effect as the invention are implemented.

Figure 25:
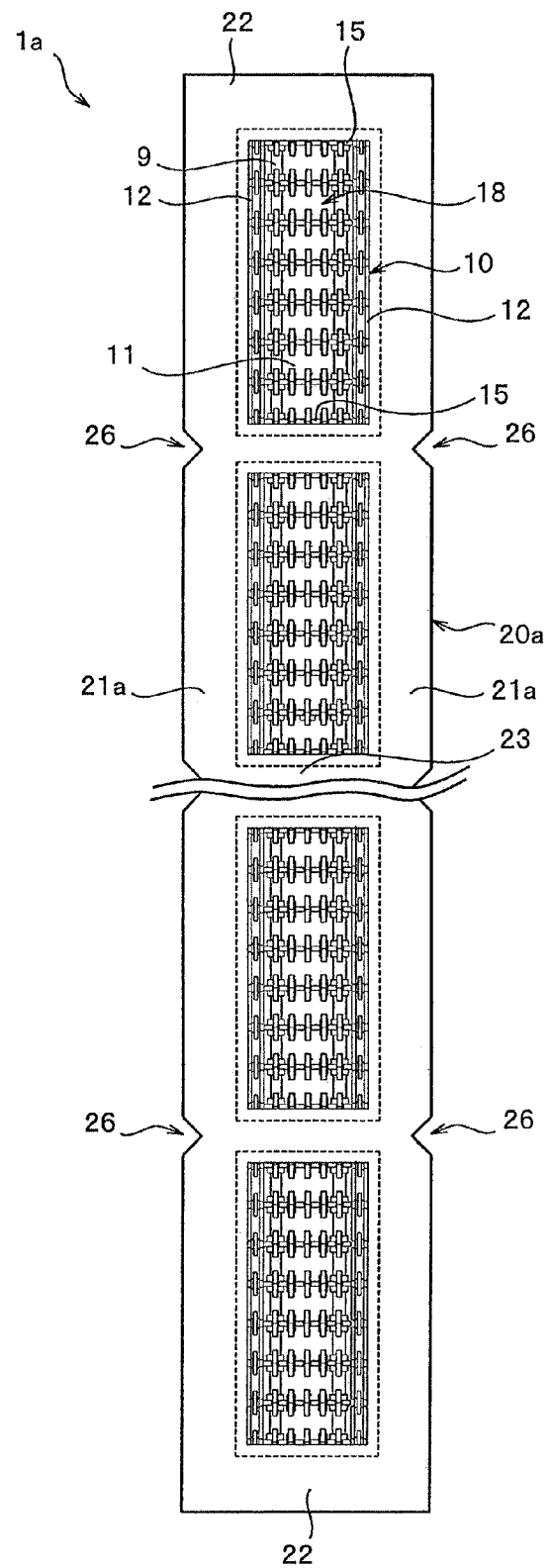
FIG. 25 is a plan view illustrating a molding hook and loop fastener according to a first modification example of the first embodiment.
Figure 26:
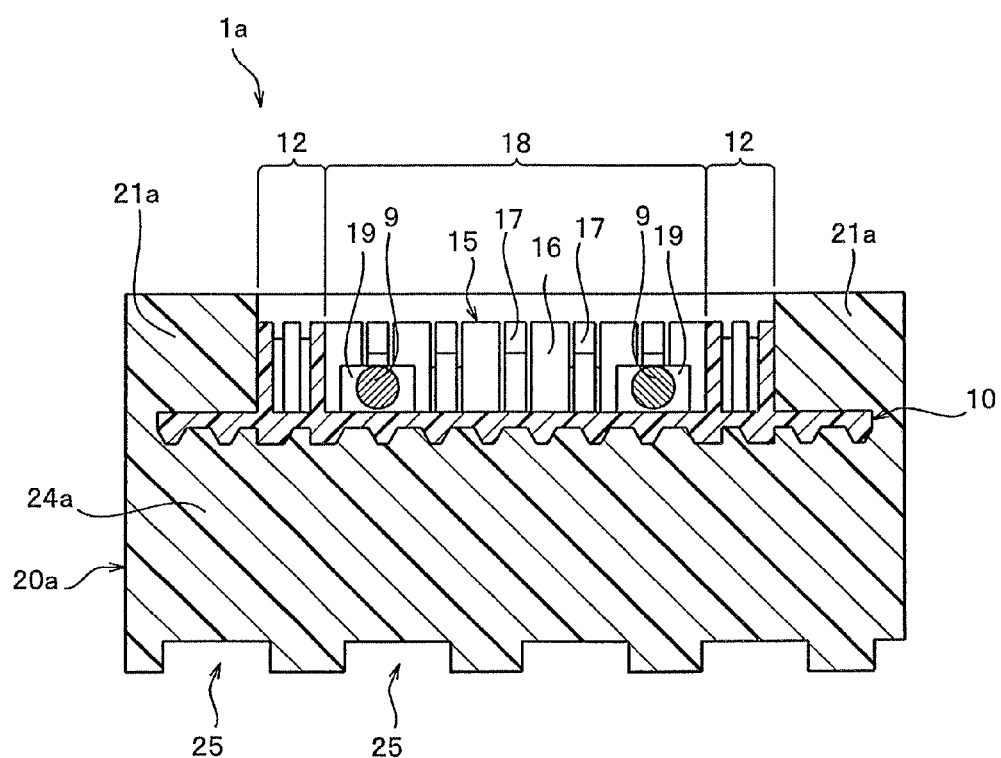
FIG. 26 is a cross-sectional view of the molding hook and loop fastener.

Here, FIG. 25 illustrates a plan view of a molding hook and loop fastener 1a according to a first modification example of the first embodiment and FIG. 26 illustrates a cross-sectional view of the molding hook and loop fastener 1a.

In the molding hook and loop fasteners according to the first and second modification examples of the first embodiment and molding hook and loop fasteners according to second to seventh embodiments, configurations different from those of the molding hook and loop fastener 1 according to the first embodiment will be mainly described. Components and members having substantially the same configuration as the molding hook and loop fastener 1 according to the first embodiment will be denoted by the same reference numerals, and description thereof will not be provided.

The molding hook and loop fastener 1a according to the first modification example includes a plurality of surface fastener portions 10 and a coupling member 20a that connects these surface fastener portions 10. Moreover, the coupling member 20a includes a pair of right and left vertical wall coupling portions 21a, penetration preventing lateral wall portions 22 disposed on the front and rear end portions of the molding hook and loop fastener 1a, a lateral wall coupling portion 23 disposed between the adjacent surface fastener portions 10, and an anchoring portion 24a disposed on the lower surface side of the surface fastener portion 10.

In the coupling member 20a of the first modification example, the pair of vertical wall coupling portions 21a is continuously disposed in the entire longitudinal direction of the molding hook and loop fastener 1a and is attached to the outer surfaces of the right and left vertical barrier portions 12 of each surface fastener portion 10 and upper surfaces of right and left lateral extension portions 11b of a base portion 11. Moreover, the anchoring portion 24a is attached to the lower surface side of the base portion 11 of each surface fastener portion 10 and is integrated with the vertical wall coupling portion 21a, the penetration preventing lateral wall portion 22, and the lateral wall coupling portion 23 of the coupling member 20a.

A plurality of recessed portions 25 (or projection parts) disposed in parallel to a forward-backward direction are formed on the lower surface of the anchoring portion 24a. Since the plurality of recessed portions 25 are formed, when the molding hook and loop fastener 1a is integrally molded to a cushion body, by increasing the bonding area between the anchoring portion 24a and the cushion body, it is possible to increase the bonding strength between the molding hook and loop fastener 1a and the cushion body. In the invention, in order to increase the bonding strength between the molding hook and loop fastener 1a and the cushion body, non-woven fabrics may be bonded or attached to the lower surface of the anchoring portion 24a, for example.

Moreover, in the coupling member 20a of the first modification example, a notch portion 26 (or a concave portion) that is notched toward the inner side in an approximately triangular shape is formed on the outer side edges of the right and left vertical wall coupling portions 21a and the anchoring portion 24a at positions corresponding to the arrangement positions of the lateral wall coupling portions 23.

Since such a notch portion 26 is formed, when the molding hook and loop fastener 1a is bent in an arc shape toward the left or right side, the side edges of the coupling member 20a serving as the outer circumference side during the bending can easily expand, and the side edges of the coupling member 20a serving as the inner circumference side during the bending can easily bend.

In this manner, when the molding hook and loop fastener 1a is bent in the width direction, wrinkles or buckling will rarely occur in the vertical wall coupling portion 21a and the anchoring portion 24a of the coupling member 20a. Further, since it is possible to reduce the internal stress occurring in the vertical wall coupling portion 21a and the anchoring portion 24a of the coupling member 20a, it is possible to suppress cracks from being formed in the vertical wall coupling portion 21a and the anchoring portion 24a of the coupling member 20a.

When such notch portions 26 as described above are formed in the vertical wall coupling portion 21a and the anchoring portion 24a, a maximum dimension (maximum width dimension) in the width direction of each notch portion 26 is set to be smaller than a width dimension of a portion of the vertical wall coupling portion 21a where the notch portion 26 is not disposed. In this way, it is possible to suppress a decrease in the strength of the vertical wall coupling portion 21a and the anchoring portion 24a due to the forming of the notch portions 26 and to stably maintain the state where the plurality of surface fastener portions 10 are connected by the coupling member 20a.

The molding hook and loop fastener 1a according to the first modification example is manufactured using the same method as the method for manufacturing the molding hook and loop fastener 1 according to the first embodiment by forming a molding space portion (cavity space) of a mold used for molding the coupling member 20a in a predetermined shape.

Figure 27:
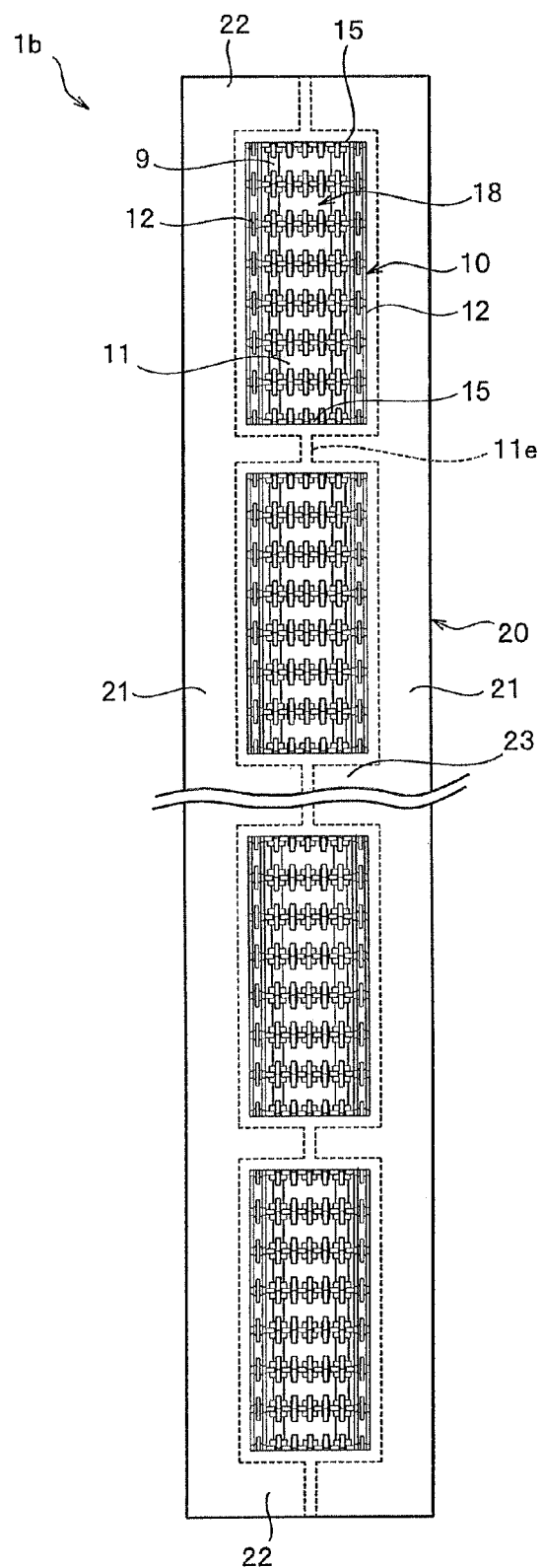
FIG. 27 is a plan view illustrating a molding hook and loop fastener according to a second modification example of the first embodiment.

Next, a molding hook and loop fastener 1b according to a second modification example of the first embodiment will be described with reference to FIG. 27. Here, FIG. 27 is a plan view illustrating the molding hook and loop fastener 1b according to the second modification example.

The molding hook and loop fastener 1b according to the second modification example includes a plurality of surface fastener portions 10 and a coupling member 20 that connects these surface fastener portions 10. Although the respective surface fastener portions 10 themselves of the second modification example have the same configuration as the surface fastener portions 10 of the first embodiment, in the second modification example, the base portions 11 of the adjacent surface fastener portions 10 are connected by a base connecting portion 11e. The base connecting portion 11e is formed of the same synthetic resin as the surface fastener portion 10 and is integrated with the base portion 11.

Since the base connecting portion 11e is disposed so as to connect the surface fastener portions 10, the vertical wall coupling portion 21a of the coupling member 20 is reinforced, and the connection between the surface fastener portions 10 can be more strengthened. Thus, it is possible to further increase the rigidity of the molding hook and loop fastener 1b. Due to this, when the molding hook and loop fastener 1b is placed on the top face of the projection portion 75a of the mold 75 in an expansion molding step of the cushion body, it is possible to further facilitate the alignment of the molding hook and loop fastener 1b in relation to the projection portion 75a and to improve the attachment workability of the molding hook and loop fastener 1b.

Figure 5:
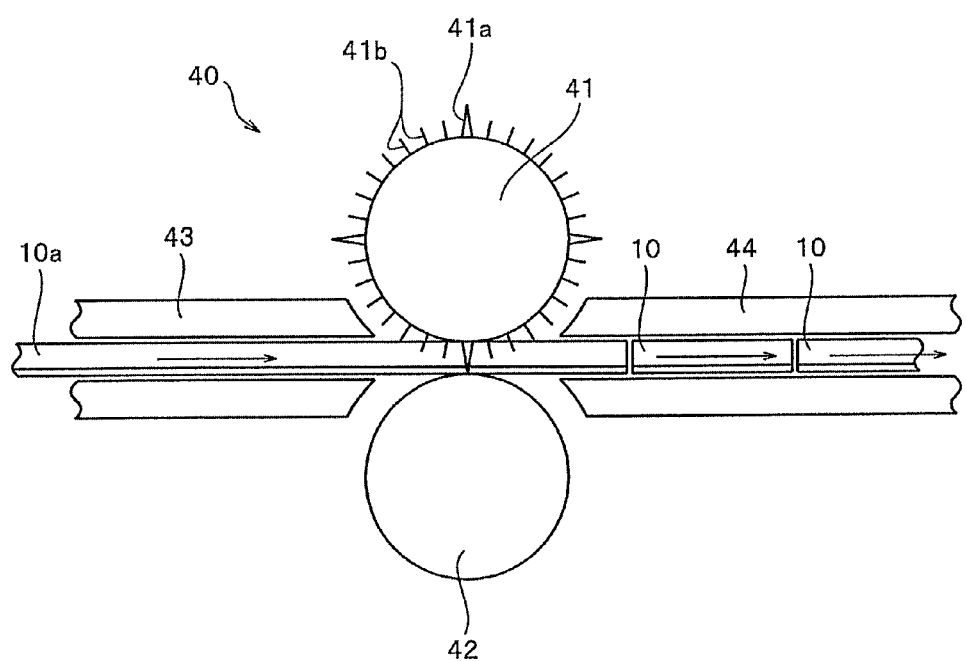
FIG. 5 is an explanatory view for schematically describing steps of cutting a molding hook and loop fastener portion.

When the molding hook and loop fastener 1b according to the second modification example is manufactured, first, the continuous surface fastener portion 10a is manufactured using the manufacturing apparatus 30 illustrated in FIG. 4, and then, the obtained continuous surface fastener portion 10a is cut in the cutting device 40 illustrated in FIG. 5. In this case, in the cutting step, the continuous surface fastener portion 10a is cut so that the base connecting portion 11e remains between the surface fastener portions 10.

After that, similarly to the manufacturing of the molding hook and loop fastener 1b according to the first embodiment, expansion molding of the coupling member 20 is performed using the first continuous expansion molding apparatus 50 illustrated in FIG. 7 or the second continuous expansion molding apparatus 60 illustrated in FIG. 11, and the coupling member 20 is cut to a predetermined length dimension. In this way, the molding hook and loop fastener 1b according to the second modification example is continuously manufactured.

Figure 28:
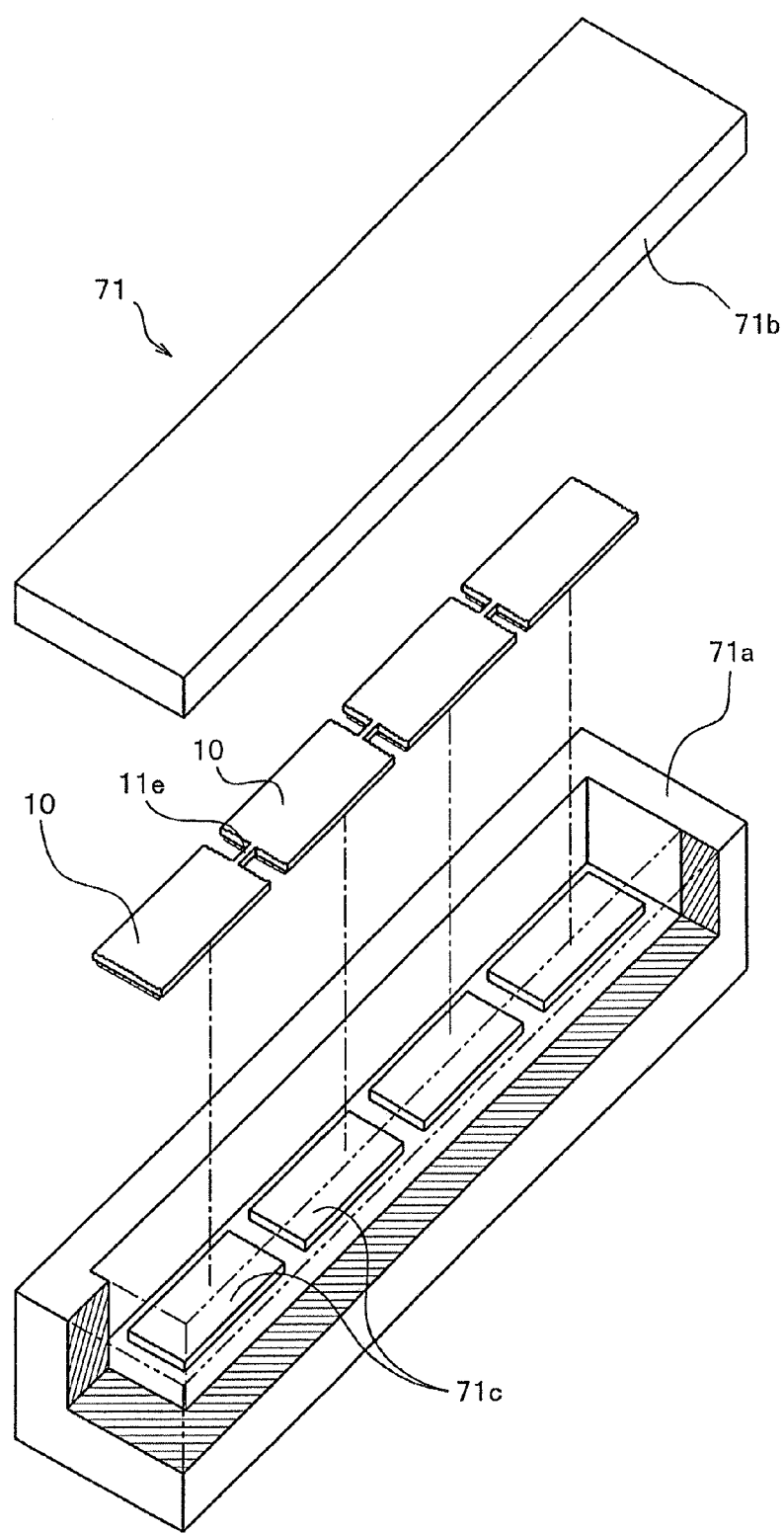
FIG. 28 is an explanatory view for schematically describing steps of manufacturing a molding hook and loop fastener according to the second modification example.

Moreover, in the case of the second modification example, the molding hook and loop fastener 1b can be also manufactured by performing expansion molding of the coupling member 20 using the first mold 71 as illustrated in FIG. 28 or the second mold 72 (see FIGS. 15 and 16) described above, for example. In this case, the configurations of the first and second molds 71 and 72 themselves are the same as those of the first and second molds 71 and 72 described in the first embodiment.

When the molding hook and loop fastener 1b according to the second modification example is manufactured using the first or second mold 71 or 72 in this manner, since the surface fastener portions 10 are connected to each other by the base connecting portion 11e, the operation of causing the surface fastener portion 10 to be adsorbed and fixed to the mounting portion 71c formed in the fixed mold of the first mold 71 or to the attachment portion 72c formed in the movable mold of the second mold 72 can be easily performed, and the molding hook and loop fastener 1b can be manufactured efficiently.

Second Embodiment

Figure 29:
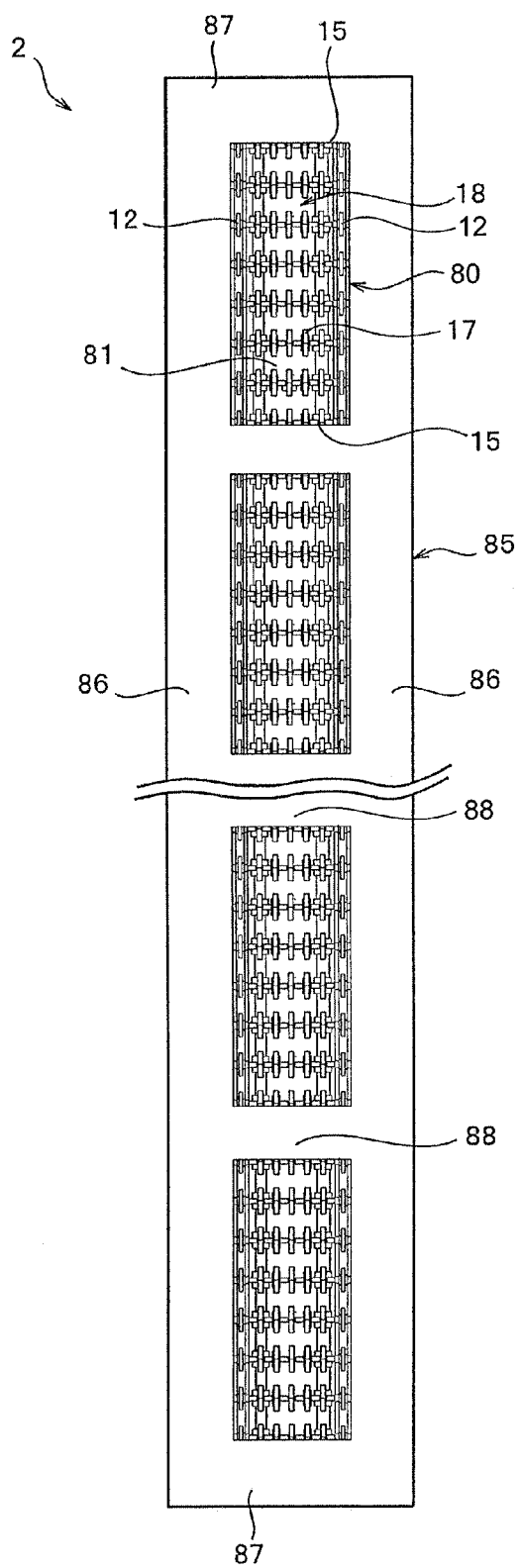
FIG. 29 is a plan view illustrating a molding hook and loop fastener according to a second embodiment of the invention.
Figure 30:
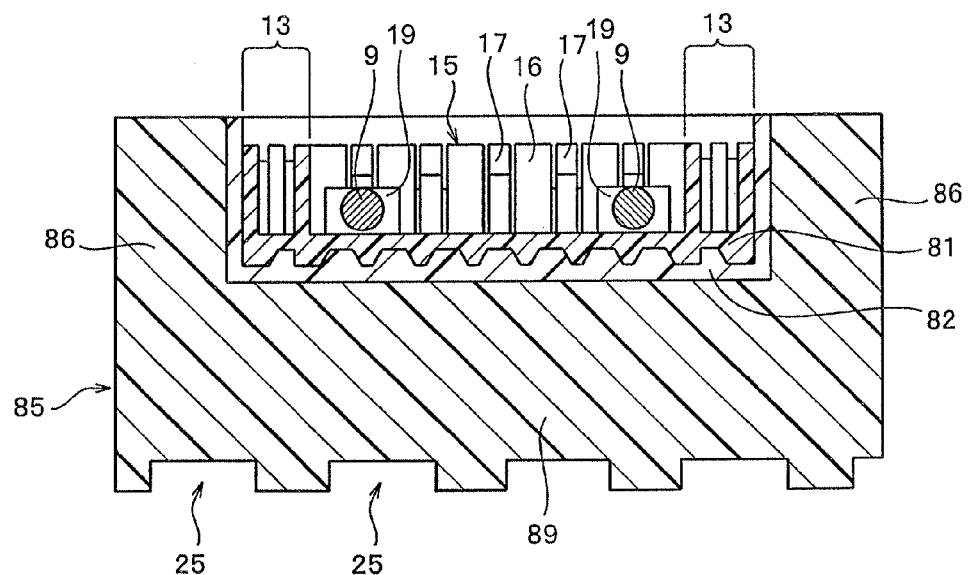
FIG. 30 is a cross-sectional view of the molding hook and loop fastener.

FIG. 29 is a plan view illustrating a molding hook and loop fastener according to a second embodiment, and FIG. 30 is a cross-sectional view of the molding hook and loop fastener.

A molding hook and loop fastener 2 according to the second embodiment includes a plurality of surface fastener portions 80 and a coupling member 85 that connects these surface fastener portions 80, and the respective surface fastener portions 80 are connected by the coupling member 85 so that central positions in a width direction of the respective surface fastener portions are disposed on a straight line along a longitudinal direction.

Each surface fastener portion 80 includes a planar base portion 81, right and left vertical barrier portions 12 that are erected on an upper surface of the base portion 81, a plurality of engaging elements (male engaging elements) 17 disposed between the right and left vertical barrier portions 12, a plurality of lateral barrier walls 16 that constitute the lateral barrier portion 15 together with the engaging element 17, a linear magnetic body 9 fixed to the upper surface of the base portion 81 along the longitudinal direction, and a fixing portion 19 that fixes the linear magnetic body 9.

In the surface fastener portion 80 of the second embodiment, the base portion 81 is configured such that the right and left lateral extension portions 11b and the front and rear extension portions 11c and 11d are removed from the base portion 11 of the first embodiment. The other configurations of the surface fastener portion 80 are substantially the same as those of the surface fastener portion 10 according to the first embodiment.

The coupling member 85 that connects the plurality of surface fastener portions 80 includes a pair of right and left vertical wall coupling portions 86, penetration preventing lateral wall portions 87 disposed on the front and rear end portions of the molding hook and loop fastener 2, a lateral wall coupling portion 88 disposed between the adjacent surface fastener portions 80, and an anchoring portion 89 disposed on the lower surface (rear surface) side of the surface fastener portion 80. Each dimension of the coupling member 85 is set to be the same as the case of the first embodiment.

In this case, although the vertical wall coupling portion 86, the penetration preventing lateral wall portion 87, the lateral wall coupling portion 88, and the anchoring portion 89 of the coupling member 85 are integrated with each other, the surface fastener portion 80 is not embedded in the coupling member 85, but the coupling member 85 and the surface fastener portion 80 are attached by an adhesive layer 82 formed of an adhesive agent as will be described later.

Specifically, the right and left vertical wall coupling portions 86 are attached to the outer surfaces of the right and left vertical barrier portions 12 of each surface fastener portion 80 by the adhesive layer 82. The penetration preventing lateral wall portion 87 and the lateral wall coupling portion 88 are disposed between the right and left vertical wall coupling portions 86 and are attached to the lateral barrier portion 15 of the surface fastener portion 80 by the adhesive layer 82.

The anchoring portion 89 of the coupling member 85 is attached to the lower surface side of the base portion 81 of each surface fastener portion 80 by the adhesive layer 82. A plurality of recessed portions 25 (or projections) disposed in parallel to the forward-backward direction are formed on the lower surface of the anchoring portion 89 in order to increase the bonding area between the coupling member and the cushion body.

Next, a method for manufacturing the molding hook and loop fastener 2 according to the second embodiment will be described.

First, a continuous surface fastener portion corresponding to the surface fastener portion 80 of the second embodiment is manufactured using the manufacturing apparatus 30 illustrated in FIG. 4. After that, the obtained continuous surface fastener portion is cut using the cutting device 40 illustrated in FIG. 5. In this way, a plurality of surface fastener portions 80 having a predetermined length are manufactured.

Moreover, in the second embodiment, separately from the step of manufacturing a plurality of surface fastener portions 80, a step of expanding and molding an expanded resin sheet 85a (expanded urethane sheet) that is processed into the coupling member 85 is performed. The expanded resin sheet 85a is a long sheet having a rectangular cross-sectional shape.

Figure 31:
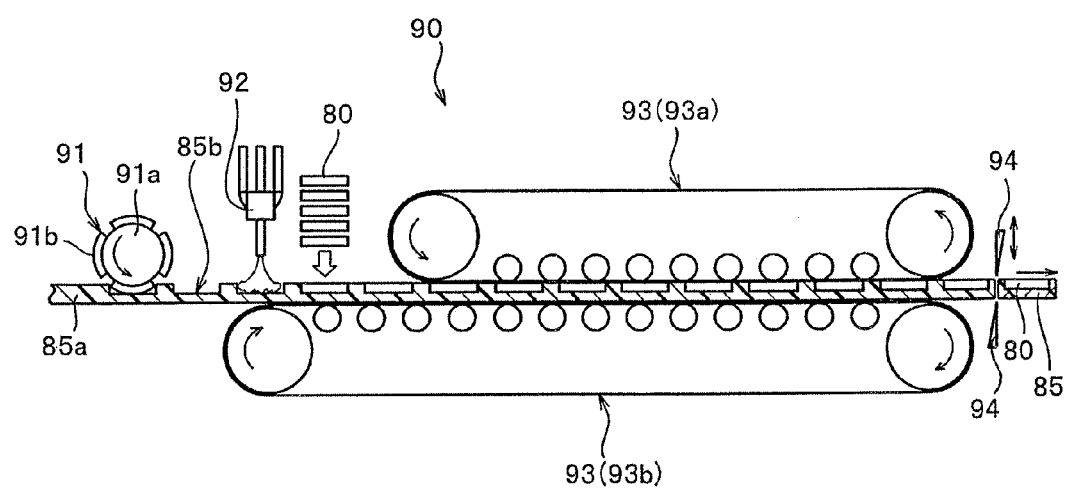
FIG. 31 is an explanatory view for schematically describing steps of manufacturing the molding hook and loop fastener.

Subsequently, concave portions 85b are formed on the expanded resin sheet 85a using a bonding apparatus 90 as illustrated in FIG. 31 to form the coupling member 85 (see FIG. 32), and the surface fastener portions 80 are bonded to the coupling member 85.

The bonding apparatus 90 includes a sheet supply portion (not illustrated) that heats and supplies the expanded resin sheet 85a, a thermal molding portion 91 that thermally molds the concave portions 85b on the supplied expanded resin sheet 85a to form the coupling member 85, an adhesive agent supply nozzle 92 that applies an adhesive agent to the concave portions 85b of the coupling member 85, a surface fastener supply portion (not illustrated) that supplies the surface fastener portion 80 to the concave portions 85b of the coupling member 85, a conveying portion 93 that conveys the coupling member 85 and the surface fastener portion 80 at a predetermined speed while pressing the same from the vertical direction, and a cutting portion 94 that is disposed on the downstream side of the conveying portion 93 so as to cut the coupling member 85 into a predetermined length.

The thermal molding portion 91 includes a thermal molding roller 91a, heating and pressing portions 91b disposed at a predetermined interval around the circumferential surface of the thermal molding roller 91a, and a support roller (not illustrated) that supports the expanded resin sheet 85a to be thermally molded from the lower surface side. In this case, the heating and pressing portions 91b have a shape and dimensions corresponding to the shape and dimensions of the concave portions 85b that are formed on the expanded resin sheet 85a.

The conveying portion 93 includes a pair of upper and lower conveyers 93a and 93b. The conveying portion 93 presses the coupling member 85 and the surface fastener portions 80 from the vertical direction while conveying the coupling member 85 and the surface fastener portions 80 accommodated in the concave portions 85b between the upper and lower conveyers 93a and 93b. In this way, the surface fastener portions 80 are attached to the coupling member 85.

Figure 32:
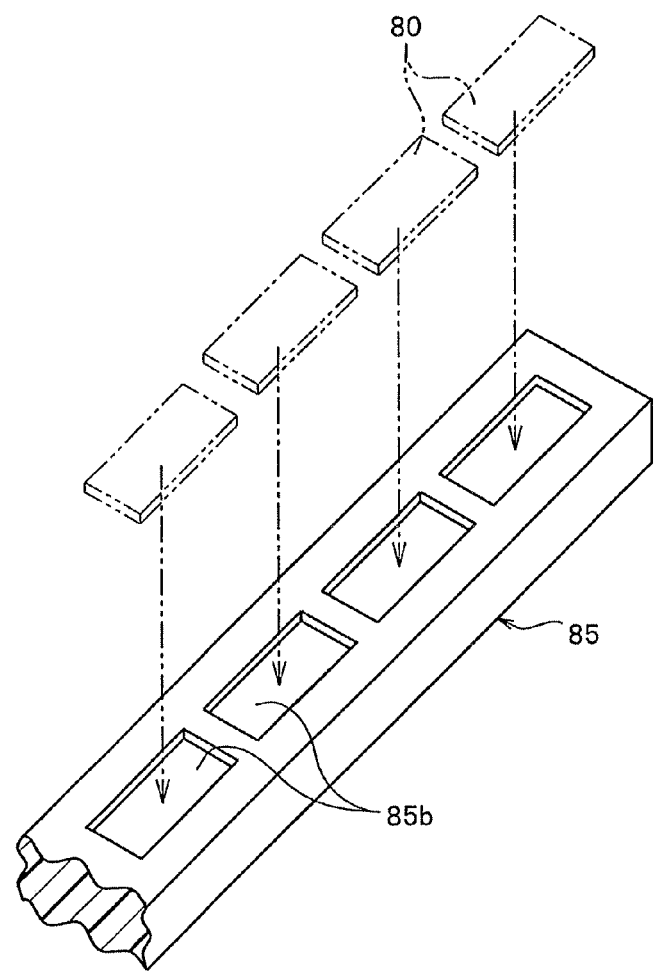
FIG. 32 is an explanatory view for schematically describing other steps of manufacturing the molding hook and loop fastener.

According to such a bonding apparatus 90, first, by forming the concave portions 85b at a predetermined interval along the longitudinal direction of the expanded resin sheet 85a in the thermal molding portion 91, the coupling member 85 having the plurality of concave portions 85b as illustrated in FIG. 32 is obtained.

Subsequently, an adhesive agent is applied to the inner surfaces of each concave portion 85b of the coupling member 85, and the surface fastener portions 80 are supplied one by one to the respective concave portions 85b, whereby the surface fastener portions 80 are attached to the coupling member 85. After that, the coupling member 85 is cut to a predetermined length dimension in the cutting portion 94, whereby the molding hook and loop fastener 2 of the second embodiment in which the plurality of surface fastener portions 80 are connected in the longitudinal direction by the coupling member 85 is continuously manufactured.

In the second embodiment, the molding hook and loop fastener 2 can also be manufactured by a manual operation of attaching the surface fastener portions 80 one by one to the respective concave portions 85b of the thermally molded coupling member 85 without using the bonding apparatus 90 described above.

The molding hook and loop fastener 2 of the second embodiment obtained in this manner is integrally molded to a cushion body such as an automobile sheet and used similarly to the first embodiment described above.

That is, the molding hook and loop fastener 2 of the second embodiment is placed, adsorbed, and fixed to the cavity surface of the molding mold 75 of the cushion body (see FIG. 17).

In this case, in the molding hook and loop fastener 2 of the second embodiment, the vertical wall coupling portion 86 of the coupling member 85 is attached to the vertical barrier portion 12 of the surface fastener portion 80, and the penetration preventing lateral wall portion 87 and the lateral wall coupling portion 88 of the coupling member 85 are attached to the lateral barrier portion 15 of the surface fastener portion 80. Due to this, the vertical wall coupling portion 86 and the penetration preventing lateral wall portion 87 are prevented from being separated from the surface fastener portion 80 and being bent outward, and the rigidity of the coupling member 85 between the surface fastener portions 80 can be increased. Therefore, the upper surfaces of the vertical wall coupling portion 86, the penetration preventing lateral wall portion 87, and the lateral wall coupling portion 88 of the coupling member 85 can be attached to the cavity surface.

In the second embodiment, similarly to the first embodiment, even when the projection portion 75a of the molding mold 75 to which the molding hook and loop fastener 2 is adsorbed and fixed is disposed to be bent in the width direction and the front-rear direction, by bending the coupling member 85, the molding hook and loop fastener 2 can be adsorbed and fixed along the projection portion 75a, and the upper surface of the coupling member 85 can be stably attached to the projection portion 75a.

After that, a foaming resin material of the cushion body is injected to the cavity space of the mold 75 and expansion molding is performed, whereby a cushion body to which the molding hook and loop fastener 2 in which the foam body does not penetrate into the engaging element area 18 of the surface fastener portion 80 is integrally molded can be manufactured.

Third Embodiment

Figure 33:
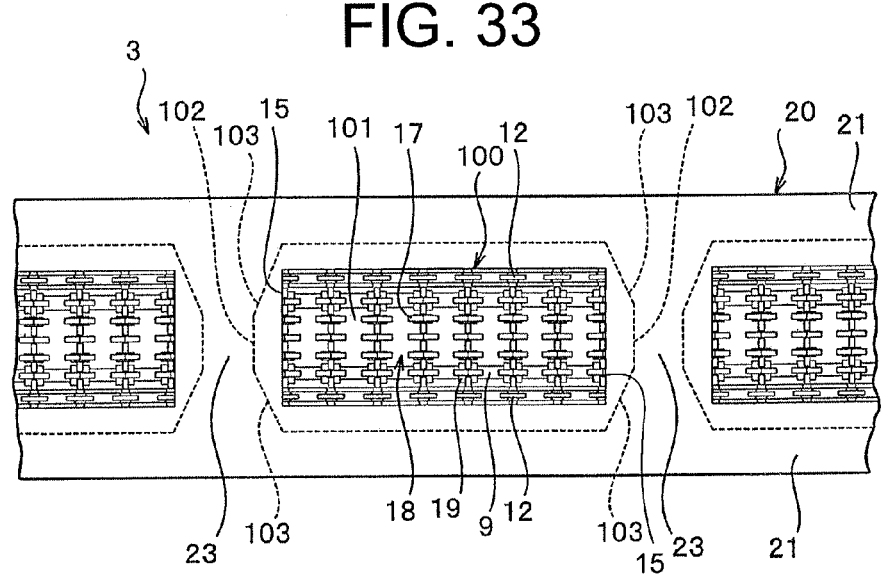
FIG. 33 is a plan view illustrating a molding hook and loop fastener according to a third embodiment of the invention.
Figure 34:
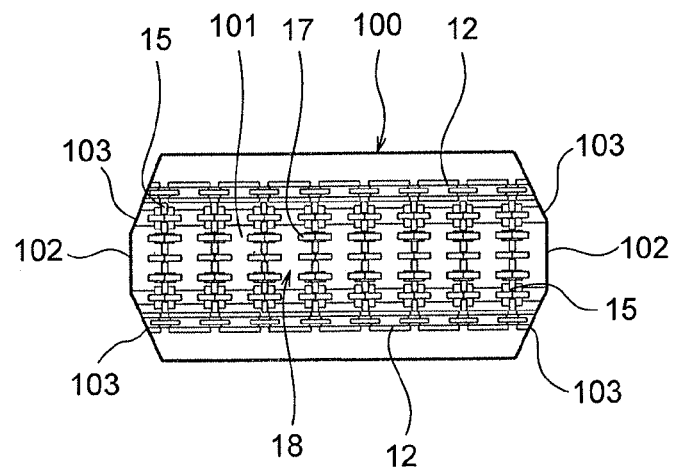
FIG. 34 is a plan view illustrating only a surface fastener portion that constitutes the molding hook and loop fastener.

FIG. 33 is a plan view illustrating a molding hook and loop fastener according to a third embodiment, and FIG. 34 is a plan view illustrating a surface fastener portion that constitutes the molding hook and loop fastener.

A molding hook and loop fastener 3 according to the third embodiment includes a plurality of surface fastener portions 100 and a coupling member 20 that connects these surface fastener portions 100.

Each surface fastener portion 100 includes a planar base portion 101, right and left vertical barrier portions 12 that are erected on an upper surface of the base portion 101, a plurality of engaging elements (male engaging elements) 17 disposed between the right and left vertical barrier portions 12, a plurality of lateral barrier walls 16 that constitute the lateral barrier portion 15 together with the engaging element 17, a linear magnetic body 9 fixed to the upper surface of the base portion 81 along the longitudinal direction, and a fixing portion 19 that fixes the linear magnetic body 9.

In each surface fastener portion 100 of the third embodiment, a parallel portion 102 that is parallel to the width direction and an inclined portion 103 that gradually decreases the length dimension of the base portion 101 toward the right and left side edges are disposed on the front and rear edges of the base portion 101. In this case, the parallel portion 102 is disposed in a central portion in the right-to-left width direction of the base portion 101, and the inclined portion 103 is continuously disposed on both right and left sides of the parallel portion 102.

In the molding hook and loop fastener 3 of the third embodiment, the other configurations except that the inclined portions 103 are formed on the front and rear edges of the base portion 101 are substantially the same as those of the molding hook and loop fastener 1 according to the first embodiment.

Figure 35:
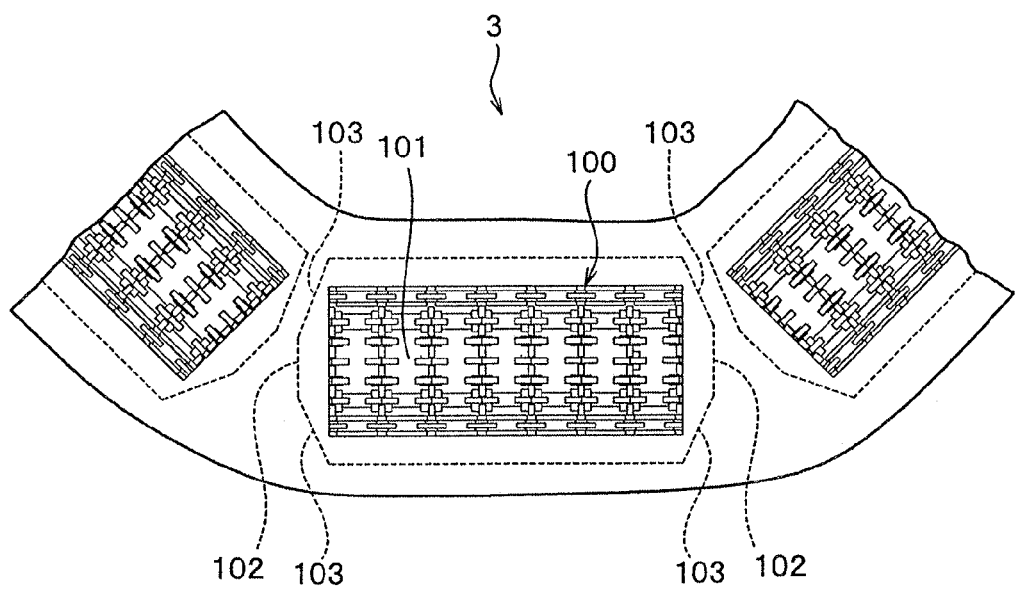
FIG. 35 is a plan view illustrating a state where the molding hook and loop fastener is bent in a width direction.

Since the right and left inclined portions 103 are disposed on the base portion 101 of each surface fastener portion 100 in this manner, when the molding hook and loop fastener 3 is bent in the right-to-left width direction, the adjacent surface fastener portions 100 will rarely interfere with each other as illustrated in FIG. 35, and the molding hook and loop fastener 3 can be easily bent in the width direction so as to form a larger curvature.

Moreover, in this case, for example, even when the gap between the respective surface fastener portions 100 is more narrowed than that of the molding hook and loop fastener 1 of the first embodiment, the molding hook and loop fastener 3 of the third embodiment can be bent in the width direction to the same extent as the molding hook and loop fastener of the first embodiment. By narrowing the gap between the surface fastener portions 100 in this manner, it is possible to extend the engaging element area of each surface fastener portion 100 in the longitudinal direction and thus to increase the fastening strength of the molding hook and loop fastener 3.

Fourth Embodiment

Figure 36:
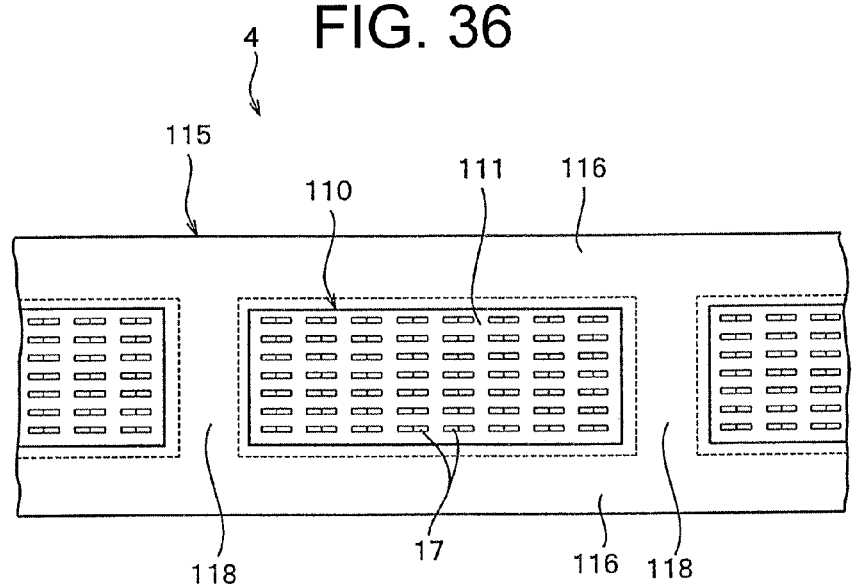
FIG. 36 is a plan view illustrating a molding hook and loop fastener according to a fourth embodiment of the invention.
Figure 37:
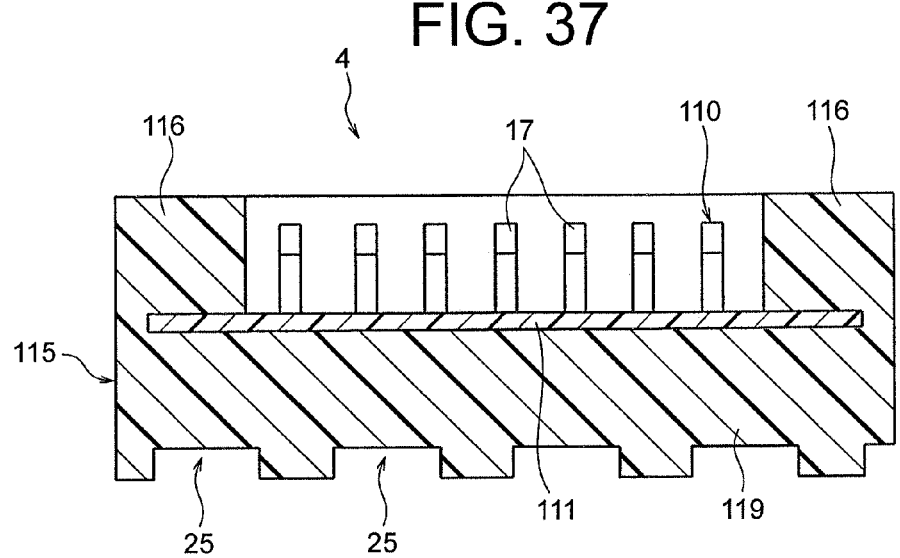
FIG. 37 is a cross-sectional view of the molding hook and loop fastener.
Figure 38:
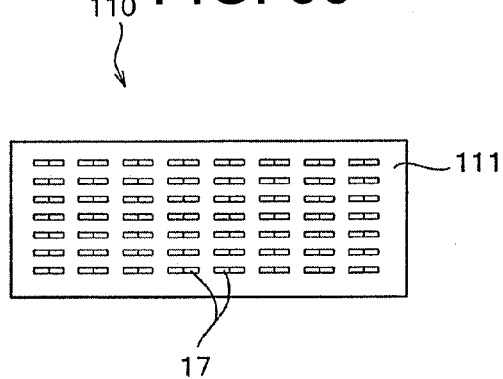
FIG. 38 is a plan view illustrating only a surface fastener portion that constitutes the molding hook and loop fastener.

FIG. 36 is a plan view illustrating a molding hook and loop fastener according to a fourth embodiment, and FIG. 37 is a cross-sectional view of the molding hook and loop fastener. Moreover, FIG. 38 is a plan view illustrating a surface fastener portion that constitutes the molding hook and loop fastener.

A molding hook and loop fastener 4 according to the fourth embodiment includes a plurality of surface fastener portions 110 and a coupling member 115 that connects these surface fastener portions 110.

Each surface fastener portion 110 of the fourth embodiment includes a planar base portion 111 and a plurality of engaging elements (male engaging elements) 17 that are erected on the upper surface of the base portion 111, and the vertical barrier portion 12, the lateral barrier wall 16, the linear magnetic body 9, and the fixing portion 19 disposed in the surface fastener portion 10 of the first embodiment and the like are removed from the surface fastener portion 110.

The base portion 111 of the surface fastener portion 110 has a flat plate shape that has a rectangular shape that extends in the forward-backward direction (longitudinal direction) when seen from the vertical direction. The engaging element 17 includes a rising portion that rises vertically from the upper surface of the base portion 111 and a hook-shaped engaging head that branches in the forward-backward direction from the upper end of the rising portion and is bent. Moreover, in the fourth embodiment, magnetic particles are mixed or impregnated into a synthetic resin that forms the surface fastener portion 110 so that the surface fastener portion 110 has magnetism.

The coupling member 115 of the fourth embodiment includes a pair of right and left vertical wall coupling portions 116, penetration preventing lateral wall portions (not illustrated in FIG. 36) disposed on the front and rear end portions of the molding hook and loop fastener 4, a lateral wall coupling portion 118 disposed between the adjacent surface fastener portions 110, and an anchoring portion 119 disposed on the lower surface side of the surface fastener portion 110. Moreover, a plurality of recessed portions 25 (or projections) disposed in parallel to the forward-backward direction are formed on the lower surface of the anchoring portion 119 in order to increase the bonding area between the coupling member and the cushion body.

Next, a method of manufacturing the molding hook and loop fastener 4 of the fourth embodiment will be described.

First, a continuous surface fastener portion corresponding to the surface fastener portion 110 of the fourth embodiment is manufactured using the manufacturing apparatus 30 illustrated in FIG. 4. After that, the obtained continuous surface fastener portion is cut using the cutting device 40 illustrated in FIG. 5. In this way, a plurality of surface fastener portions 110 having a predetermined length are manufactured.

Subsequently, the coupling member 20 is expanded and molded while sequentially supplying the plurality of surface fastener portions 110 using the first continuous expansion molding apparatus 50 as illustrated in FIG. 7.

Figure 39:
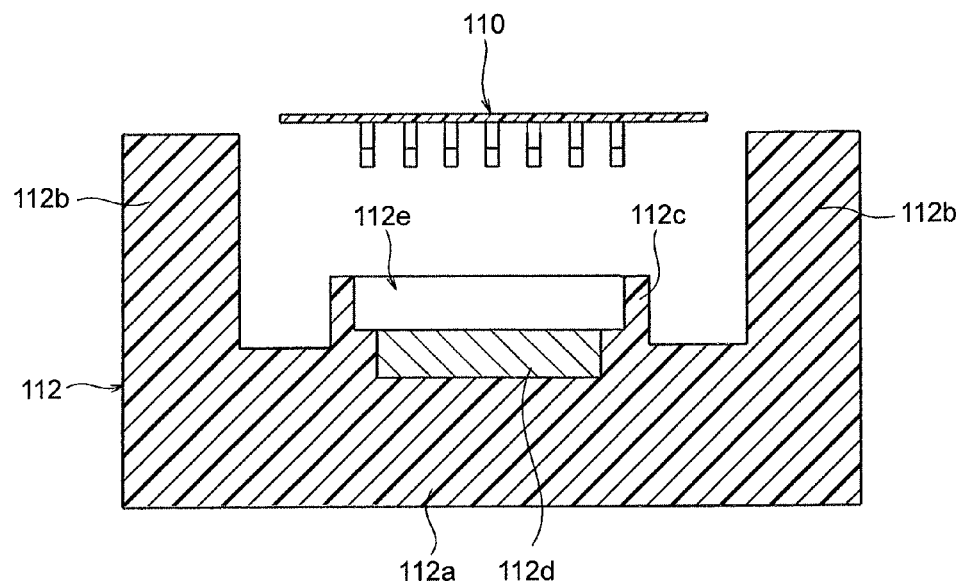
FIG. 39 is a cross-sectional view illustrating a state where a surface fastener portion is adsorbed and fixed to a lower conveyer belt in the steps of manufacturing the molding hook and loop fastener.
Figure 40:
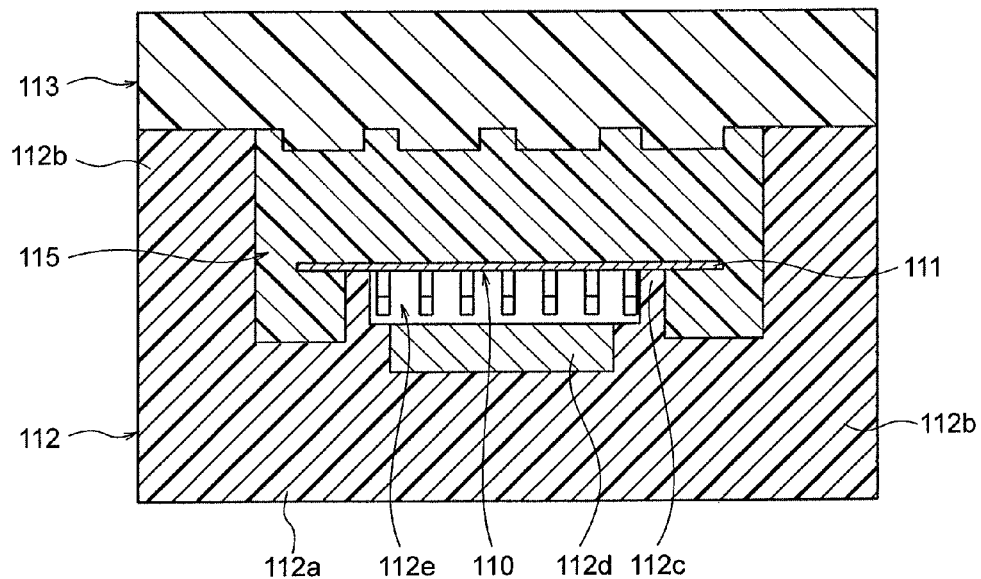
FIG. 40 is a cross-sectional view schematically illustrating relationship between upper and lower conveyer belts, a surface fastener portion, and a coupling member.

The first continuous expansion molding apparatus 50 used in the fourth embodiment has the same configuration as the first embodiment except that as illustrated in FIGS. 39 and 40, the shape of a lower molding form portion 112 disposed in a lower conveyer belt and the shape of an upper molding form portion 113 disposed in an upper conveyer belt are different from those of the lower molding form portion 58 and the upper molding form portion 54c used in the first embodiment.

The plurality of lower molding form portions 112 of the fourth embodiment are configured to be connected to each other and divided from each other. Each lower molding form portion 112 includes a bottom surface portion 112a, right and left lateral wall portions 112b erected on both side edges in the width direction of the bottom surface portion 112a, a mounting portion 112c that rises from a central portion in the width direction of the bottom surface portion 112a so that the surface fastener portion 110 is mounted on the mounting portion, an accommodation recess 112e that is recessed to the mounting portion 112c so as to accommodate the engaging elements 17 of the surface fastener portion 110, and a magnet 112d embedded in the bottom surface of the accommodation recess 112e.

When the engaging elements 17 of the surface fastener portion 110 are mounted on the mounting portion 112c of the lower molding form portion 112 so as to be accommodated in the accommodation recesses 112e, the base portion 111 of the surface fastener portion 110 is attached to the surface of the mounting portion 112c. Due to this, it is possible to prevent a foaming resin material from penetrating into the engaging element area of the surface fastener portion 110 during expansion molding of the coupling member 115 (see FIG. 40).

The upper molding form portion 113 is attached to the right and left lateral wall portions 112b of the lower molding form portion 112, whereby a molding space portion for the coupling member 115 is formed between the upper molding form portion 113 and the lower molding form portion 112. For this reason, a plurality of projection portions corresponding to the recessed portions 25 of the coupling member 115 are formed on the cavity surface of the upper molding form portion 113.

By performing expansion molding of the coupling member 115 in the conveying portion while sequentially supplying the surface fastener portion 110 to the conveying portion using the first continuous expansion molding apparatus 50, the molding hook and loop fastener 4 of the fourth embodiment is manufactured.

In the fourth embodiment, instead of the first continuous expansion molding apparatus 50, similarly to the first embodiment, the molding hook and loop fastener 4 can also be manufactured using the second continuous expansion molding apparatus 60 having the upper and lower molding form portions formed in a predetermined shape and a mold having a cavity space having a predetermined shape.

As in the first embodiment and the like, when the molding hook and loop fastener 4 of the fourth embodiment manufactured in this manner is integrally molded to a cushion body such as an automobile seat, the upper surface of the coupling member 115 can be attached to the cavity surface of the molding mold for the cushion body and the foaming resin material can be prevented from penetrating into the engaging element area of the surface fastener portion 110. Due to this, it is possible to stably manufacture a cushion body to which the molding hook and loop fastener 4 capable of fastening a skin material with desired fastening strength is integrally molded.

Fifth Embodiment

Figure 41:
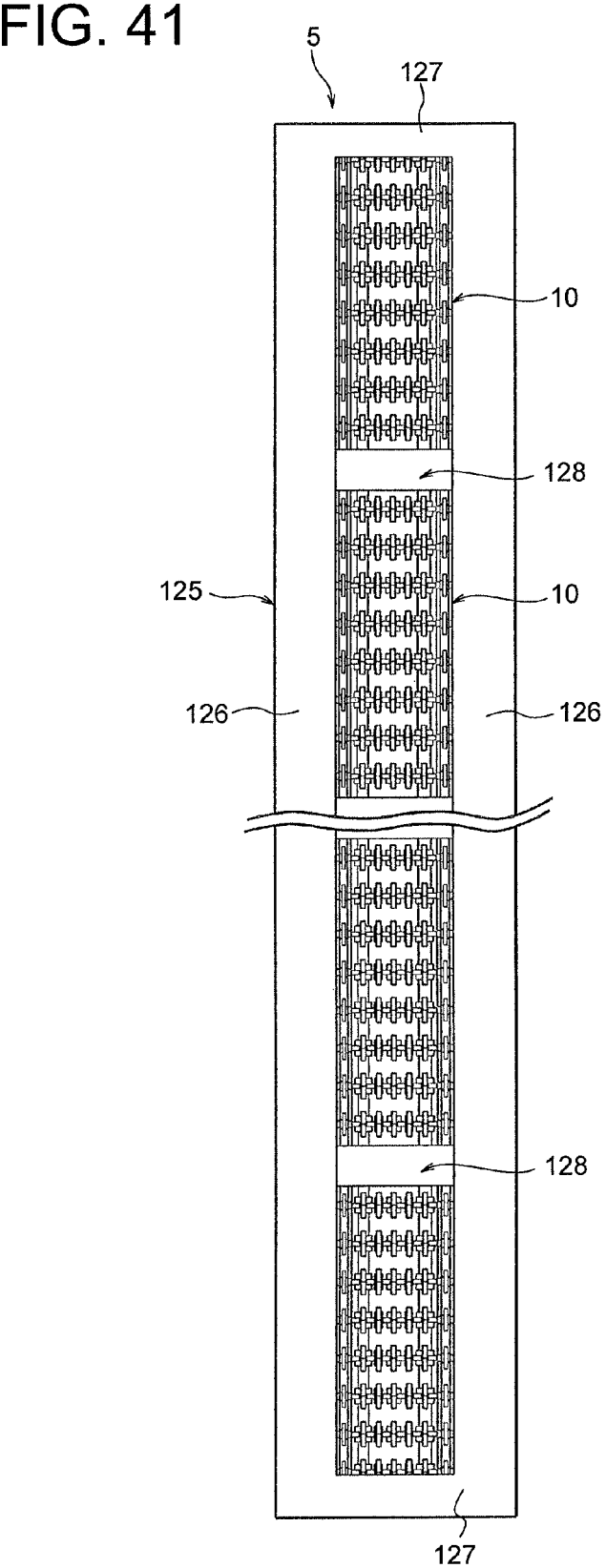
FIG. 41 is a plan view illustrating a molding hook and loop fastener according to a fifth embodiment of the invention.
Figure 42:
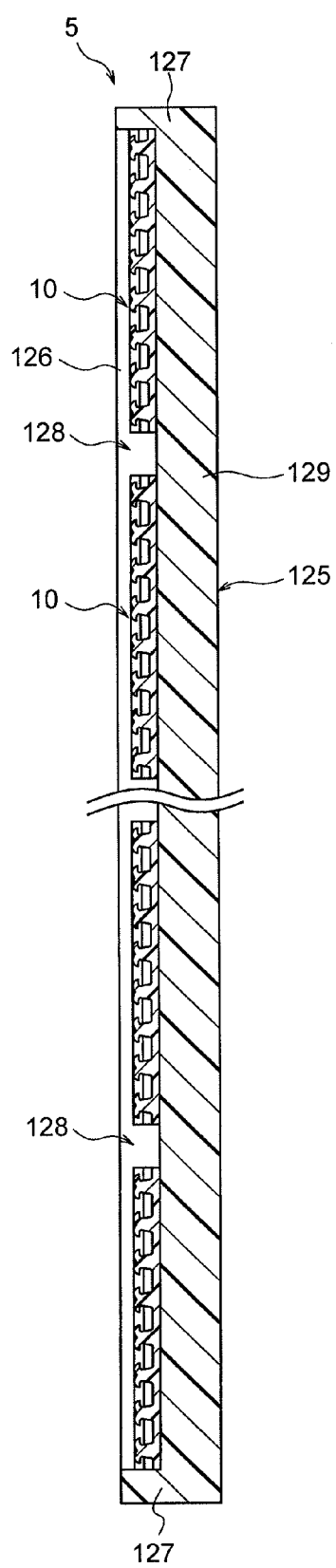
FIG. 42 is a longitudinal sectional view of the molding hook and loop fastener.

FIG. 41 is a plan view illustrating a molding hook and loop fastener according to a fifth embodiment, and FIG. 42 is a longitudinal sectional view of the molding hook and loop fastener.

A molding hook and loop fastener 5 according to the fifth embodiment includes a plurality of surface fastener portions 10 and a coupling member 125 that connects these surface fastener portions 10, and the surface fastener portions 10 themselves of the fifth embodiment have the same configuration as the surface fastener portions 10 of the first embodiment.

The coupling member 125 of the fifth embodiment includes a pair of right and left vertical wall coupling portions 126, penetration preventing lateral wall portions 127 disposed on the front and rear end portions of the molding hook and loop fastener 5, and an anchoring portion 129 disposed on the lower surface side of the surface fastener portion 10. However, the lateral wall coupling portion 23 disposed in the coupling member 20 of the first embodiment is removed from the coupling member 125 of the fifth embodiment, and a concave portion 128 is formed. That is, the molding hook and loop fastener 5 of the fifth embodiment has the same configuration as the molding hook and loop fastener 1 of the first embodiment except that the lateral wall coupling portion that connects the surface fastener portions 10 between the right and left vertical wall coupling portions 126 is not disposed in the coupling member 125.

When the molding hook and loop fastener 5 of the fifth embodiment is manufactured, first, a plurality of surface fastener portions 10 having a predetermined length is manufactured in the same manner as in the first embodiment and the like. Subsequently, the coupling member 125 is expanded and molded using the first continuous expansion molding apparatus 50 as illustrated in FIG. 7 or the second continuous expansion molding apparatus 60 as illustrated in FIG. 11 having upper and lower molding form portions having a predetermined shape. In this way, the molding hook and loop fastener 5 of the fifth embodiment is manufactured.

Figure 43:
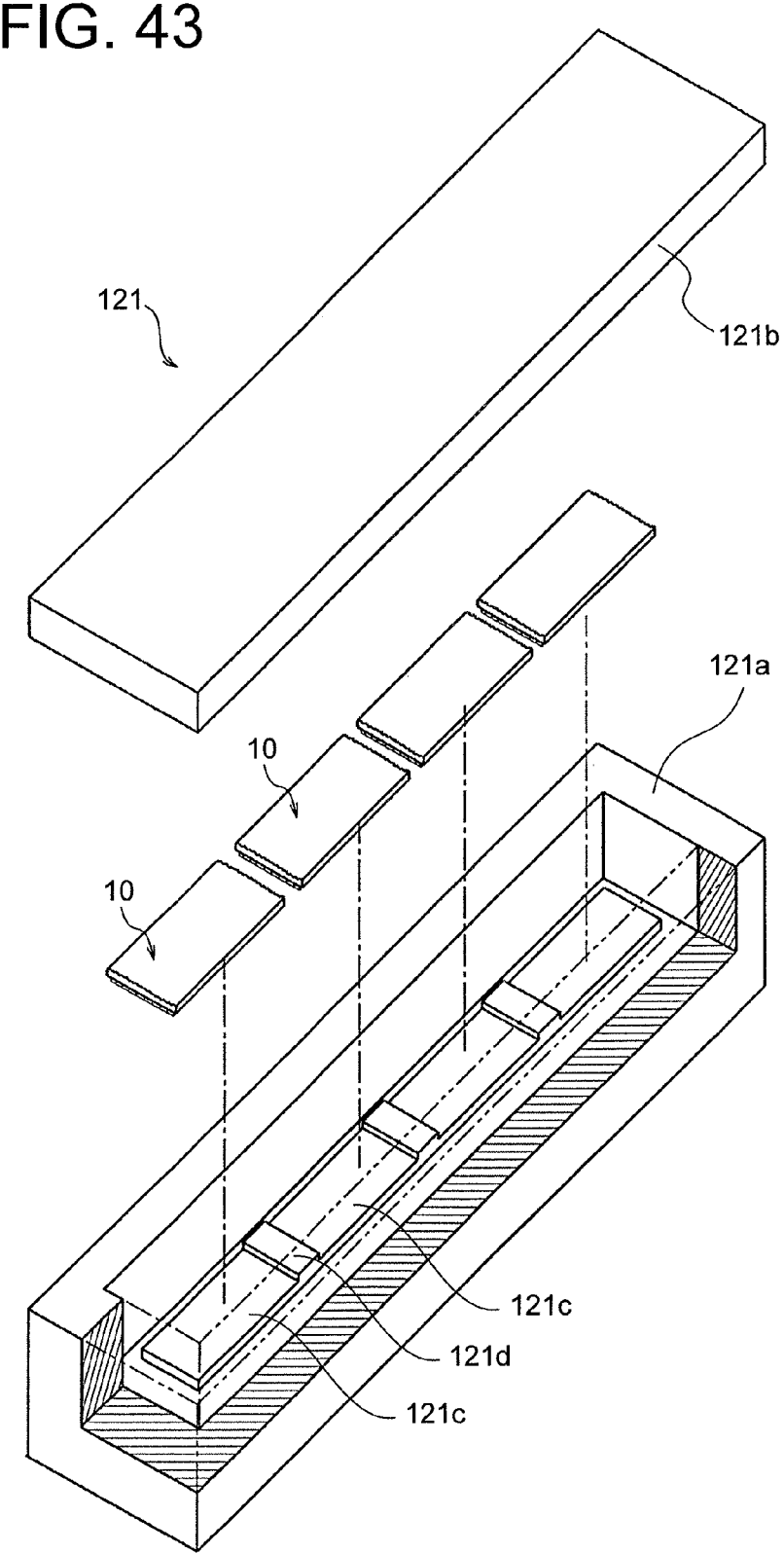
FIG. 43 is an explanatory view for schematically describing steps of manufacturing the molding hook and loop fastener.

Moreover, in the fifth embodiment, the molding hook and loop fastener 5 of the fifth embodiment can be molded by performing expansion molding of the coupling member 125 using such a mold as illustrated in FIG. 43 in addition to using the first and second continuous expansion molding apparatuses 50 and 60.

In this case, the mold 121 used for expanding and molding the coupling member 125 includes a pair of fixed mold 121a and movable mold 121b. Moreover, a plurality of mounting portions 121c for mounting the surface fastener portion 10 are disposed on the bottom surface of the fixed mold 121a at a predetermined interval along the longitudinal direction, and a rising portion 121d is disposed between the adjacent mounting portions 121c. A magnet (not illustrated) is embedded on the front surface side of the mounting portion 121c.

Since the rising portion 121d is formed between the mounting portions 121c, it is possible to easily perform alignment of the surface fastener portions 10 mounted on the mounting portions 121c. Moreover, when expansion molding is performed using the mold 121, it is possible to reliably form the concave portion 128 on the coupling member 125 and to manufacture the molding hook and loop fastener 5 of the fifth embodiment.

In the molding hook and loop fastener 5 of the fifth embodiment manufactured in this manner, due to the concave portion 128 of the coupling member 125, even when the coupling member 125 is not provided between the adjacent surface fastener portions 10, when the cushion body is expanded and molded, the upper surfaces of the right and left vertical wall coupling portions 126 of the coupling member 115 and the upper surfaces of the front and rear penetration preventing lateral wall portions 127 can be attached to the cavity surface of the molding mold for the cushion body. Thus, it is possible to prevent a foaming resin material from penetrating into the engaging element area of the surface fastener portion 10 from the width direction and the longitudinal direction. Therefore, in the fifth embodiment, it is possible to stably manufacture a cushion body to which the molding hook and loop fastener 5 capable of fastening a skin material with desired fastening strength is integrally molded.

Sixth Embodiment

Figure 44:
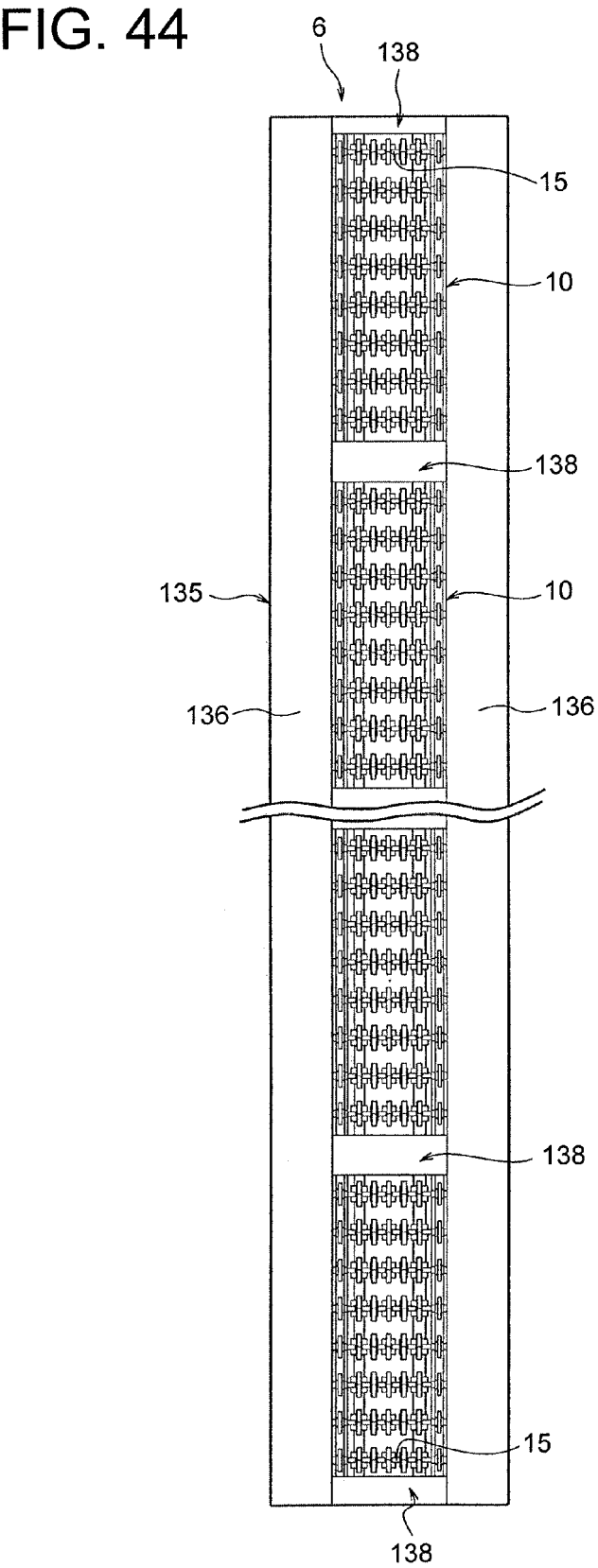
FIG. 44 is a plan view illustrating a molding hook and loop fastener according to a sixth embodiment of the invention.
Figure 45:
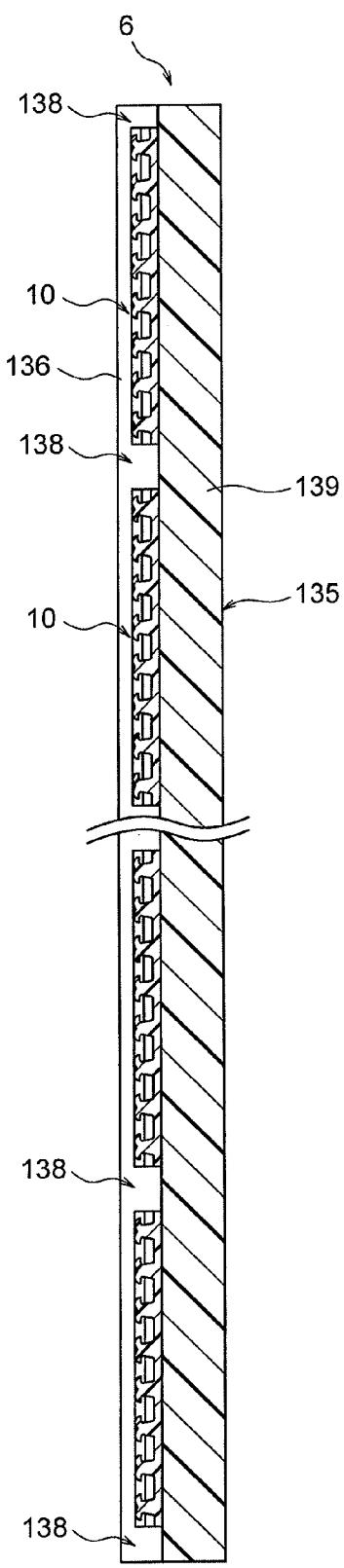
FIG. 45 is a longitudinal sectional view of the molding hook and loop fastener.

FIG. 44 is a plan view illustrating a molding hook and loop fastener according to a sixth embodiment, and FIG. 45 is a longitudinal sectional view of the molding hook and loop fastener.

A molding hook and loop fastener 6 according to the sixth embodiment includes a plurality of surface fastener portions 10 and a coupling member 135 that connects these surface fastener portions 10, and the surface fastener portions 10 themselves of the sixth embodiment have the same configuration as the surface fastener portions 10 of the first embodiment.

The coupling member 135 of the sixth embodiment includes a pair of right and left vertical wall coupling portions 136 and an anchoring portion 139 disposed on the lower surface side of the surface fastener portion 10. However, the penetration preventing lateral wall portion 22 and the lateral wall coupling portion 23 disposed in the coupling member 20 of the first embodiment are removed from the coupling member 135 of the sixth embodiment, and a concave portion 138 is formed.

When the molding hook and loop fastener 6 of the sixth embodiment is manufactured, first, a plurality of surface fastener portions 10 having a predetermined length are manufactured in the same manner as in the first embodiment and the like.

Subsequently, the coupling member 135 is expanded and molded using the first continuous expansion molding apparatus 50 as illustrated in FIG. 7 or the second continuous expansion molding apparatus 60 as illustrated in FIG. 11 having upper and lower molding form portions having a predetermined shape. Alternatively, the coupling member 135 is expanded and molded using a mold having a cavity space with a predetermined shape in the same manner as the fifth embodiment. In this way, the molding hook and loop fastener 6 of the sixth embodiment is manufactured.

In the molding hook and loop fastener 6 of the sixth embodiment manufactured in this manner, since the right and left vertical wall coupling portions 136 are disposed in the coupling member 135, when the cushion body is expanded and molded, the upper surfaces of the vertical wall coupling portions 136 of the coupling member 135 can be attached to the cavity surface of the molding mold for the cushion body. Thus, it is possible to prevent a foaming resin material from penetrating into the engaging element area of the surface fastener portion 10 from the width direction.

On the other hand, in the molding hook and loop fastener 6 of the sixth embodiment, the penetration preventing lateral wall portion is not disposed on the front and rear end portions of the coupling member 135, but the concave portion 138 is formed. Due to this, when the cushion body is expanded and molded, the upper surface of the coupling member 135 is not attached to the cavity surface of the molding mold for the cushion body in an area of the front and rear end portions of the coupling member 135 where the concave portion 138 is formed, and the foaming resin material flows toward the surface fastener portion 10 from the front and rear ends of the coupling member 135.

However, in this case, the lateral barrier portion 15 formed by the engaging element 17 and the lateral barrier wall 16 is disposed between the right and left vertical barrier portions 12 of the surface fastener portion 10 of the sixth embodiment. Due to this, even when the foaming resin material flows toward the surface fastener portion 10 from the front and rear ends of the coupling member 135 during expansion molding of the cushion body, the foaming resin material can be stopped by blocking the same by the lateral barrier portion 15 disposed on the frontmost side of the surface fastener portion 10 disposed on the front end portion of the molding hook and loop fastener 6 and the lateral barrier portion 15 disposed on the rearmost side of the surface fastener portion 10 disposed on the rear end portion of the molding hook and loop fastener 6.

In this manner, it is possible to prevent the foaming resin material from penetrating into the engaging element area of the surface fastener portion 10 from the longitudinal direction. Therefore, in the sixth embodiment, it is also possible to stably manufacture a cushion body to which the molding hook and loop fastener 6 capable of fastening a skin material with desired fastening strength is integrally molded.

Seventh Embodiment

Figure 46:
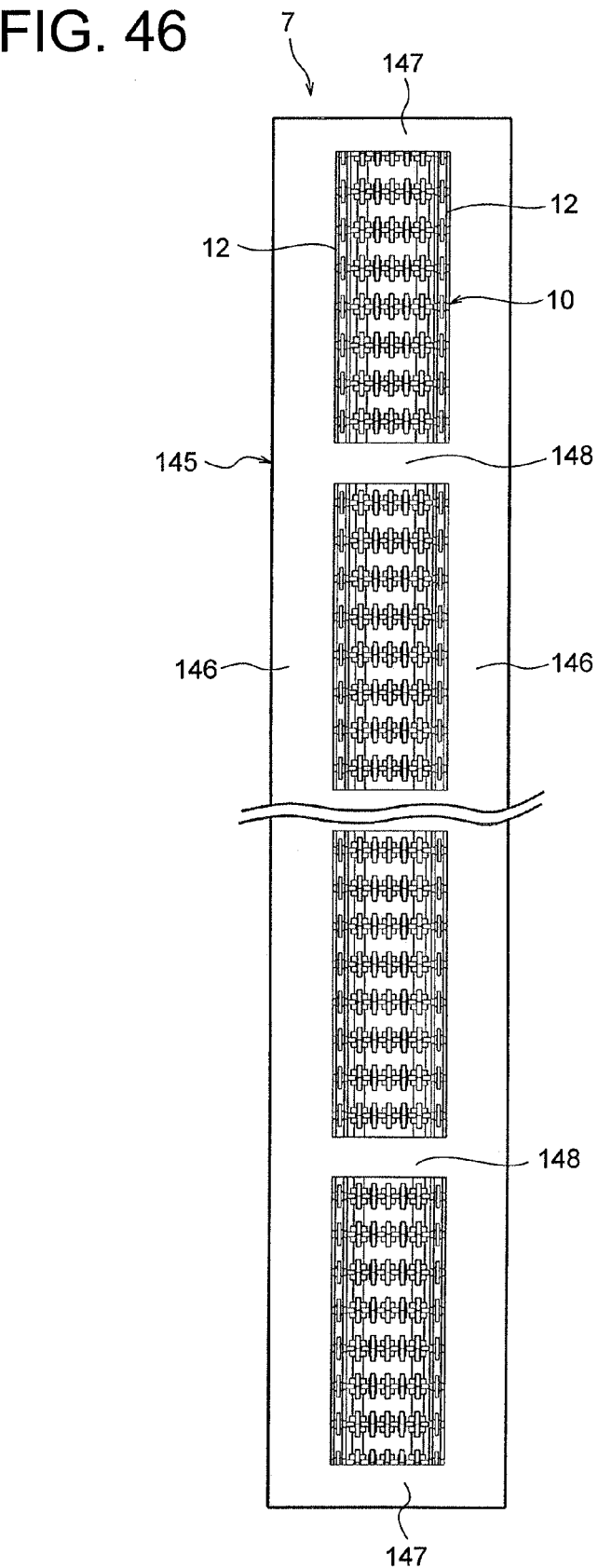
FIG. 46 is a plan view illustrating a molding hook and loop fastener according to a seventh embodiment of the invention.
Figure 47:
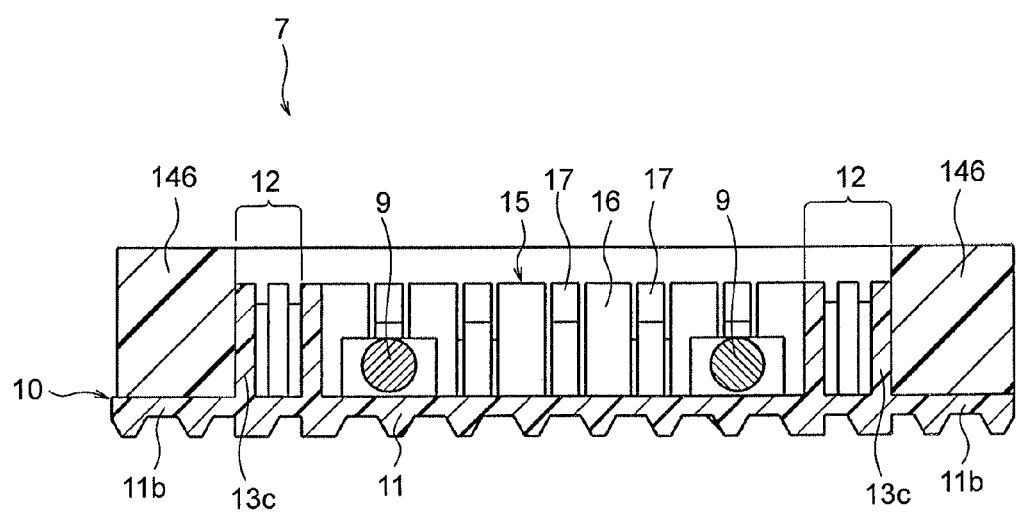
FIG. 47 is a cross-sectional view of the molding hook and loop fastener.

FIG. 46 is a plan view illustrating a molding hook and loop fastener according to a seventh embodiment, and FIG. 47 is a longitudinal sectional view of the molding hook and loop fastener.

A molding hook and loop fastener 7 according to the seventh embodiment includes a plurality of surface fastener portions 10 and a coupling member 145 that connects these surface fastener portions 10, and the surface fastener portions 10 themselves of the seventh embodiment have the same configuration as the surface fastener portions 10 of the first embodiment.

The coupling member 145 of the seventh embodiment is formed of a thermoplastic elastomer and has flexibility that it can be bent in the width direction and the front-rear direction of the molding hook and loop fastener 1. A thermoplastic elastomer that forms the coupling member 145 can be selected from various elastomers including a polyolefin elastomer, a styrene-butadiene elastomer, a polyester elastomer, a polyvinyl chloride elastomer, a polyamide elastomer, and a urethane elastomer by taking the fastening strength and the like between the coupling member and the cushion body of an automobile seat and the like into consideration. When the cushion body is formed of a polyurethane foam body, a urethane elastomer is preferably used.

The coupling member 145 includes a pair of right and left vertical wall coupling portions 146, penetration preventing lateral wall portions 147 disposed on the front and rear end portions of the molding hook and loop fastener 7, and a lateral wall coupling portion 148 disposed between the adjacent surface fastener portions 10. However, in the coupling member 145, no elements are disposed on the lower surface side of the surface fastener portion 10, and the anchoring portion 24 disposed in the coupling member 20 of the first embodiment is removed.

In this case, although the anchoring portion is not formed, since the coupling member 145 is formed using an elastomer having higher strength and rigidity than a foam body, the coupling member 145 itself is rarely cut and the molding hook and loop fastener 7 will not be bent at an acute angle in the front-rear direction.

Figure 48:
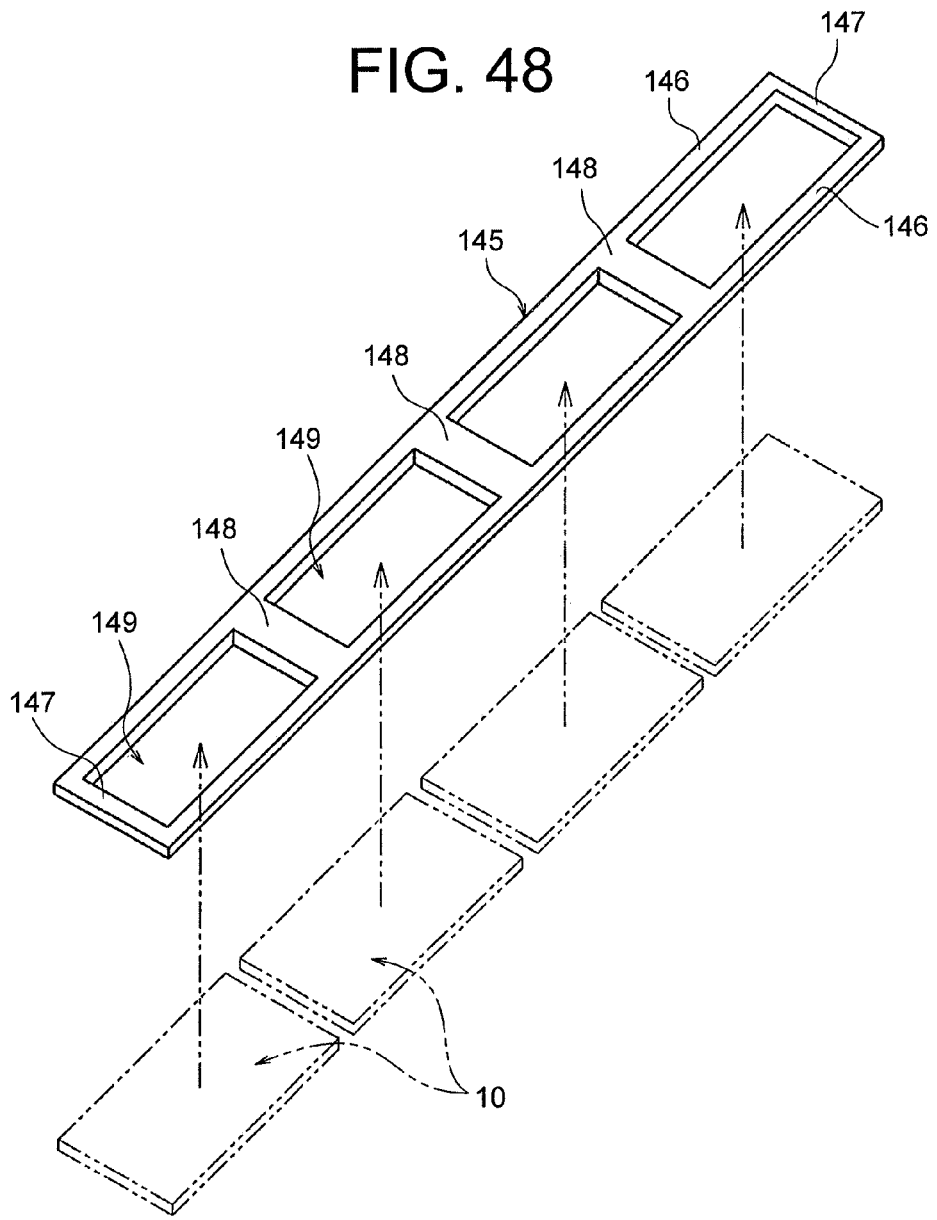
FIG. 48 is an explanatory view for schematically describing steps of manufacturing the molding hook and loop fastener.
Figure 49:
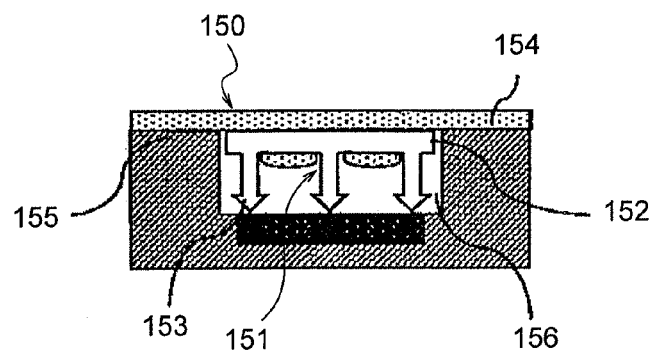
FIG. 49 is a cross-sectional view illustrating a state where a conventional molding hook and loop fastener is adsorbed and fixed to a mold.
Figure 50:
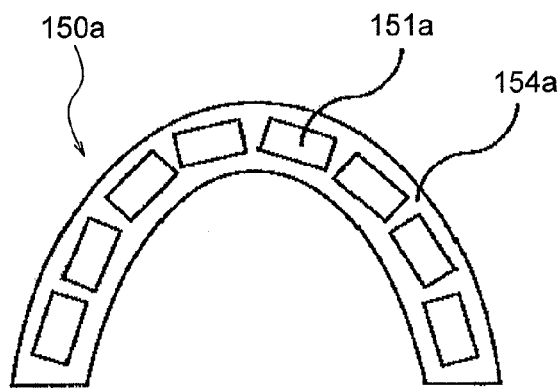
FIG. 50 is a plan view illustrating a conventional molding hook and loop fastener formed in a curved form.
Figure 51:
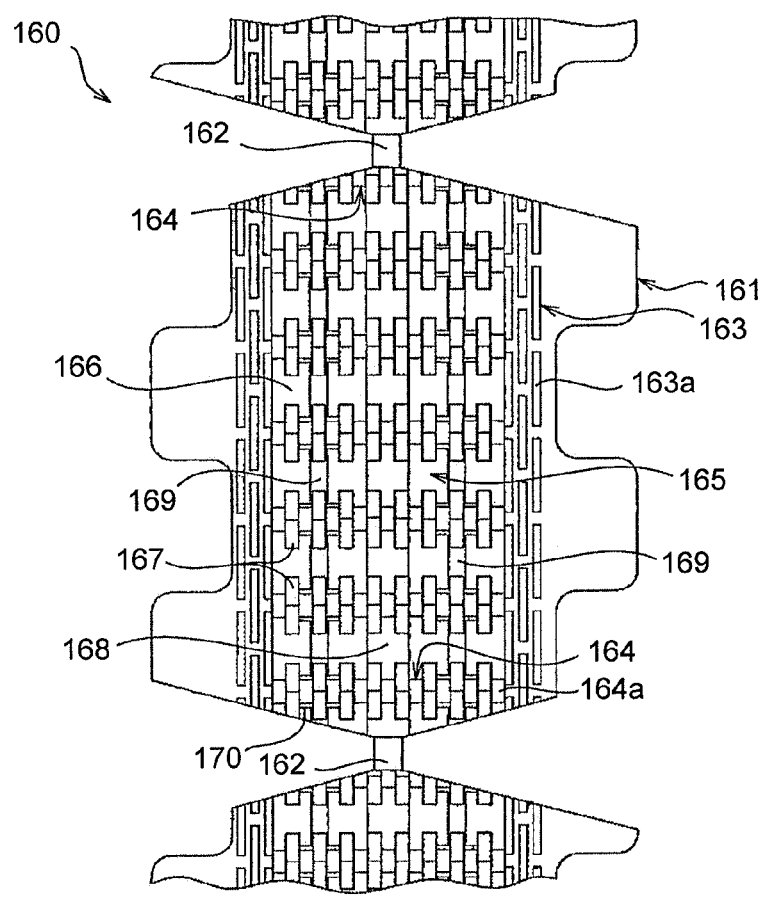
FIG. 51 is a plan view illustrating a conventional molding hook and loop fastener.

When the molding hook and loop fastener 7 of the seventh embodiment is manufactured, first, a plurality of surface fastener portions 10 having a predetermined length is manufactured in the same manner as in the first embodiment and the like. Moreover, separately from the step of manufacturing the plurality of surface fastener portions 10, the coupling member 145 is molded or processed using an elastomer. In this case, as illustrated in FIG. 48, a plurality of holes 149 is formed in the obtained coupling member 145 at a predetermined interval along the longitudinal direction.

After that, the surface fastener portions 10 are inserted one by one in each hole portion 149 of the coupling member 145 so that the surface fastener portions 10 are attached to the coupling member 145. In this case, the upper surfaces of the right and left lateral extension portions 11b of the base portion 11 of the surface fastener portion 10 are attached to the lower surfaces of the right and left vertical wall coupling portions 146 of the coupling member 145. The outer surfaces (that is, the outer wall surfaces of the third lines of vertical walls 13c) of the right and left vertical barrier portions 12 of the surface fastener portion 10 are attached to the inner wall surfaces (inner wall surfaces of the holes 149) of the right and left vertical wall coupling portions 146 of the coupling member 145.

Further, in this case, the upper surfaces of the front and rear extension portions 11c and 11d of the surface fastener portion 10 are preferably attached to the lower surfaces of the penetration preventing lateral wall portion 147 and the lateral wall coupling portion 148 of the coupling member 145.

After that, the surface fastener portions 10 are inserted one by one in each hole portion 149 of the coupling member 145 so that the surface fastener portions 10 are attached to the coupling member 145. In this case, the upper surfaces of the right and left lateral extension portions 11b of the base portion 11 of the surface fastener portion 10 and the upper surfaces of the front and rear extension portions 11c and 11d are attached to the lower surfaces of the right and left vertical wall coupling portions 146 and the lower surfaces of the penetration preventing lateral wall portion 147 and the lateral wall coupling portion 148 of the coupling member 145. Moreover, the outer surfaces (that is, the outer wall surfaces of the third lines of vertical walls 13c) of the right and left vertical barrier portions 12 of the surface fastener portion 10 are fixed to the inner wall surfaces (inner wall surfaces of the hole portions 149) of the right and left vertical wall coupling portions 146 of the coupling member 145.

In the seventh embodiment, means for attaching the surface fastener portion 10 and the coupling member 145 is not particularly limited, and the surface fastener portion 10 and the coupling member 145 may be attached using ultrasonic welding, for example. Moreover, the surface fastener portion 10 can be attached to the coupling member 145 using an adhesive agent. By using ultrasonic welding or the adhesive agent, the surface fastener portion 10 and the coupling member 145 can be tightly attached even when the anchoring portion is not formed in the coupling member 145.

When the surface fastener portions 10 are inserted in and attached to each hole portion 149 of the coupling member 145, the molding hook and loop fastener 7 of the seventh embodiment is manufactured.

In the molding hook and loop fastener 7 of the seventh embodiment manufactured in this manner, since the coupling member 145 is formed of an elastomer, by bending the coupling member 145, the entire molding hook and loop fastener 7 can be easily bent in the width direction and the front-rear direction.

Due to this, when the molding hook and loop fastener 7 is integrally molded to the cushion body during expansion molding of the cushion body, even when the projection portion on which the molding hook and loop fastener 7 is mounted in the molding mold for the cushion body is bent in the width direction and the front-rear direction, by causing the molding hook and loop fastener 7 to be adsorbed and fixed to the projection portion using magnetic force, the upper surfaces of the vertical wall coupling portion 146, the penetration preventing lateral wall portion 147, and the lateral wall coupling portion 148 of the coupling member 145 can be stably attached to the top face (upper surface) of the projection portion.

Therefore, by performing expansion molding of the cushion body in a state where the molding hook and loop fastener 7 is adsorbed and fixed to the projection portion of the mold, a cushion body integrated with the molding hook and loop fastener 7 in which the engaging elements 17 are exposed in the respective engaging element areas 18 of the surface fastener portions 10 so as to have desired fastening strength can be manufactured stably.

Reference Signs List 1, 1a, 1b: MOLDING HOOK AND LOOP FASTENER
2, 3, 4, 5: MOLDING HOOK AND LOOP FASTENER
6, 7: MOLDING HOOK AND LOOP FASTENER
9: LINEAR MAGNETIC BODY
10: SURFACE FASTENER PORTION
10a: CONTINUOUS SURFACE FASTENER PORTION
11: BASE PORTION
11a: RECESSED GROOVE
11b: LATERAL EXTENSION PORTION
11c: FRONT EXTENSION PORTION
11d: REAR EXTENSION PORTION
11e: BASE CONNECTING PORTION
12: VERTICAL BARRIER PORTION
13: VERTICAL WALL
13a: FIRST LINE OF VERTICAL WALLS
13b: SECOND LINE OF VERTICAL WALLS
13c: THIRD LINE OF VERTICAL WALLS
14: VERTICAL WALL COUPLING PORTION
15: LATERAL BARRIER PORTION
16: LATERAL BARRIER WALL
17: ENGAGING ELEMENT (MALE ENGAGING ELEMENT)
18: ENGAGING ELEMENT AREA
19: FIXING PORTION
20, 20a: COUPLING MEMBER
21, 21a: VERTICAL WALL COUPLING PORTION
22: PENETRATION PREVENTING LATERAL WALL PORTION
23: LATERAL WALL COUPLING PORTION
24, 24a: ANCHORING PORTION (LOWER SURFACE PORTION)
25: RECESSED PORTION
26: NOTCH PORTION
30: SURFACE FASTENER PORTION MANUFACTURING APPARATUS
31: DIE WHEEL
32: CONTINUOUS EXTRUSION NOZZLE
33: PICKUP ROLLER
34: MAGNETIC BODY SUPPLY PORTION
35: CONVEYING ROLLER
40: CUTTING DEVICE
41: CUTTING ROLLER
41a: CUTTING BLADE
41b: FIN PORTION
42: SUPPORT ROLLER
43: SUPPLY PORTION
44: DISCHARGE PORTION
45: MOLD
50: FIRST CONTINUOUS EXPANSION MOLDING APPARATUS
51: SHOOT PORTION
52: CONVEYING PORTION
53: LOWER CONVEYER BELT 53a: DRIVING ROLLER
53b: DRIVEN ROLLER
53c: ENDLESS BELT
53d: LOWER SUPPORT ROLLER
53e: LOWER MOLDING FORM PORTION
54: UPPER CONVEYER BELT
54a: DRIVING ROLLER
54b: DRIVEN ROLLER
54c: UPPER MOLDING FORM PORTION
54d: UPPER SUPPORT ROLLER
55: INJECTION NOZZLE
56: CUTTING PORTION
58: LOWER MOLDING FORM PORTION
58a: BOTTOM SURFACE PORTION
58b: LATERAL WALL PORTION
58c: MOUNTING PORTION
58d: MAGNET
59: MOLDING SPACE PORTION
60: SECOND CONTINUOUS EXPANSION MOLDING APPARATUS
62: CONVEYING PORTION
63: LOWER CONVEYER BELT
63a: DRIVING ROLLER
63b: DRIVEN ROLLER
63c: ENDLESS BELT
63d: LOWER SUPPORT ROLLER
64: UPPER CONVEYER BELT
64a: DRIVING ROLLER
64b: DRIVEN ROLLER
64c: UPPER MOLDING FORM PORTION
64d: UPPER SUPPORT ROLLER
65: INJECTION NOZZLE
66: CUTTING PORTION
71: FIRST MOLD
71a: FIRST FIXED MOLD
71b: FIRST MOVABLE MOLD
71c: MOUNTING PORTION
71d: MAGNET
72: SECOND MOLD
72a: SECOND FIXED MOLD
72b: SECOND MOVABLE MOLD
72c: ATTACHMENT PORTION
72d: MAGNET
75: MOLD
75a: PROJECTION PORTION
75b: MAGNET
76: CUSHION BODY
80: SURFACE FASTENER PORTION
81: BASE PORTION
82: ADHESIVE LAYER
85: COUPLING MEMBER
85a: EXPANDED RESIN SHEET
85b: CONCAVE PORTION
86: VERTICAL WALL COUPLING PORTION
87: PENETRATION PREVENTING LATERAL WALL PORTION
88: LATERAL WALL COUPLING PORTION
89: ANCHORING PORTION (LOWER SURFACE PORTION)
90: BONDING APPARATUS
91: THERMAL MOLDING PORTION
91a: THERMAL MOLDING ROLLER
91b: HEATING AND PRESSING PORTION
92: ADHESIVE AGENT SUPPLY NOZZLE
93: CONVEYING PORTION
93a: UPPER CONVEYER
93b: LOWER CONVEYER
94: CUTTING PORTION
100: SURFACE FASTENER PORTION
101: BASE PORTION
102: PARALLEL PORTION
103: INCLINED PORTION
110: SURFACE FASTENER PORTION
111: BASE PORTION
112: LOWER MOLDING FORM PORTION
112a: BOTTOM SURFACE PORTION
112b: LATERAL WALL PORTION
112c: MOUNTING PORTION
112d: MAGNET
112e: ACCOMMODATION RECESS
113: UPPER MOLDING FORM PORTION
115: COUPLING MEMBER
116: VERTICAL WALL COUPLING PORTION
118: LATERAL WALL COUPLING PORTION
119: ANCHORING PORTION
121: MOLD
121a: FIXED MOLD
121b: MOVABLE MOLD
121c: MOUNTING PORTION
121d: RISING PORTION
125: COUPLING MEMBER
126: VERTICAL WALL COUPLING PORTION
127: PENETRATION PREVENTING LATERAL WALL PORTION
128: CONCAVE PORTION
129: ANCHORING PORTION
135: COUPLING MEMBER
136: VERTICAL WALL COUPLING PORTION
138: CONCAVE PORTION
139: ANCHORING PORTION
145: COUPLING MEMBER
146: VERTICAL WALL COUPLING PORTION
147: PENETRATION PREVENTING LATERAL WALL PORTION
148: LATERAL WALL COUPLING PORTION
149: HOLE PORTION
H1: PROTRUSION DIMENSION OF VERTICAL WALL COUPLING PORTION PROTRUDING MORE THAN VERTICAL WALL
H2: HEIGHT DIMENSION OF COUPLING MEMBER
W: WIDTH DIMENSION OF VERTICAL WALL COUPLING PORTION
L1: LENGTH DIMENSION OF LATERAL WALL COUPLING PORTION
L2: DISTANCE BETWEEN ADJACENT SURFACE FASTENER PORTIONS

The invention claimed is:

1. A molding hook and loop fastener comprising:
a plurality of surface fastener portions in which a plurality of engaging elements are erected on a first surface of a base portion and an engaging element area is formed; and
a flexible coupling member that connects the plurality of surface fastener portions in a state where central positions in a width direction of the surface fastener portions are disposed on a straight line along a longitudinal direction, the molding hook and loop fastener being integrally molded to a surface of a cushion body when the cushion body is expanded and molded, wherein:
recesses or projections are formed on a second surface of the base portion;
the coupling member is formed of a foam body or an elastomer, and includes a pair of vertical wall coupling portions continuously disposed on both sides of the width direction of the engaging element area on the base portion along the longitudinal direction of the molding hook and loop fastener and which connects the plurality of surface fastener portions and prevents a foaming resin material of the cushion body from penetrating into the engaging element area from the width direction during the expansion molding.

2. The molding hook and loop fastener according to claim 1, wherein the coupling member is attached to the first surface of the base portion.

3. The molding hook and loop fastener according to claim 1, wherein the coupling member comprises a penetration preventing lateral wall portion which-is disposed on both end portions in the longitudinal direction of the molding hook and loop fastener so as to extend between the pair of vertical wall coupling portions and which prevents the foaming resin material from penetrating into the engaging element area from the longitudinal direction.

4. The molding hook and loop fastener according to claim 1 wherein the coupling member comprises a lateral wall coupling portion which is disposed between adjacent surface fastener portions so as to extend between the pair of vertical wall coupling portions and which connects the surface fastener portions.

5. The molding hook and loop fastener according to claim 4, wherein the lateral wall coupling portion is formed between the surface fastener portions so as to extend from the second surface side of the base portion to the first surface side and is attached to side surfaces of each surface fastener portion.

6. The molding hook and loop fastener according to claim 1 wherein
the coupling member includes an anchoring portion attached to the second surface of the base portion of each surface fastener portion, and
the anchoring portion is continuously disposed in the entire longitudinal direction of the molding hook and loop fastener.

7. The molding hook and loop fastener according to claim 6, wherein the pair of vertical wall coupling portions, a lateral wall coupling portion, and the anchoring portion are formed of the same material and are integrated.

8. The molding hook and loop fastener according to claim 1 wherein the surface fastener portions include a vertical barrier portion that includes at least one line of vertical walls between the engaging element area and the respective vertical wall coupling portion.

9. The molding hook and loop fastener according to claim 8, wherein the vertical wall coupling portion and the vertical barrier portion are attached.

10. The molding hook and loop fastener according to claim 8 wherein
the engaging elements are disposed at a predetermined pitch in the width direction of the base portion, and
a lateral barrier wall is disposed along the width direction between the vertical barrier portion and the engaging elements and between the engaging elements adjacent to each other in the width direction.

11. The molding hook and loop fastener according to claim 1, wherein a height dimension of the vertical wall coupling portions from the first surface of the base portion is set to be larger than a height dimension of the engaging elements from the first surface of the base portion.

12. The molding hook and loop fastener according to claim 1 wherein a portion of each of the surface fastener portions is embedded in the coupling member.

13. The molding hook and loop fastener according to claim 1 wherein the surface fastener portions are attached to the coupling member by an adhesive layer.

14. The molding hook and loop fastener according to claim 1 wherein a base connecting portion that connects the base portions of adjacent surface fastener portions is integrally disposed in the surface fastener portion.

15. A molding hook and loop fastener comprising:
a plurality of surface fastener portions in which a plurality of engaging elements are erected on a first surface of a base portion and an engaging element area is formed; and
a flexible coupling member that connects the plurality of surface fastener portions in a state where central positions in a width direction of the surface fastener portions are disposed on a straight line along a longitudinal direction, the molding hook and loop fastener being integrally molded to a surface of a cushion body when the cushion body is expanded and molded, wherein:
the coupling member is formed of a foam body or an elastomer, and includes a pair of vertical wall coupling portions continuously disposed on both sides of the width direction of the engaging element area of the base portion along the longitudinal direction of the molding hook and loop fastener and which connects the plurality of surface fastener portions and prevents a foaming resin material of the cushion body from penetrating into the engaging element area from the width direction during the expansion molding,
the surface fastener portions include a vertical barrier portion that includes at least one line of vertical walls between the engaging element area and the respective vertical wall coupling portion,
the engaging elements are disposed at a predetermined pitch in the width direction of the base portion, and
a lateral barrier wall is disposed along the width direction between the vertical barrier portion and the engaging elements and between the engaging elements adjacent to each other in the width direction.

\* \* \* \* \*

UNITED STATES PATENT AND TRADEMARK OFFICE
CERTIFICATE OF CORRECTION

PATENT NO.         : 9,433,262 B2                                          Page 1 of 1
APPLICATION NO.    : 14/130832
DATED              : September 6, 2016
INVENTOR(S)        : Kenji Okuda et al.

It is certified that error appears in the above-identified patent and that said Letters Patent is hereby corrected as shown below:

Title page,

Item (75), in column 1, in "Inventors", line 1, delete Toyoma" and insert -- Toyama --, therefor.

Item (75), in column 1, in "Inventors", line 2, delete "Toyoma" and insert -- Toyama --, therefor.

Item (75), in column 1, in "Inventors", line 3, delete "Toyoma" and insert -- Toyama --, therefor.

In the Claims,

In column 51, line 13, in Claim 3, delete "which-is" and insert -- which is --, therefor.

In column 51, line 52, in Claim 10, delete "claim 8" and insert -- claim 8, --, therefor.

Signed and Sealed this
Fifteenth Day of November, 2016

Michelle K. Lee
*Director of the United States Patent and Trademark Office*